United States Patent
Stambaugh

(10) Patent No.: US 9,354,789 B2
(45) Date of Patent: *May 31, 2016

(54) VIRTUAL SYSTEMS FOR SPATIAL ORGANIZATION, NAVIGATION, AND PRESENTATION OF INFORMATION

(71) Applicant: Thomas M. Stambaugh, Brookline, MA (US)

(72) Inventor: Thomas M. Stambaugh, Brookline, MA (US)

(73) Assignee: Thomas M. Stambaugh, Brookline, MA (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/949,667

(22) Filed: Jul. 24, 2013

(65) Prior Publication Data

US 2013/0311910 A1 Nov. 21, 2013

Related U.S. Application Data

(63) Continuation of application No. 13/365,523, filed on Feb. 3, 2012, now Pat. No. 8,520,002, which is a continuation of application No. 13/104,067, filed on May 10, 2011, now abandoned, which is a (Continued)

(51) Int. Cl.
| | |
|---|---|
| *G06T 15/00* | (2011.01) |
| *G06F 3/0484* | (2013.01) |
| *G06F 3/0481* | (2013.01) |
| *G06F 17/30* | (2006.01) |

(52) U.S. Cl.
CPC .......... *G06F 3/0484* (2013.01); *G06F 3/04817* (2013.01); *G06F 17/3087* (2013.01); *G06F 17/30241* (2013.01); *G06F 17/30572* (2013.01); *G06T 15/005* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 7,180,516 | B2 | 2/2007 | Kapler et al. |
| 7,577,959 | B2 | 8/2009 | Nguyen et al. |
| 7,663,620 | B2 | 2/2010 | Robertson et al. |
| 8,520,002 | B2 | 8/2013 | Stambaugh |

(Continued)

OTHER PUBLICATIONS

Chung, Hee-Joon, et al. "ArrayXPath: mapping and visualizing microarray gene-expression data with integrated biological pathway resources using Scalable Vector Graphics." Nucleic acids research 32.suppl 2 (2004): W460-W464.*

(Continued)

*Primary Examiner* — Daniel Hajnik
(74) *Attorney, Agent, or Firm* — GTC Law Group PC & Affiliates

(57) ABSTRACT

Organizing information around a specific spatial domain facilitates managing objects presented in visualization layers of the spatial domain. A first portion of a first program for organizing and mapping information around a specific spatial domain is executed by a first virtual system that is created in a program execution environment operable on a network server. In response to the first virtual system invoking a continuation, a second virtual system is created to execute a second portion of the first program. Invoking the continuation in the program execution environment facilitates each of the first and second virtual systems providing only the capabilities necessary to execute their respective portion of the first program. Optionally, executing the first program includes interpreting the first program with a second program.

8 Claims, 43 Drawing Sheets

Related U.S. Application Data continuation of application No. 12/437,013, filed on May 7, 2009, now abandoned, and a continuation-in-part of application No. 11/865,265, filed on Oct. 1, 2007, now abandoned.

(60) Provisional application No. 61/051,052, filed on May 7, 2008, provisional application No. 61/079,565, filed on Jul. 10, 2008, provisional application No. 61/122,163, filed on Dec. 12, 2008, provisional application No. 60/827,516, filed on Sep. 29, 2006.

(56) References Cited

U.S. PATENT DOCUMENTS

| | | |
|---|---|---|
| 2003/0004952 A1 | 1/2003 | Nixon et al. |
| 2004/0027350 A1* | 2/2004 | Kincaid et al. ............... 345/440 |
| 2004/0061702 A1* | 4/2004 | Kincaid ............... 345/440 |
| 2005/0171754 A1 | 8/2005 | Santodomingo et al. |
| 2005/0289540 A1* | 12/2005 | Nguyen et al. ............... 718/1 |
| 2007/0008324 A1* | 1/2007 | Green ............... G06T 1/00 345/501 |
| 2007/0043860 A1* | 2/2007 | Pabari ............... G06F 9/5072 709/224 |
| 2012/0324378 A1 | 12/2012 | Stambaugh |

OTHER PUBLICATIONS

Chung, et al., "ArrayXPath II: Mapping and visualizing microarray gene-expression data with biomedical ontologies and integrated biological pathway resources using Scalable Vector Graphics", Nucl. Acids Res. (2005) 33(suppl2), W621-W626.

* cited by examiner

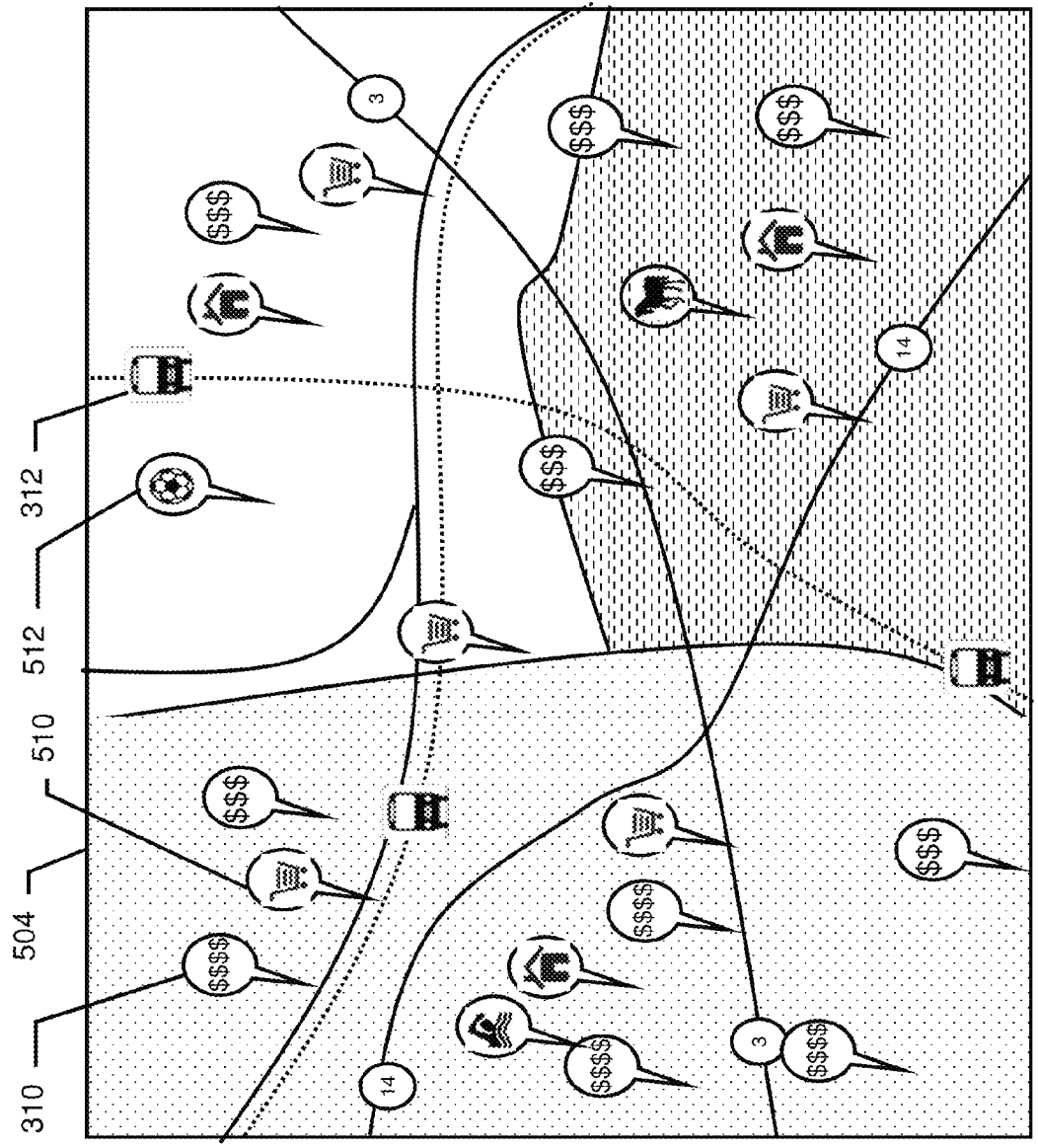
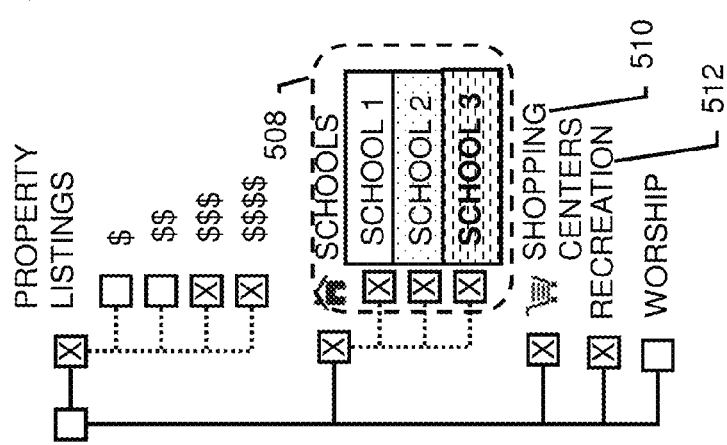
Fig. 5

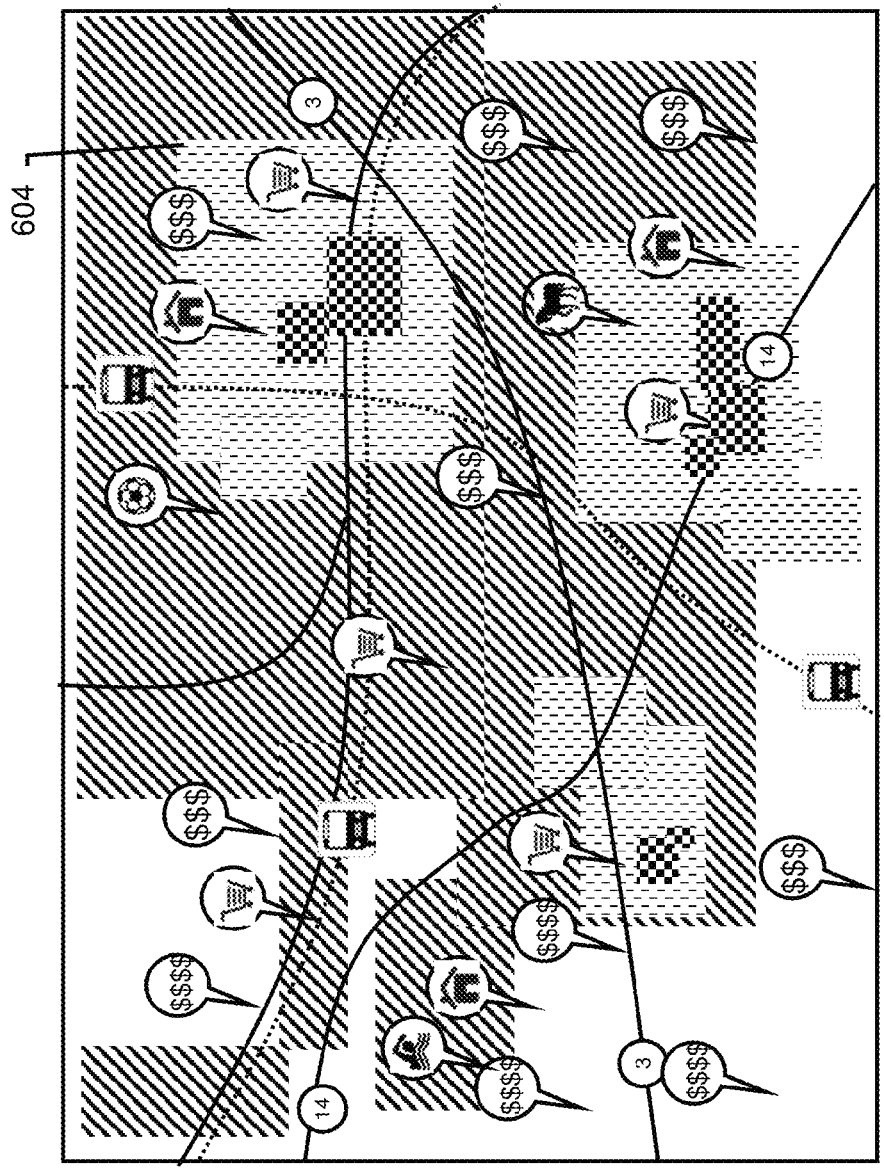
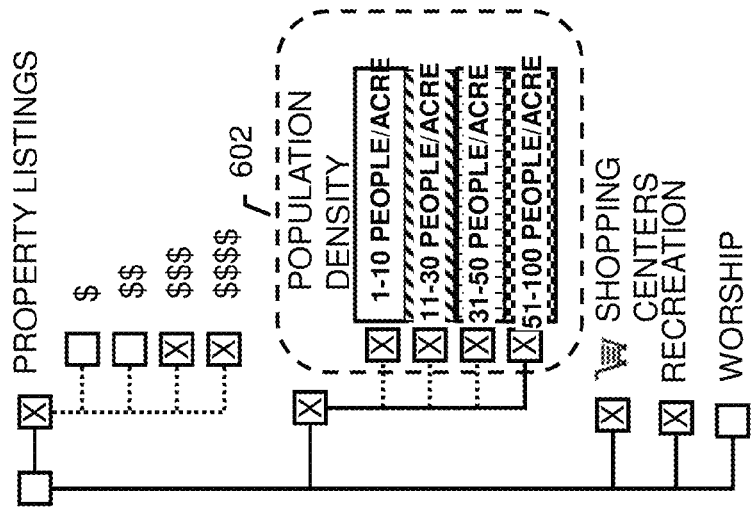
Fig. 6

VIRTUAL SYSTEMS FOR SPATIAL ORGANIZATION, NAVIGATION, AND PRESENTATION OF INFORMATION

CROSS-REFERENCE TO RELATED APPLICATIONS

This application is a continuation of U.S. application Ser. No. 13/365,523, filed Feb. 3, 2012, which is incorporated herein by reference in its entirety. U.S. application Ser. No. 13/365,523, filed Feb. 3, 2012, is a continuation of U.S. application Ser. No. 13/104,067, filed May 10, 2011, which is incorporated herein by reference in its entirety. U.S. application Ser. No. 13/104,067 is a continuation of U.S. application Ser. No. 12/437,013, filed May 7, 2009, which is incorporated herein in its entirety. U.S. application Ser. No. 12/437,013 claims the benefit of the following provisional applications, each of which is hereby incorporated by reference in its entirety: U.S. Provisional Application Ser. No. 61/051,052 filed May 7, 2008, U.S. Provisional Application Ser. No. 61/079,565 filed Jul. 10, 2008, and U.S. Provisional Application Ser. No. 61/122,163 filed Dec. 12, 2008. U.S. application Ser. No. 12/437,013 is a continuation in part of U.S. application Ser. No. 11/865,265 filed Oct. 1, 2007, which is hereby incorporated herein by reference in its entirety. U.S. application Ser. No. 11/865,265 claims the benefit of U.S. Provisional Application Ser. No. 60/827,516 filed Sep. 29, 2006, which is hereby incorporated herein by reference in its entirety.

BACKGROUND OF THE INVENTION

1. Field of the Invention

This disclosure relates to the field of web-based services and more particularly to providing technology for the distributed processing, spatial organization, and web-based display of information.

2. Description of the Related Art

The World Wide Web has proven to be one of the most powerful technologies available today. Users interact with the web by executing certain actions on browser windows, which display the requested information in a variety of formats. A need exists to spatially organize and visually display this information using a variety of different spatial domains and visual renderings, while dramatically enhancing the interactivity of the user experience.

SUMMARY OF THE INVENTION

Described herein are methods and systems that enable the organization of information around a specific spatial domain. Further described herein are methods and systems for managing objects presented in visualization layers of a variety of spatial domains. The methods and systems may include methods and systems for associating an object with one or more spatial domains; presenting the object in a plurality of navigable visualization layers with dimensions that correspond to the dimensions of the spatial domain, the visualization layers having a navigation scheme for navigating within and among the visualization layers, wherein the visualization layers conform to a published application programming interface; assigning the object at least one attribute associated with a virtual property right in at least one spatial domain; and upon a user interaction with the object in the visualization layer, presenting information associated with the virtual property right(s) of the object.

Described herein are methods and systems for identifying a first spatial domain, associating a plurality of objects with the spatial domain, presenting the objects in a plurality of navigable visualization layers with dimensions that correspond to the dimensions of the spatial domain, the visualization layers having a navigation scheme for navigating within and among the visualization layers, wherein the visualization layers conform to a published map application programming interface, assigning the object at least one attribute associated with at least one virtual property right and upon a user interaction with the object in the visualization layer, presenting information associated with the virtual property right(s). Embodiments may further include methods and systems for creating, manipulating, updating, and changing information using a distributed computation engine. Embodiments may further include methods and systems for tracking a use of the virtual property right in order to attribute a value to the use of the virtual property right. In embodiments an owner of the virtual property right receives consideration upon usage of the virtual property right.

The methods and systems herein may effectively present resources of any networked environment, such as the internet, as a virtual computing platform. An interactive visual presentation, such as on a computing facility human interface, may provide an intuitive, responsive, web-based direct-manipulation user interface to this virtual platform.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE DRAWINGS

The invention and the following detailed description of certain embodiments thereof may be understood by reference to the following figures:

FIG. 5 depicts a mapping visualization of objects overlaying other objects.

FIG. 6 depicts a mapping visualization of a layer showing objects overlaying different objects.

DESCRIPTION OF THE PREFERRED EMBODIMENTS

Figure 1:
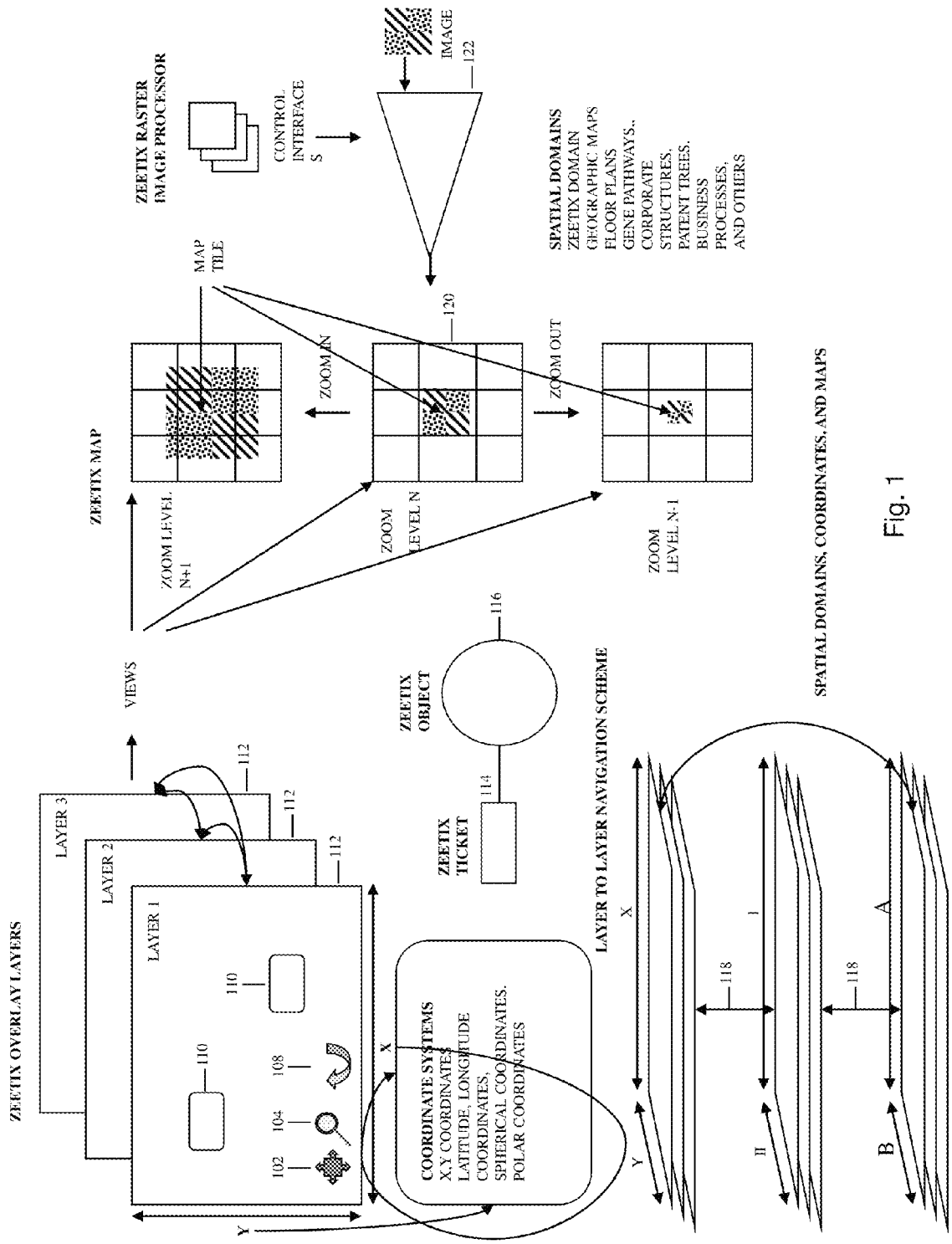
FIG. 1 depicts a set of linked visualization layers that support presentation of objects that have one or more spatial domains; one or more Zeetix maps, a Zeetix Raster Image Processor.

As used herein, the term "ZeeObject™" or "Zeetix Object" will be used to encompass a brand of object that has or may be associated with one or more defined spatial domains (which in embodiments may be arbitrarily defined) and that may be presented in one or more visualization layers, such layers being optionally navigable via a user interface and being optionally linked to permit navigation among the layers.

As used herein, the term "Mashup" or "Generic Mashup" will be used to encompass a website, "Web 2.0 application," web service, domain, or similar content domain that uses content from more than one source to create a combined content item, such as a new website, new service, new application, or the like.

As used herein, the term "Zeetix™" or "Zeetix Mashup," will be used to encompass a brand of object, such as a mash-up or similar object, that has one or more spatial domains (which may be arbitrarily defined) and that may be presented in one or more visualization layers, such layers being optionally navigable via a user interface and being optionally linked to permit navigation among the layers, and that is also comprised of one or more Zeetix objects, as described above. Every Zeetix or Zeetix Mashup is also a Zeetix object.

As used herein, the term "ZeeMap™" or "Zeetix Map" shall encompass one or more images accompanying a visualization layer within a spatial domain. A ZeeMap may optionally be of arbitrary dimension, such that spatial coordinates within the spatial domain map to locations within the ZeeMap. A ZeeMap may be supported by a collection of web-based elements built upon a published map application programming interface, such as, but not limited to, the Google Map Application Programming Interface ("API"), but a ZeetixMap is conceptually independent from the underlying rendering technology. Some, but not all, ZeeMap images are provided by Google and delivered via the Google API. Others are provided by a variety of sources and delivered to the user by the Google API. Finally, some ZeetixMaps are provided by a variety of sources and may be delivered to the user without the use of a published map API.

Thus, a Zeetix may, in embodiments, encompass a collection of information organized around a spatial domain, which may be around a geographical location in a real geography or a virtual geography, and all human-made constructs on it. For example, one common spatial domain is geography, such as maps and images of the earth's surface. A geographic Zeetix may show store locations for a franchise business, listing locations for a realtor, or police stations for a municipality. Another spatial domain may be a visualization of a specific biological pathway, containing annotation on potential drug targets, signal transduction cascades, disease pathways, biomarkers for diagnostic opportunities, or cellular localization for a metabolic pathway. A third spatial domain may be a genomic map of a particular organism showing the locations of gene variants, conserved regions, and similar annotations. Other spatial domains described herein or understood by those of ordinary skill in the art are encompassed herein and may be applicable to Zeetix objects, such as domains used in logical trees and hierarchies, network architectures, organization charts, graphs (including directed graphs), production pipelines, architectural drawings and blueprints, building designs, business locations, anatomical locations within a person, animal or plant, visualizations of a business process, production process, workflow, computer system or network, or the like.

As used herein, the term "ZeetixDomain™" shall mean a distinguished spatial domain that is a synthesized visualization (which may be associated with an arbitrarily defined spatial domain) of object entities in an environment, such that an object entity has a location in this spatial domain. In embodiments, the ZeetixDomain may include every such object, so that every object has a location in the domain. In embodiments every ZeeObject thus has a location in the ZeetixDomain in addition to any other spatial domain it may be associated with. A ZeeDomain may be represented with a custom ZeeMap. The ZeetixDomain may be presented in one or more Zeetices or Zeetix Mashups.

As used herein, the term "ZeeGuide™" or "Zeetix Guide" will be used to encompass one or more ZeeMaps and/or Zeetices, together with software, including user interface software, that associates information, data, and programs, including but not limited to ZeeObjects with one or more ZeeMaps and/or Zeetices in one or more ZeeDomains. A ZeeGuide may be considered as an interactive counterpart to an electronic document, such as those created with Word, Excel, and PowerPoint. A ZeeGuide may optionally be web-based.

Thus, in embodiments, a ZeeGuide might be presented in a window of web browser, divided into one pane that contains the ZeeMap and another pane that contains a tree of widgets that allows the user to manipulate the ZeeMap and the information presented within it.

As used herein, the term "ZeeTool™", or "Zeetix Development Tool", shall mean a tool (which may include a Zeetix, a software tool, a service (including a web service), a program, or the like) (optionally associated with one or more ZeetixDomains) and used to create, delete, browse, modify, manipulate, store, search, transmit, receive, query, view, or otherwise interact with any ZeeObject. A ZeeTool includes, but is not limited to, entities that correspond to more conventional development tools such as compilers, editors, debuggers, inspectors, report generators, database tools, services, web services, logging tools, version management tools, search tools, query tools, and similar tools.

Any Zeetix can be combined with any other Zeetix that shares a common spatial domain. This ability to synthesize "composite" Zeetices enables a rich variety of user experiences. For example, one Zeetix might provide an interactive store location map for Starbucks. Another Zeetix may provide an interactive map of municipal services such as bus stops, subway stations, and parking garages. The user can integrate these into a single Zeetix showing which bus stop, subway station, or parking garage is closest to a particular Starbucks location. An embodiment of these relationships is illustrated in FIG. 1.

In other embodiments a Zeetix may be combined with another Zeetix that has a different spatial domain, where the domains are linked, such as by visual presentation of the different spatial domains in proximity to each other. For example, a Zeetix showing an organization of retail stores within a company's hierarchy of retail stores may be associated with a geographical Zeetix that shows the physical locations of the stores.

As used herein, the term "ZDE™" or "Zeetix Development Environment" shall mean an environment (itself optionally a Zeetix) including one or more arbitrarily interconnected ZeetixTools sharing any number of ZeetixDomains. For example, one ZeetixTool might be a Python language code source-code browser, allowing a developer to create and edit Zeetix classes and methods expressed in the Python Language. Another ZeetixTool might be a debugger, allowing a developer to single-step through the execution of a particular method, showing the source code line-by-line, current values of variables and parameters, and presenting other visualizations of local and global system state. A developer can then integrate these into a single ZDE, allowing the developer to create, edit, and debug source code within the same ZDE, in embodiments all through a web browser.

A Zeetix may be enabled by a variety of technology platforms, including platforms for networked computing, such as network technologies (including broadband, wireless, LAN, WAN, Internet and other network technologies), computer technologies (such as computer systems that support high-performance graphical user interfaces), database technologies, computer programming technologies, such as cross-platform and cross-browser support for standard, non-proprietary, and expressive client-side scripting languages, technologies that support asynchronous communication between browsers and servers, allowing user interaction to occur in parallel with server communication, and technologies that support widespread availability of audio, video, and high-resolution still imagery.

A Zeetix may be supported by a collection of web-based elements built upon a published map application programming interface, such as, but not limited to, the Google Map Application Programming Interface ("API"), but Zeetix is conceptually independent from the underlying rendering technology. A Zeetix may be built by JavaScript within a web browser and may communicate via a common data format (e.g. eXtensible Markup Language ("XML"), RSS, HTML, or other data format) with a choice of any server-side programming language.

Zeetix may be maintained in several different ways, including through a development corporation and its franchisees, such as in a hosted computing or application server model of distribution. Zeetix users may have the ability to create a Zeetix server and cache, thus allowing Zeetix to service that community.

In certain embodiments, a Zeetix is an object-based method and system in which each ZeeObject may have one or more optionally immutable "versions". A version of a ZeeObject may be created by dynamically changing an earlier version of the same ZeeObject or by creating an altogether new ZeeObject. This allows each version of each ZeeObject to be freely copied and cached. When a ZeeObject needs to change, a new version is optionally created to hold the resulting change. Thus, changes ripple through the distributed environment like waves through water. Producers publish changes by issuing a new set of versions. Consumers receive changes by choosing to load the new set, but in embodiments older sets can be always available. Versions may be associated with tags, hypertext links, metadata or other components to allow for recognition of attributes of particular versions, such as the author, date of creation, purpose, owner, or other attributes.

Each ZeeObject version optionally has a globally unique, persistent identifier of arbitrary length (a "ZeeTicket™"). In embodiments a Zeetix includes a collection of ZeeTickets. In embodiments Zeetix objects are constructed so that no two Zeetix objects have the same ZeeTicket. In embodiments a Zeetix object may be made persistent, so that once issued, a ZeeTicket and the object it identifies continue to be available. Physical constraints of the material world mean that for some ZeeTickets, the access time for the ZeeObject identified by a ZeeTicket might be arbitrarily long. For example, a human operator might need to locate and load an offline storage volume from an archival facility in order to respond to a request for a ZeeObject with an old and seldom referenced ZeeTicket.

A ZeeObject may be stored in a data storage facility, termed a Zeetix object store, or ZeeStore™, which may consist of a repository of ZeeObjects, optionally referenced by ZeeTickets. Each ZeeStore is itself an object and therefore has a ZeeTicket. A ZeeStore may contain objects that are copied from one or more other ZeeStores. In embodiments a ZeeStore may also contain new versions of ZeeObjects copied from one or more other ZeeStores. A ZeeStore may also contain newly constructed objects. In embodiments each new ZeeStore arises from an existing ZeeStore.

A ZeeObject cache, or ZeeCache™, may be a ZeeStore that does not create ZeeTickets or ZeeObjects. A ZeeCache may, for example, exist only in memory, or it may use some form of storage.

A Zeetix virtual system, or ZeeSys™, may optionally encompass an abstract system that exists only to execute a fragment of a program or process. A "process" creates a context within a specific physical system for a given program to execute. The process is created for that program (by a shell, for example) and disappears when the program terminates. A Zeetix Virtual System may optionally be an entire system created to execute a given process. A ZeeSys may be created in order to run that process and optionally disappear when the process finishes.

A program or process that requires capabilities not provided by an existing ZeeSys may be supported by the creation of a new ZeeSys "above" the first, such that the new ZeeSys provides the necessary capabilities. A dynamic "tower" of ZeeSys instances may be thus formed, each providing capabilities different from the ZeeSys instances above or below it in this "tower." The term "level-shifting" refers to operations that shift execution up or down the levels of this ZeeSys tower. This ZeeSys tower thus may escape the limitation of a conventional virtual machine, such as the Java or dot-net virtual machines, which provides a relatively-fixed "greatest common denominator" of capabilities and cannot support programs or procedures that require capabilities not included in the virtual machine.

As used herein, the term Continuation, as context permits, should be understood to encompass a representation of the execution state of a program (for example, the "call-stack" or values of variables) at a certain point.

A ZeeSys is optionally a level-shifting processor that runs a program by explicitly running another program that interprets the first. The ZeeSys is optionally based on continuations, so each stage of a computation needs just enough resources to compute that stage and then invoke a continuation implicitly or explicitly associated with it.

The ZeeSys is optionally a causally reflective environment that optionally, like Java, contains a description of itself and, like Smalltalk, derives its behavior from its description of itself. Changing the self-description of a causally reflective environment changes the behavior of the environment. Changing the self-description of an environment like Java simply breaks the environment.

Combined with the ZeeStore, and exploiting the optional immutability of ZeeObject versions, a ZeeSys is thus maximally portable and scalable. Since Zeetix is optionally a pure object system, and since every distributed ZeeObject version is immutable, a ZeeSys can be instantiated whenever and wherever the necessary ZeeObjects are available.

Execution of a program or process within a ZeeSys may be more modular than in existing virtual machines. Creation of a ZeeSys is lightweight and fast. Thus, execution of an arbitrary number of programs or processes may be arbitrarily distributed among an arbitrary number of optionally-interconnected physical computer systems across the web. Zeetix thus optionally employs directed-graph computing, an alternative to grid computing through its creation of a distributed computation engine with globally unique persistent identifiers.

A Zeetix Engine™ may encompass the combination of one or more ZeeSys instances operating on an arbitrary number of ZeeObjects provided by an arbitrary number of optionally interconnected ZeeStore instances and, in certain embodiments, running on an arbitrary number of optionally interconnected physical computer systems distributed throughout the web.

In embodiments, browsers or servers can run as much or as little of one or more Zeetix Engines as they need, on a per-process, per-program, or even per-task basis. Thus, the effect is that the entire web becomes one or more emergent Zeetix engines, constantly adapting, evolving and tuning itself or themselves to the dynamic requirements of its users, hosting providers, and communication capabilities.

A "ZeeTrans™" or "Zeetix Transformer" as described herein may encompass an arbitrary number of arbitrarily interconnected programs or processes that convert one language representation of an entity into another. The transformation may use conventional data transformation techniques, such as parsing techniques, bridge-type data transformation techniques, message brokers, message queues, metabrokers, and the like.

A "ZeeBinding™" or "Zeetix Binding" as described herein shall encompass a binding, such as a Zeetix transformer that converts, where possible, between a canonical description language and a programming language, such as but not limited to Java, Javascript, Perl, Python, Smalltalk, Lisp, or any other language, together with the entities including, but not limited to, the data structures, memory, processes, objects, methods, classes and similar components that comprise a Zeetix. In embodiments a ZeeBinding may be a viewpoint or representation of a Zeetix or ZeeEngine, as opposed to a conversion or traversal of the entire Zeetix or ZeeEngine.

Through a Canonical Description Language ("CDL") or similar description language and various ZeeBindings, a developer may use his or her programming language of choice, thus bootstrapping the growth of a vibrant developer community. For example, a Python developer could use a Python ZeeBinding, dynamically created by a Python language ZeeTrans applied to a ZeetixEngine such that the Python developer views the ZeetixEngine and all of its components in Python. A second developer could use a JavaScript ZeeBinding, dynamically created by a Javascript language ZeeTrans applied to the same ZeetixEngine such that the Javascript developer views the same ZeetixEngine and all of its components in Javascript. The Python and Javascript ZeeBindings binding allow the Python developer and Javascript developer equivalent, simultaneous and parallel access to ZeetixEngine's functionality. This equivalent, simultaneous, and parallel access specifically includes, but is not limited to, creating, editing, updating, and otherwise modifying data structures and code that is simultaneously visible to each developer.

Owing to its architecture, Zeetix can be accessed through any interface supporting a web client, including desktop and mobile devices. Indeed, some of the above examples are most powerful in a mobile context.

FIG. 1 describes how a Zeetix is comprised of one or more overlay layers, each viewing one or more Zeetix Maps that may, in turn, be processed by a Zeetix Raster Image Processor. Each Zeetix is comprised of Zeetix objects. Each Zeetix object 116 may have one or more visual representations that are rendered at specific locations on one or more overlay layers, as well as optionally being rendered on one or more Zeetix Maps. Each Zeetix object is optionally identified by a ZeeTicket 114. A Zeetix may be capable of a layer-to-layer navigation system because of the logical associations between layers 112. Multiple layers within the same spatial domain can be simultaneously represented within a Zeetix. The spatial coordinate system allows the user to zoom in or out 104, pan the view horizontally or vertically 102, rotate and tilt 108, and link to different views 110. That is, the Zeetix allows navigation within the entire spatial domain defined by various spatial coordinates (e.g. x, y . . . ), and between layered representations containing different forms of information 118 (e.g. between the layers defined by x and y and the layers defined by i and ii and the layers defined by a and b). These spatial coordinates include x-y or x-y-z coordinates, latitude-longitude coordinates, spherical, true map, project map, video/photo, gene pathways, patent trees, and Mercator projections, among others.

A ZeeMap may be created for use within Zeetix by an image manipulation facility termed a "ZeeRIP™" or "Zeetix Raster Image Processor". A ZeeRIP may consist of an arbitrary number of interconnected programs, processes, and other computer resources. A ZeeRIP accepts an arbitrary number of images to be processed, provides an arbitrary number of input, output, control and status interfaces, and produces a collection of related images suitable for presentation to the user in a browser, desktop application, or other suitable presentation technology. A ZeeRIP may specifically emit image "tiles", at varying image resolutions, compatible with the "custom map" provisions of the Google Map API, but a ZeeRIP is conceptually independent from the requirements and specifications of the programs or processes that consume its output or provide its input. A ZeeRIP is specifically intended to encompass the preparation of video or other animated output media.

An arbitrary number of the rich variety of web interfaces provided and supported by Zeetix may be created using a ZeeBuilder™ or "Zeetix Site Builder". As used herein, the term ZeeBuilder encompasses an arbitrary number of interconnected programs, processes, and other computer resources that create, edit, and maintain the contents of web-based elements such as web sites, web pages, and web services. A ZeeBuilder shall specifically emit web sites constructed from standards-compliant xhtml, css, javascript, and similar languages and formats, but a ZeeBuilder is conceptually independent from the elements, languages and formats it emits. In certain embodiments, a ZeeBuilder may reflect and maintain the underlying structure of the collection of pages that comprise a site, such that it maintains certain constraints among them, including but not limited to, margin settings, styles, font choices, and any other web design element. In certain embodiments, a ZeeBuilder may optionally be comprised of one or more ZeeSys instances, ZeeObjects, and may itself be a Zeetix Mashup. A ZeeBuilder may optionally be part of or included in a ZDE.

ZeeBuilder may optionally use, emit, or be controlled by an external file, data structure, or information stream. In embodiments, this stream may optionally be formatted as xml, and may be read and written by external programs such as, but not limited to, Microsoft Visio 2003. ZeeBuilder may construct or use data structures analogous to Microsoft Visio "Shapesheet" instances, and may construct or use ZeeObjects that correspond to them. Thus, external drawing programs such as, but not limited to, Microsoft Visio may optionally be used to create, manipulate, and update the various resources generated by ZeeBuilder, including but not limited to web sites, web services, and other xhtml or css resources.

As used herein, the term "ZeeString™" or "Zeetix String" shall encompass an arbitrary number of possibly interconnected objects that, taken together, emit a set of consecutive characters that dynamically model and reflect certain constraints among those characters and among groups of those characters. A ZeeString may be a "Primitive ZeeString", meaning that has no underlying structure, or it may be a "Composite ZeeString", meaning that it is comprised of an arbitrary number of either Composite or Primitive ZeeStrings. A ZeeString may be comprised of ZeeObjects, and a ZeeString may itself be a ZeeObject.

In certain embodiments, one or more of the components that comprise a Composite ZeeString may be either a "piece" or a "token". A "piece" is a ZeeString, either composite or primitive, that may optionally be sequentially combined with other pieces or divided into additional pieces, without changing the sequence of characters emitted by the Composite ZeeString that it is part of. A "token" is a ZeeString, either composite or primitive, that may be optionally replaced by another ZeeString while the Composite ZeeString that is part of is emitting its sequence of characters.

A ZeeString may thus, under the control of an arbitrary number of internal or external "markup" syntaxes, including but not limited to xml, xslt, and similar markup languages, be viewed as a modular templated string, with arbitrarily deep object structure. The tokens in a ZeeString may optionally, under the control of an arbitrary number of possibly interconnected programs and processes, be replaced with other ZeeStrings.

The markup of a ZeeString instance can thus be derived from the ZeeString, and vice-versa, given arbitrary external markup syntax.

The markup and subsequent processing of a ZeeString is thus independent from the contents and results of particular markup syntax. The same ZeeString instance will emit the same set of consecutive characters and have the same markup, whether the syntax of that markup is expressed in xml, xhtml, or some other arbitrary syntax.

In certain embodiments, the structure of a ZeeString is well-suited for storing components of a composite ZeeString in a ZeeStore, relational database, file system, or other data storage facility, while the ZeeString itself is stored in a different data storage facility. This, in turn, means that the components that comprise a ZeeString may be readily accessible to and by web-based search engines, specifically including but not limited to the Google search engine, while the ZeeString itself is in a data storage facility that is inaccessible to any search engine.

Figure 2:
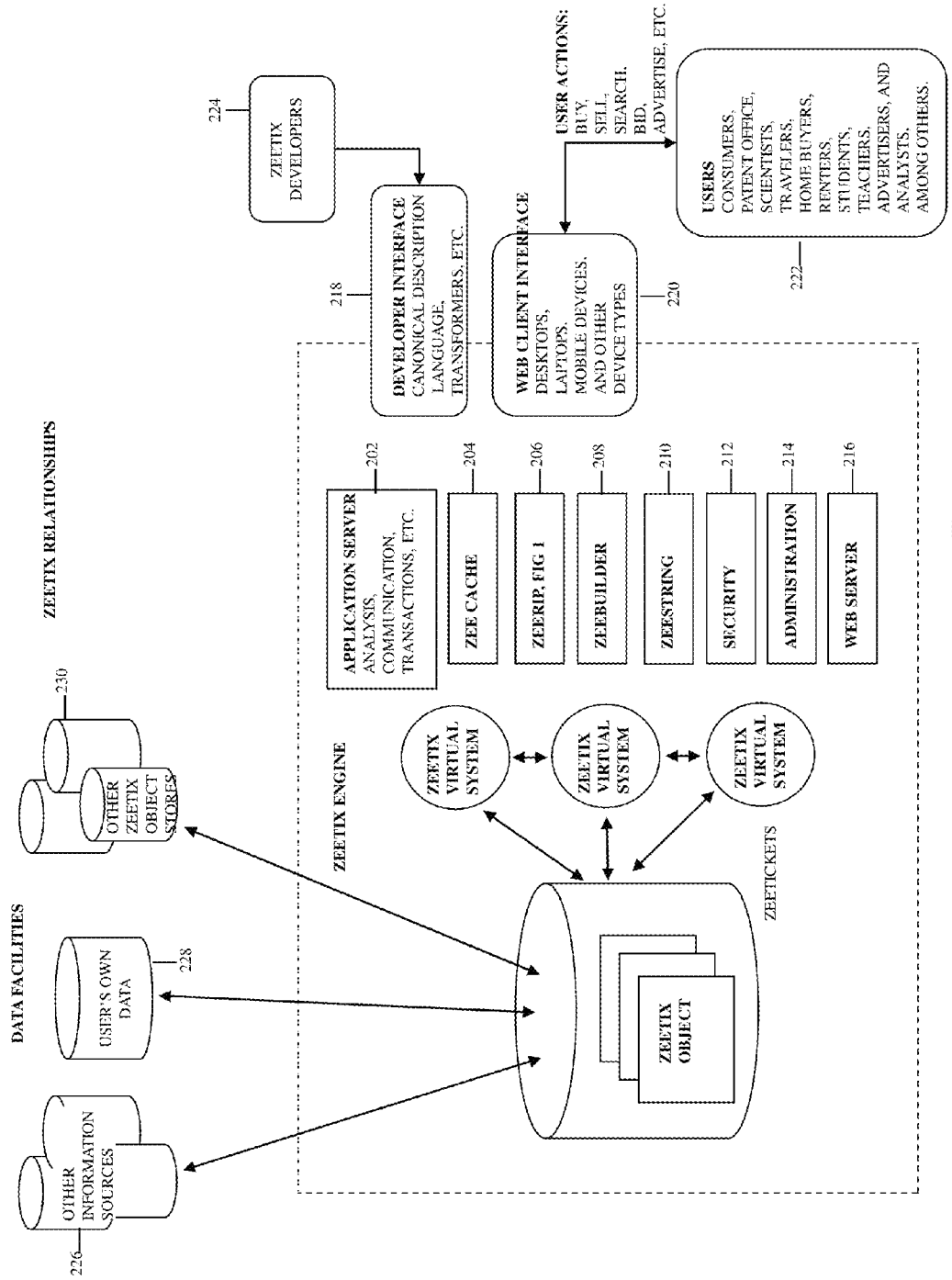
FIG. 2 depicts high-level components of a system that supports the layers and objects of FIG. 1, as well as various relationships among such internal and external system components and entities.

The relationships between the ZeeStores, Zeetix Virtual Systems, ZeeEngines, Zeetix users, and Zeetix developers are illustrated in FIG. 2. ZeeTickets can originate from various data facilities, such as the user's own data 228, other ZeeStores 230, or other information sources 224. Within a ZeeEngine, these ZeeTickets identify and reference the ZeeObjects detailed in FIG. 1. ZeeTickets are processed by any number Zeetix Virtual Systems. A ZeeEngine may also comprise an application server that handles analysis, communication, and transactions 202; any number of ZeeCaches 204; any number of ZeeRIPS 206, any number of ZeeBuilders 208, any number of ZeeStrings 210, facilities for security 212 and administration 214; and any number of web servers 216.

A Zeetix Virtual System may contain separate interfaces for developers 224 and end users 222. The developer interface 218, including one or more ZDEs, may consist of one or more ZeeTrans or ZeeBindings that allow the developer to work within one or more preferred programming language(s). Through this developer interface, the developer can create programs and processes that run on an arbitrary number of Zeetix Virtual System instances. The web client interface 220 allows various types of users to perform a wide array of user actions on the user's desktop, laptop, mobile device, or other device type. Users encompass consumers, scientists, travelers, homebuyers, renters, students, teachers, advertisers, analysts, and Patent Office employees, among others.

A "ZeeTag™" or "Spatial Tag" as described herein may be a generalization of a more common "geotag". A geotag may associate data with a location in a geographic (e.g. latitude/longitude) coordinate space. Zeetix supports a concept of a spatial domain, or ZeeDomain as described herein, of which geography (e.g. geotag) is a single instance. A conventional geotag may thus be a special-case of a more general ZeeTag. A ZeeTag may be used to associate spatial information in a specific spatial domain with any object (including a ZeeObject), program, information, or other data.

A ZeeTag may include a reference to a specific ZeeDomain, and thereby may contain an arbitrary number of coordinate locations within that domain, such as one for each dimension of the domain. A ZeeTag may be described using an xml representation. That xml representation might include a namespace declaration, such as ZeetixLLC and the ZeeTag might further specify a location within the namespace. In an example, a ZeeDomain is defined and given a global identifier "Zeetix1234". The Zeetix1234 spatial domain has three dimensions represented by X, Y, and Z. The spatial domain also references an arbitrary object with a ZeeTicket of "zee2345". An XML representation of a ZeeTag in this example may include:

```
<span style="display:none"
    xmlns:zeetag="http://www.zeetix.net/zeetag#">
        <zeetag:domain>Zeetix1234</zeetix:domain>
        <zeetag:x>424</zeetag:x>
        <zeetag:y>242</zeetag:y>
        <zeetag:z>456</zeetag:z>
        <zeetag:object>zee2345</zeetag:object>
</span>.
```

The XML representation of the ZeeTag above may persistently identify a location for the object whose id is "zee2345" at the (x, y, z) tuple of (424, 242, 456) within the zeeDomain whose identifier is 'Zee1234'.

If ZeeObject "zee2345" were a ZeeMarker, then a ZeeIcon for this ZeeMarker would be rendered at the specified (x, y, z) location within Zeetix1234 whenever a ZeeGuide is displayed that references a ZeeMap that renders this zeeDomain.

A "ZeeStitch™" as described herein may be a reification of a relationship between an arbitrary number of "left-hand" objects and an arbitrary number of "right-hand" objects. A ZeeStitch may allow a relationship between collections of objects to change without changing contents of the objects that participate in the relationship. A ZeeStitch may contain a list of its "left-hand" objects. It may also contain another list of its "right-hand" objects.

A ZeeStitch may contain a "left-hand name" that may be a name by which the right-hand objects are known to each object in the left-hand list. A ZeeStitch may contain a "right-hand name" that may be a name by which the left-hand objects are known to each object in the right-hand list. Each instance of ZeeStitch may be used to allow each object in its left-hand list to refer to its right-hand objects and vice-versa.

In an example, without limitation, four kinds of ZeeStitch instances are used in embodiments: ZeeManyToOneStitch: Many left-hand objects have a relationship to one right-hand object. ZeeManyToManyStitch: Many left-hand objects have a relationship to many right-hand objects. ZeeOneToManyStitch: One left-hand object has a relationship to many right-hand objects. ZeeOneToOneStitch: One left-hand object has a relationship to one right-hand object.

A "ZeeSpatialStitch" as described herein may be instances of a ZeeStitch that may allow objects in multiple ZeeDomains to be arbitrarily interconnected using instances of ZeeSpatialTags from multiple domains. In an example, a factory may be represented by a geographic ZeeTag in a geographic ZeeGuide of suppliers. The factory may also be represented by a ZeeTag for the same factory in a zeeDomain defined by a visualization of a distribution network that the factory participates in. A ZeeOneToOneStitch might be used to join this factory into both ZeeDomains, so that ZeeGuides in each domain can be readily interconnected.

A "ZeeTile™" as described herein may facilitate tiled access to information that has an associated spatial component. This information specifically includes, but is not limited to, the target of any ZeeTag. Modern web-based interactive maps may use layers of pre-computed image tiles, stitched together at their edges, to deliver spatially-organized imagery to browsers. Zeetix may couple information, programs and data with these interactive maps. The information, programs and data used by Zeetix may be kept in a ZeeStore, where it may be arbitrarily associated with spatial information. Spatially organized information, programs and data, when retrieved from a ZeeStore, may often be retrieved at a spatial "grain size" that corresponds to the tiles with which the zeeDomain associated with the data is rendered. A ZeeTile is thus an aggregation of information associated with a specific area within a ZeeDomain. A ZeeTile may be pre-computed for more rapid access.

In an exemplary use of a ZeeStore, the results of a spatial query that corresponds to an image tile are likely to change infrequently in comparison to requests for that data. Thus, the results of these spatial queries can be precomputed and cached for timely delivery along with the associated image tile. A ZeeTile may be associated with a pre-computed spatial query. The data in each zeetix that comprises a ZeeTile may be layered, and so the ZeeTile itself may also be layered. In an example, a ZeeTile for a given map tile might be comprised of a hotel tile for that map tile, containing just the hotels, a restaurant tile containing just the restaurants, a hospital tile containing just the hospitals, and so on. An example of a ZeeTile embodiment is described in association with the embodiment of FIGS. 30-32.

A ZeeCursorWidget or "Zeetix Database Cursor Widget", as described herein, is a user interface widget that may provide a visualization of and control over a database cursor. Database visualization and navigation may benefit from the methods and systems herein described. In an example of database visualization, a web-based ZeeCursorWidget might control queries that return an ordered collection of results that correspond to a scalar query quantity. In an example, data samples from an experiment that was run at various temperatures may be stored in a database. The query quantity may be "temperature", and the returned data may be the collection of data samples ordered by temperature. The cursor widget might include a bar, perhaps a horizontal or vertical bar that represents an extent of the underlying data (data samples of the experiment). Within the bar, a user adjustable indicator, such as a highlighted portion of the bar, may reflect a range of temperatures to be input as the scalar query quantity. The position and size of the temperature range indicator within the data extent bar may be controlled by the user, perhaps through movements of the mouse, pointing device, or scroll wheel. The positioned and sized temperature range indicator would be input, such as through a user clicking a mouse button. Alternatively the data returned by database query may dynamically reflect the state of the widget as it is manipulated by the user. If the user makes the temperature indicator very small, a smaller number of results may be returned because the range of the query is restricted. If the user makes the temperature indicator larger, a large number of results may be returned, because the range of the query is enlarged. If the user moves the temperature range indicator to the left (down), the samples closer to the left-most (bottom) extreme may be returned. If the user moves the temperature range indicator to the right (top), the samples closer to the right-most (top) extreme may be returned. Examples of a ZeeCursorWidget are included in exemplary embodiments described elsewhere herein.

In another example of ZeeCursorWidget, a user, Jim is browsing a historical archive of a hyperlocal publishing source. He uses the ZeeCursorWidget to determine the time period of the stories that appear on a ZeeGuide. He is interested in the history of the Faneuil Hall neighborhood in downtown Boston. The displayed Zeetix Database Cursor Widget shows, using a legend underneath it, that the archive contains stories ranging from the early 1800s to today. The query range indicator is, by default, set to span a week and is positioned at the right-most (latest) end of the widget. The map shows the stories from the most recent week. Jim uses his scroll-wheel to enlarge the query input indicator to span an entire year. The ZeeGuide fills with markers, because the archive contains many stories for the current year in the currently-visible neighborhood that includes Faneuil Hall. Jim uses his mouse to slide the query input indicator back towards 1960, because he is interested in events during the 1960 election campaign. Fewer markers appear, because the archive contains fewer stories pertaining to the Faneuil Hall neighborhood in 1960. He uses his scroll-wheel to narrow the query input indicator so that it covers a month instead of a year, and uses the mouse to select "November" of 1960. A marker appears over Faneuil Hall itself, indicating that multimedia content is available. Jim double-clicks the marker, and sees that John F. Kennedy gave his election-eve speech from Faneuil Hall on Nov. 7, 1960. He sees links to a transcript, an audio recording of the speech, and newspaper photographs of the event.

Data sources for a ZeeCursorWidget may include database queries, sequential file systems, data that includes attributes that facilitate sequential ordering, and the like.

This ZeeCursorWidget may include both an interaction model and multiple visualizations. The interaction model may display a minimum and maximum range of a sequential collection of data to a user. It may allow the user to specify a minimum and maximum range of a subset of that data that is of interest to the user. It may encourage a visualization that presents these relationships in a visually compelling way. The presentation model may make spatial geometry isomorphic to the data query embodied by the widget. Multiple visualizations may be expected for the same widget, perhaps at the same time. The state of the widget may correspond to the state and results of a query on the underlying data and database presented by the widget. In some embodiments, changes in the widget might be reflected at the end of a user interaction with the widget, such as when the user releases the mouse button during a "drag". In other embodiments, changes in the widget might be reflected dynamically as the user interacts with the widgets, such as while the user is dragging the query input range indicator while depressing the mouse-button.

The ZeeCursorWidget and ZeeGuide example may be generalized in that visualizations may include a variety of presentation formats, including but not limited to pie-segments within disks, nested rectangles, multiple marks on an axis, and so on. Also, user interaction devices include but are not limited to mouse movements, key stroke combinations, physical and virtual dials and knobs, text entry fields, and communications with other programs and services.

Zeetix is applicable to a variety of markets and applications in which information can be spatially visualized.

Homebuyers want to see a variety of information when selecting the community in which they want to live, as well as information regarding a home for sale within the community. Buyers may be interested in the standardized test results for the local elementary school; environmental waste sites within a three-mile radius; road traffic patterns at rush hour; aircraft flight paths to local airports; the incidence of violent crime within the local area; proximity of restaurants and coffee shops, and their ratings by consumer review websites; proximity to public transportation with links to fare and schedule information; how property values and property taxes have changed over the past five years; zoning information linked to local ordinances; and local houses of worship, among other points of interest.

A Zeetix franchisee might recognize the market opportunity for information that meets the need described above. The Zeetix franchisee's developer might use a Python ZeeBinding and ZDE that presents a Python language view of a Zeetix-Engine. This ZDE might create Zeetices that contain ZeeObjects with geographic coordinates of home sales data received from other ZeeStores combined with home descriptions from the franchisee's own data sources. The developer could administer the security settings within his or her Zeetix-Engine to allow subscriber-only access. The franchisee could then market access to this newly-created Zeetix as a subscription-based service.

A customer with a valid subscription could access this Zeetix by using his or her mobile device to search for available homes in his geographic area. The customer could navigate between layers to see the home descriptions matching his price range in the geographic area described by the Zeetix and internally represented as ZeeObjects. Furthermore, the customer could link out to see how the local elementary school is ranked within the state's standardized test results, or how crime statistics have changed within the area over the past five years. The other types of information described above as of interest to a potential homebuyer could be represented as ZeeObjects rendered on separate layers accessible via the layer-to-layer navigation scheme made possible by a shared spatial domain and embodied in the Zeetix.

The franchisee could also market the virtual space described by the geographic coordinates. For example, the franchisee could lease the virtual space corresponding to a "hot" physical real estate neighborhood to mortgage lenders, moving companies, or other commercial ventures of interest to the potential homebuyers who form the user base. These advertisements would comprise an additional layer of information within the shared spatial domain of the Zeetix.

Thus, a Zeetix can establish a virtual spatial property in which one or more "owners" can develop a spatial area, such as around a visual representation of a real property or a visual representation of a virtual property. The area around a virtual property of interest can be developed, such as by providing icons, branded elements, links, media components or the like, such as ones that lead to other Zeetices or layers of a Zeetix. For example, clicking on an advertisement near a store in a virtual geography could lead into a web site of the advertiser, into another virtual space associated with the advertiser, or to any of a variety of related Zeetices, such as a deeper layer of the same Zeetix. The owner of the virtual property could be rewarded for click-throughs, purchases, or the like.

Other exemplary, non-limiting real estate scenarios that may be supportable in a Zeetix include residential sales, urban apartment rentals, and short-term and vacation rentals.

Figure 3:
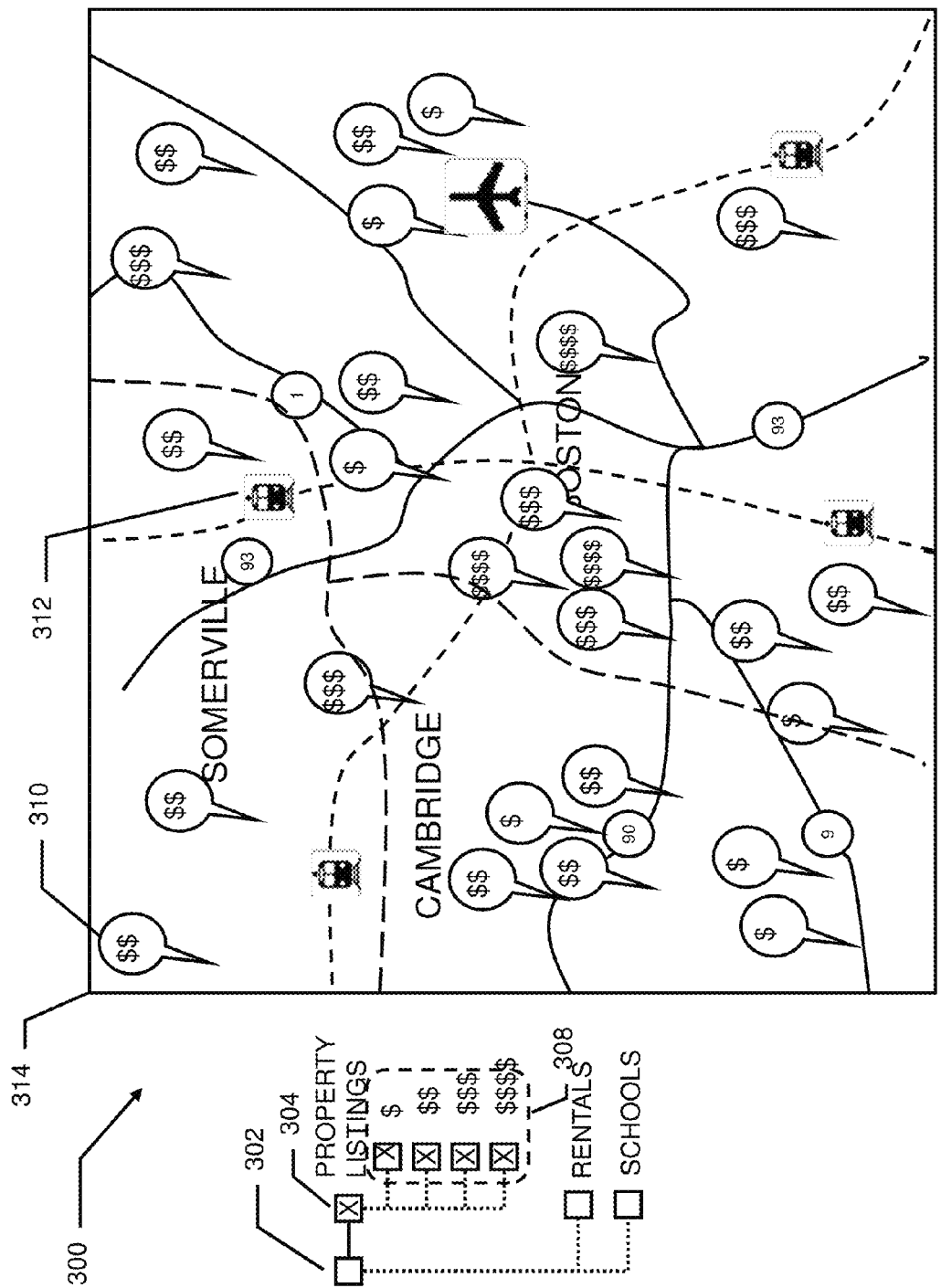
FIG. 3 depicts a visualization of objects including a selection of objects to visualize.

FIG. 3 depicts a ZeeGuide created to present homes available for sale to potential buyers. The ZeeGuide may be based on listings for a specific broker or for many brokers so that a user may view each broker's listings. A home buying ZeeGuide 300 may include an object visualization tree 302 which may further include a property listing branch 304. The ZeeGuide 300 may include a ZeeMap 314 of a residential area that may display 'for sale' objects 310 marking properties for sale. The markers may include each broker's artwork to visually indicate which properties are listed by each broker. The visualization tree 302 may allow a user to select categories of the listings 308, such as based on price, number of bedrooms, lot size, number of floors, square footage, car garage size, and other aspects of the property. The ZeeGuide 300 may facilitate viewing the listings by location instead of in a typical linear table or sequential page listings. The ZeeGuide map 314 may also show schools, school districts, zoning regions, school bus routes and pickups, flood zones, terrain or elevation, and the like. The ZeeMap 314 may include markers for transportation public transportation 312, and the like.

Figure 4:
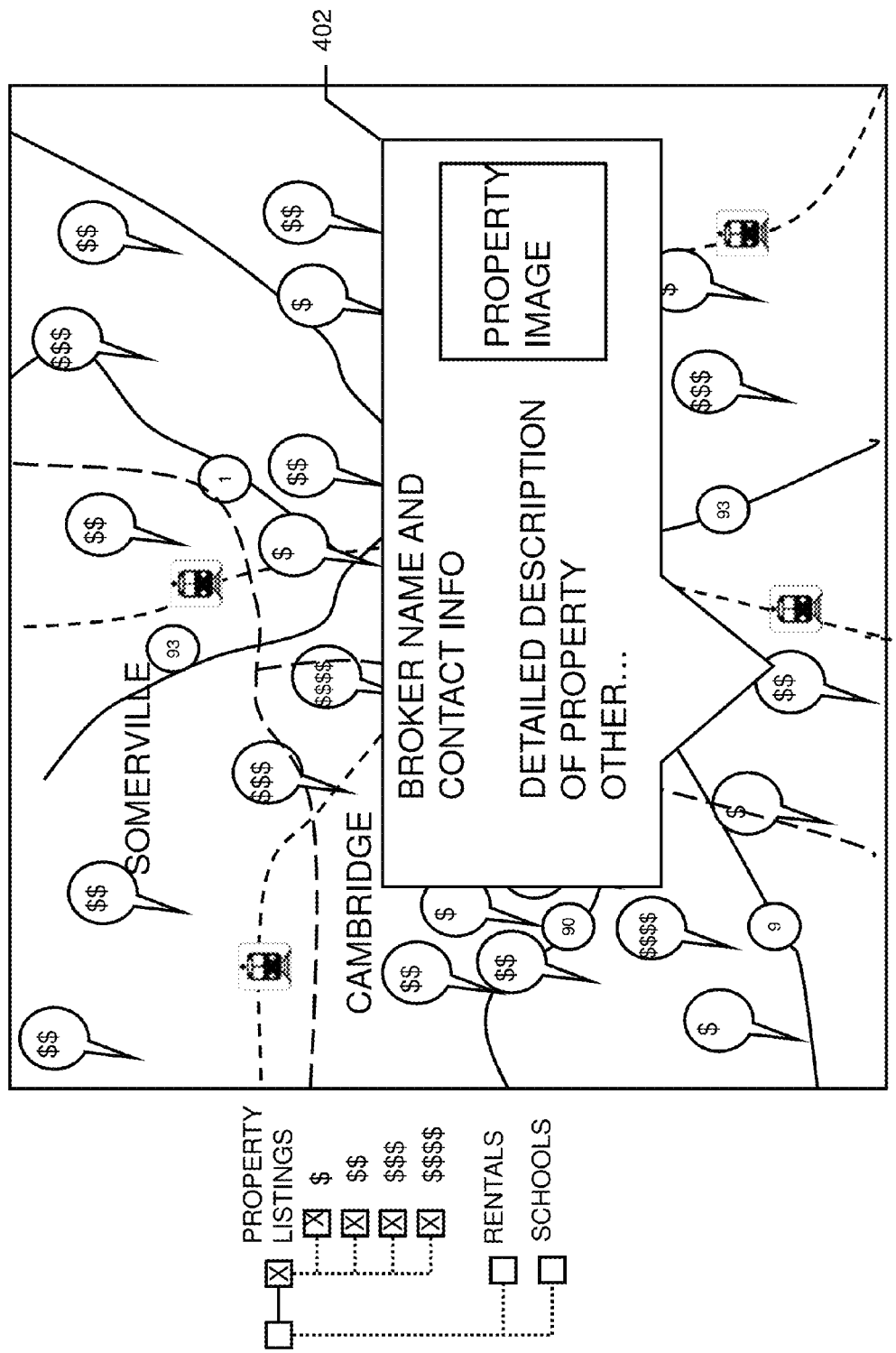
FIG. 4 depicts detailed information overlaying the embodiment of FIG. 3.

As shown in FIG. 4, selecting a marker at any of the levels of zoom, such as by double clicking the marker or positioning a cursor over the marker, may open a ZeeWindow 402 that facilitates establishing a relationship with the broker or may provide greater detail about the listing, such as asking price, history of price adjustments, broker commission plan, seller disclosure, and the like.

As shown in FIG. 5, by selecting various visualization objects 508 or types of objects in the visualization tree, a different ZeeMap may be displayed. The ZeeMap of FIG. 5 is a school zone ZeeMap 504 that includes markers for objects selected in the tree. In the ZeeMap of FIG. 5, shopping centers 510 and recreation 512 are selected and markers for shopping centers 510 and recreation 512 are rendered on the map.

FIG. 6 depicts a population density ZeeGuide in which a user has selected population density information 602 in the object rendering and visualization tree. In the ZeeGuide of FIG. 6, the population densities are represented by various patterns 604 to indicate geographically a distribution of population densities matched with homes available for purchase.

Figure 7:
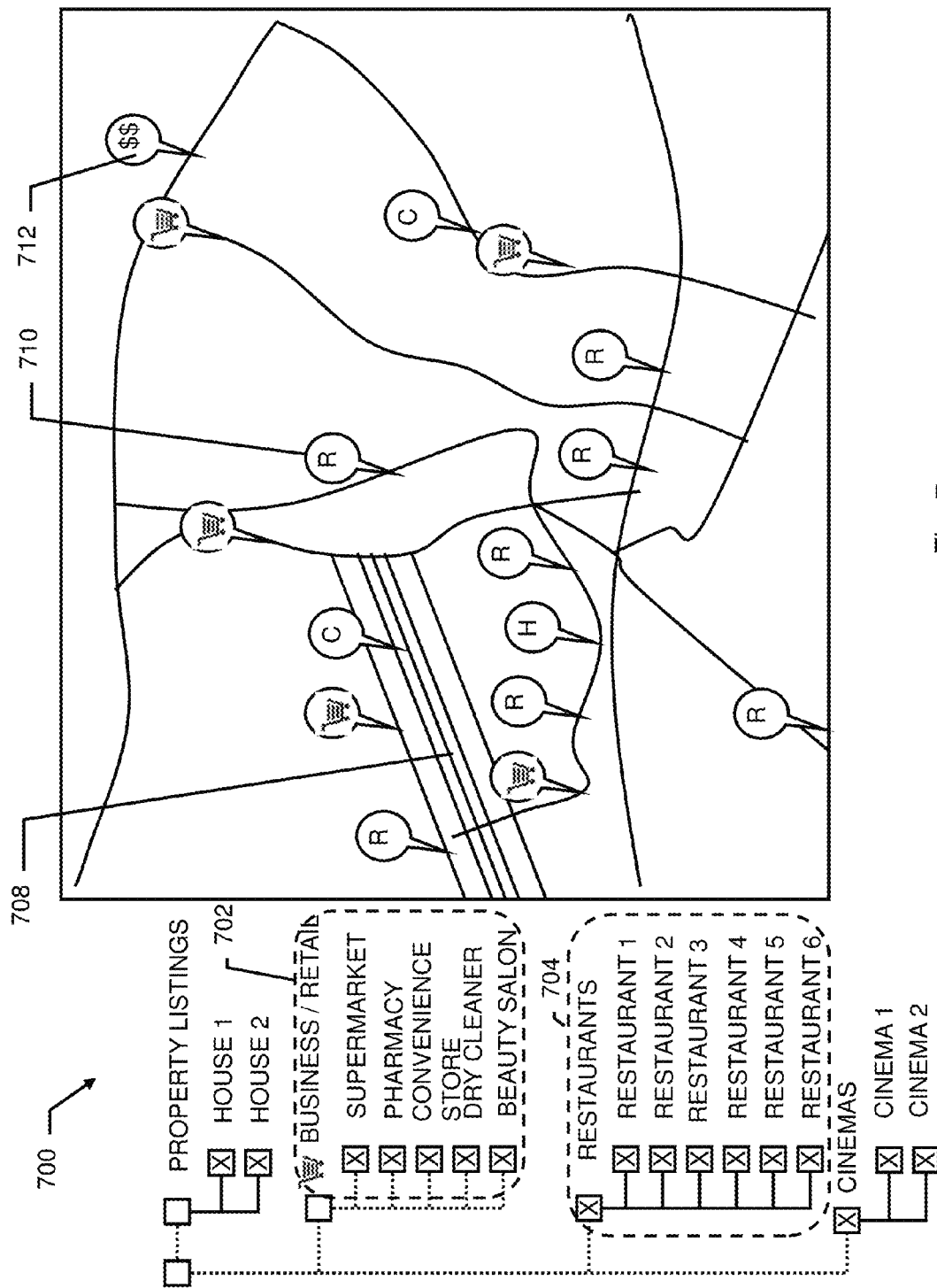
FIG. 7 depicts a detailed mapping visualization of a layer showing objects in close spatial proximity.

FIG. 7 depicts a ZeeGuide zoomed by the user through the navigation features of the map. The navigation features may allow a user to zoom in or out, such as zoom into a specific neighborhood, a specific street, intersection, address, and the like. The ZeeGuide 700 of FIG. 7 includes rendering options in the visualization tree for a variety of details that a home buyer may find of interest including business/retail 702, restaurants 704, and the like. Markers for these objects (e.g. restaurants 710), and other objects such as homes for sale 712, highways 708, and the like may be displayed on a ZeeMap portion of the ZeeGuide 700.

Figure 8:
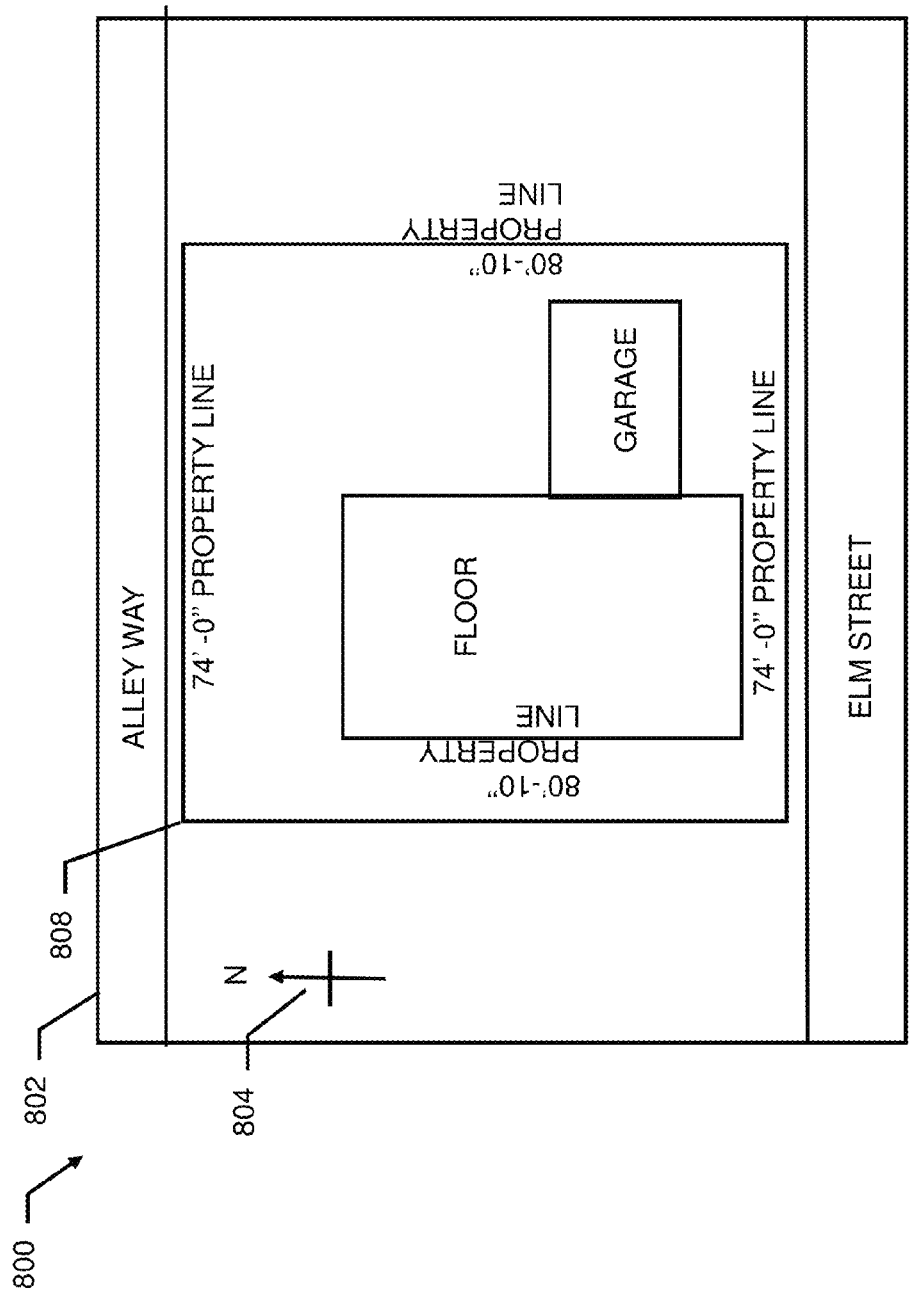
FIG. 8 depicts a detailed mapping visualization of a plot plan object.

FIG. 8 depicts a detailed ZeeGuide of a home for sale. The zoom and navigation features of the map may allow a user to zoom deeper into an individual plot plan ZeeGuide 800 (e.g. from a county real-estate sale registry) or perhaps to view a floor plan of a home or other dwelling. The plot plan ZeeGuide 800 may include a ZeeMap 802 that may include a compass indicator 804 to help orient a home buyer, a plot plan 808, and surrounding features such as roads, and the like. The interaction may be further enhanced by the user changing perspective and viewing floors in a multi-floor building or viewing a side view of the building to get a perspective on the floors, entrances, windows, shading, utility hookups, and the like.

Data sources for such a ZeeGuide, which may represent a virtual multiple listing server ("VMLS") may include a conventional Multiple Listing Service, individual brokers, direct sellers, other listing sources such as Craigslist, Ebay, local community electronic bulletin boards, and the like. A residential real-estate ZeeGuide may play a roll similar to a collection of physical "for sale" signs posted at real properties.

Another real-estate scenario may include urban apartment rentals so that a ZeeGuide may be configured to offer apartments to rent. Urban rentals are often highly competitive, require personal connections or working through brokers who receive high commissions, and generally involve needing to be working with many more brokers than suburban home sales require. Urban rentals also exhibit high turn over and very short offer periods. Additionally brokers are often also owners or landlords which may blur the line of understanding of the parties involved.

A ZeeGuide may be prepared to support offering urban apartments to rent or lease. The ZeeGuide may be based on listings for a specific broker or for many brokers so that a user may view each broker's listings. A ZeeMap of a residential area may display 'for rent' objects marking properties for including available rentals. The markers may include each broker's artwork to visually indicate which properties are listed by each broker. Within a large property, more than one broker may have available listings so the markers may include a dynamic aspect such as changing among brokers. A visualization tree may allow a user to select categories of the listings, such as based on price, number of rooms, number of floors, square footage, parking options, and other aspects of the rental property. The ZeeGuide may facilitate viewing the rental listings by location instead of in a typical linear table or sequential page listings. The ZeeGuide map may also show area content such as subway and bus stops, cross walks, lighting, traffic signals, retail locations, and the like. The user may use the navigation features of the map to zoom in or out, such as zoom into a specific neighborhood, a specific street, intersection, address, and the like. The zoom and navigation features of the map may allow a user to zoom deeper in to an individual location that may include a plurality of rental properties or perhaps to view a floor plan of the property that may include available rentals. The interaction may be further enhanced by the user changing perspective and viewing floors in a multi-floor building or viewing a side view of the building to get a perspective on the floors, entrances, windows, shading, utility hookups, and the like. Selecting a marker at any of the levels of zoom, such as by double clicking the marker, may open a window that facilitates establishing a relationship with the broker. Alternatively, the user may select the marker so that another ZeeGuide may be displayed that provides greater detail about the listing, such as asking price, history of price adjustments, broker commission plan, seller disclosure, and the like. The ZeeGuide opened by selecting the marker may allow viewing of photos of the rental property, such as photographs of individual rooms in the rental. A floor plan view may indicate the location in the rental from which each photo was taken. In addition to viewing photos, the ZeeGuide may facilitate viewing a video of the rental unit, the rental property, the area of the property, and the like to allow a potential renter to observe the location over particular periods of time, such as rush hour, weekend mornings, and the like. A user known to a ZeeSys providing the ZeeGuide, such as a registered user, may be allowed to connect their profile that may include a credit application or credit report with the listing broker for the rental unit to facilitate starting the rental process. A user, such as a registered user, may also be provided access to a ZeeGuide that presents the lease for the rental unit and allows the user to navigate through the lease as presented in the lease ZeeGuide. The lease ZeeGuide may connect to apartment rental city and state regulations ZeeGuides to facilitate navigating through and reviewing pertinent regulations and laws of apartment renting. Using the methods and systems of ZeeObjects and the like, rental ZeeGuides may offer seamless connections to other related ZeeGuides and Zeetix maps, such as local event calendars, parking restriction schedules, demographics maps, rehabilitation plans submitted to city boards, and the like.

Data sources for rental property ZeeGuides may include building owners, current renters, brokers, building developers, government housing agencies, city planners, craigslist, ebay, and the like. A rental property real-estate ZeeGuide may play a roll similar to physical "for rent" signs posted on properties.

A ZeeGuide may be prepared to support offering short-term and vacation rentals. This ZeeGuide may be based on listings for a specific broker or for many brokers so that a user may view each broker's listings. A ZeeMap of a user specified area, such as a vacation area may display 'for rent' objects marking properties for rent in a time period specified by the user. The markers may include each broker's artwork to visually indicate which properties are listed by each broker. A visualization tree may allow a user to select categories of the listings, such as start and end of rental, rental price, number of bedrooms, lot size, number of floors, square footage, proximity to amenities, linen service availability, and other aspects of the property. The short-term and vacation ZeeGuide may facilitate viewing the listings by location instead of in a typical linear table or sequential page listings. The ZeeGuide map may also show points of interest such as ski slopes, beaches, hiking trails, shuttle pickup locations, ski rental shops, nearby hotels, restaurants, grocery stores, clubs, gift shops, and the like. The user may use the navigation features of the map to zoom in or out, such as zoom into a specific vacation area, a specific street, intersection, address, and the like. The zoom and navigation features of the map may allow a user to zoom deeper in to an individual short-term or vacation rental property, such as slope side ski rentals. An individual location or rental may be navigated so that the user may view a floor plan of a rental. The interaction may be further enhanced by the user changing perspective and viewing floors in a multi-floor building or viewing a side view of the building to get a perspective on the floors, entrances, windows, shading, utility hookups, relative distance to an attraction (e.g. a beach or ski slope), and the like. Selecting a marker at any of the levels of zoom, such as by double clicking the marker, may open a window that facilitates establishing a relationship with the rental broker. Alternatively, the user may select the marker so that another ZeeGuide may be displayed that provides greater detail about the listing, such as rental price, rental terms, broker commission plan, rental history, and the like. A user known to a ZeeSys that provides the ZeeGuide, such as a registered user, may be allowed to connect their profile that may include an approved credit rating that may be connected with the listing broker for the vacation or short-term rental to facilitate starting the rental process. A user, such as a registered user, may also be provided access to a ZeeGuide that presents the lease for the rental unit and allows the user to navigate through the lease as presented in the lease ZeeGuide. The lease ZeeGuide may connect to vacation rental regulation ZeeGuides to facilitate navigating through and reviewing pertinent regulations and laws of vacation or short-term renting. Using the methods and systems of ZeeObjects and the like, rental ZeeGuides may offer seamless connections to other related ZeeGuides and Zeetix maps, such as local event calendars, parking restriction schedules, demographics maps, and the like.

Data for such a ZeeGuide, may include travel industry sources, ski industry sources, resorts, chamber of commerce, civic groups, interest groups, private property owners, hotel and restaurant sources, other listing sources such as Craigslist, Ebay, local community electronic bulletin boards, and the like. The plurality of sources may facilitate easy connection with other ZeeObjects and ZeeGuides such as ZeeGuides for events, hotels, restaurants, time shares, rental property purchases, and the like. In addition to seamless connection among ZeeGuides, Zeetix maps, and the like, integration from multiple vertical markets creates a synergistic effect that significantly enhances a user rental, purchase, or vacation planning experience.

In another embodiment, members of the general public need to be able to easily purchase tickets to entertainment events within their local area. Additionally, tourists need to know what entertainment events might be available to them while visiting the area. A Zeetix franchisee might recognize the market opportunity for information that meets the needs of both user populations. The Zeetix franchisee's developer might use a JavaScript ZeeBinding and ZDE that creates a Zeetix that the developer sees in Javascript. This Zeetix could contain ZeeObjects with geographic coordinates of event data received from other ZeetStores combined with seating descriptions from the franchisee's own data sources of the event locations. The developer could administer the advertising settings within her Zeetix to allow a rotation of local advertisements relevant to the event or performance, which would then appear within the virtual spatial domain as described below.

For example, a user could go to a visual map of the downtown area of Boston and see depictions of event locales, such as Fenway Park, Symphony Hall, and the TD BankNorth Garden. The user would be visually alerted if any of those locales had a game or performance scheduled for the evening; for example, Fenway Park might glow red for a Red Sox game to be played that evening. The user would then click on the glowing-red Fenway Park portion of the image and be taken to a page showing a seating arrangement, along with relevant advertising around the page (e.g. advertisements for Fenway-area restaurants and bars). If the user clicked on the seat, the next image would show her the actual view from her seat. She would have the capacity to navigate around the view, to zoom in and out of the view, and to tilt the view, thus giving her a better sense of whether the seat was to her liking. Furthermore, virtual advertising could be visible within the spatial domain defined by the view from that seat. For example, advertisers could pay to have their logo superimposed upon the outfield grass or the outfield wall, similar to the "virtual advertisements" visible only on television broadcasts.

The user could then link out to purchase tickets for the event, thus completing the transaction.

Figure 9:
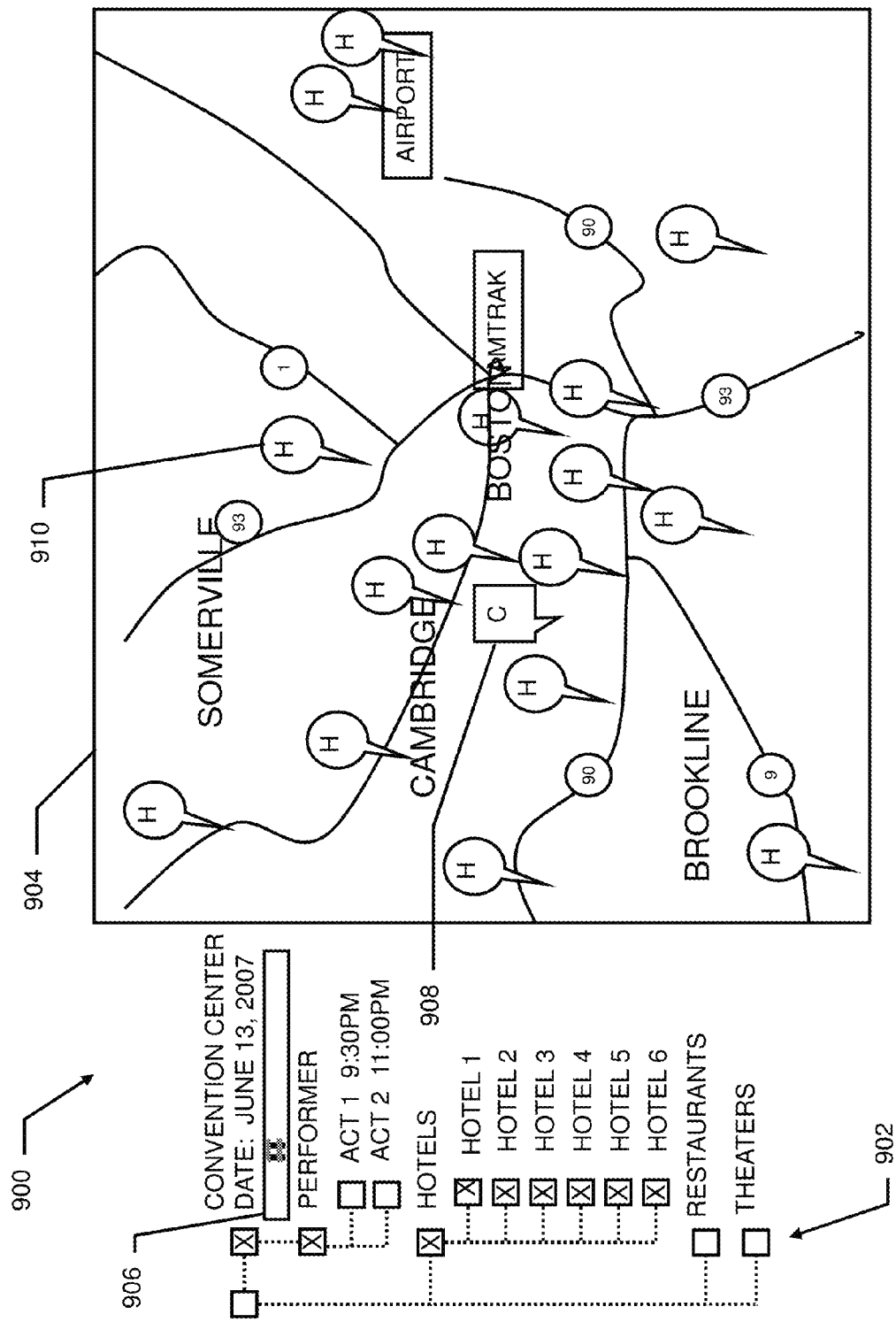
FIG. 9 depicts a ticketing ZeeGuide.

FIG. 9 depicts an example of using ZeeObjects and other Zeetix methods and systems in association with event ticketing. ZeeGuides may facilitate ticketing for live stage performances such as concerts, plays, lectures, speakers, club performances, and the like. ZeeGuides may facilitate users identifying events they would like to attend, purchasing tickets, and purchasing event related items, services, lodging, restaurant reservations, transportation, tickets to related events, and the like.

In an example, a user visits a web site, such as by using a web browser like Internet Explorer, to view and potentially purchase concert tickets. The web site may be a ticket seller (e.g. Ticketmaster), a venue web site, or other site that facilitates the purchase or repurchase of event tickets. A ZeeGuide 900 may be displayed including an object visualization tree 902 showing one or more venues 908, and time control selection range indicator 906, such as may be provided by a cursor widget herein described. Based on the selected venue and time, different artists may be enumerated on the tree. A ZeeMap 9004 may show the selected venue. Alternatively, an object visualization tree may be organized by artist so that a list of concert dates and venues may be included in the tree and a corresponding ZeeMap may show the various locations where artists are playing. Other organizations of a performance ZeeGuide are possible, including without limitation, date, time, venue, artist, genre, tickets in a price range, region, age restriction (e.g. over 21 shows), performance type, and any other aspect or combination of aspects related to performances that may be attributed to ZeeObjects. A ZeeMap may show hotels 910 and restaurants on same map.

Figure 10:
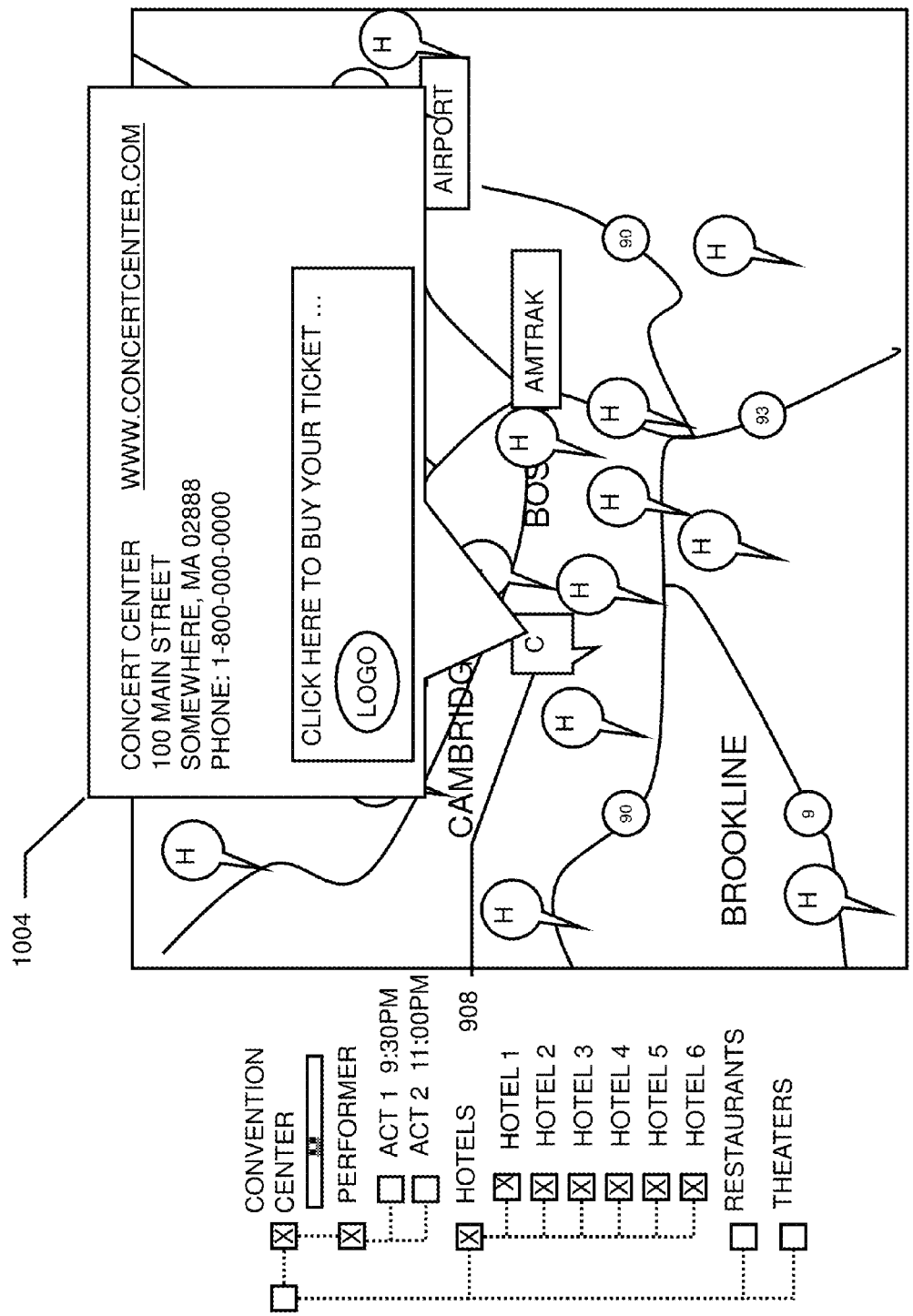
FIG. 10 depicts the ZeeGuide of FIG. 9 with an overlay ZeeWindow.

Referring to FIG. 10, a user may select a concert venue 908 to display a ZeeWindow 1004 that shows details about the venue on the selected date and may include a link that allows the user to purchase a ticket to that event from that site. Selecting the ticket purchase link may bring up further details about the event, such as a seating chart as shown in FIG. 12.

Figure 11:
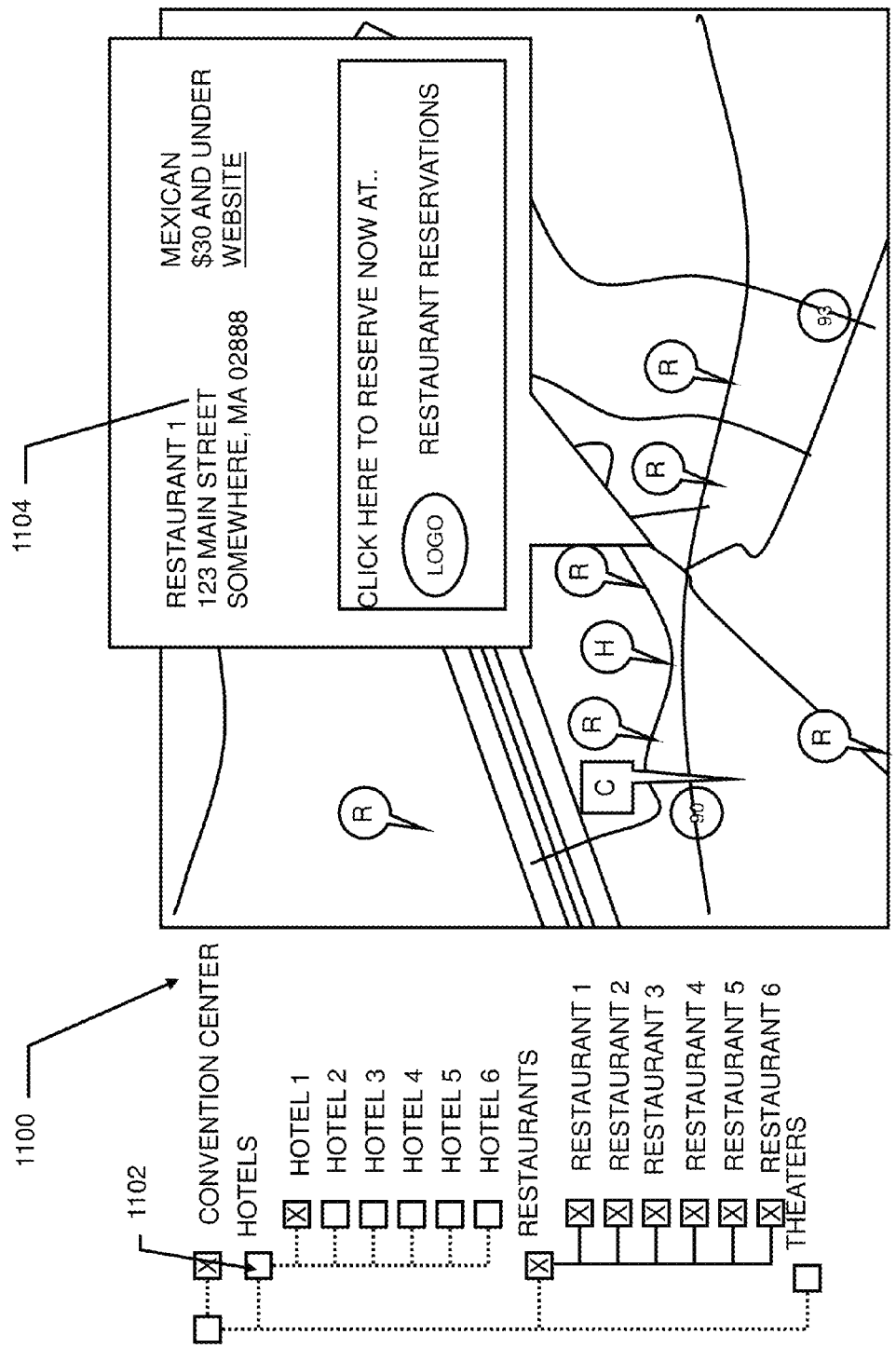
FIG. 11 depicts a restaurant ZeeGuide with a restaurant overlay ZeeWindow.

Referring to FIG. 11, a user may select to view additional information related to an event. The ZeeGuide of FIG. 11 may be a restaurant ZeeGuide 1100 that is derived from the event ZeeGuide of FIG. 9 by selecting to visualize restaurants in the object visualization tree 1102. Positioning a cursor over, or selecting, a restaurant marker in the ZeeGuide 1100 ZeeMap may result in a restaurant detailed ZeeWindow 1104 being displayed (e.g. as an overlay) and including details about the marked restaurant. The details may include an address, phone number, web site, average entry price, link to make a reservation, the restaurant or sponsor logo, and the like. Each element in the ZeeWindow 1104 may be a rendered marker of a ZeeObject that may, when selected open another ZeeGuide (e.g. a restaurant review ZeeGuide).

Figure 12:
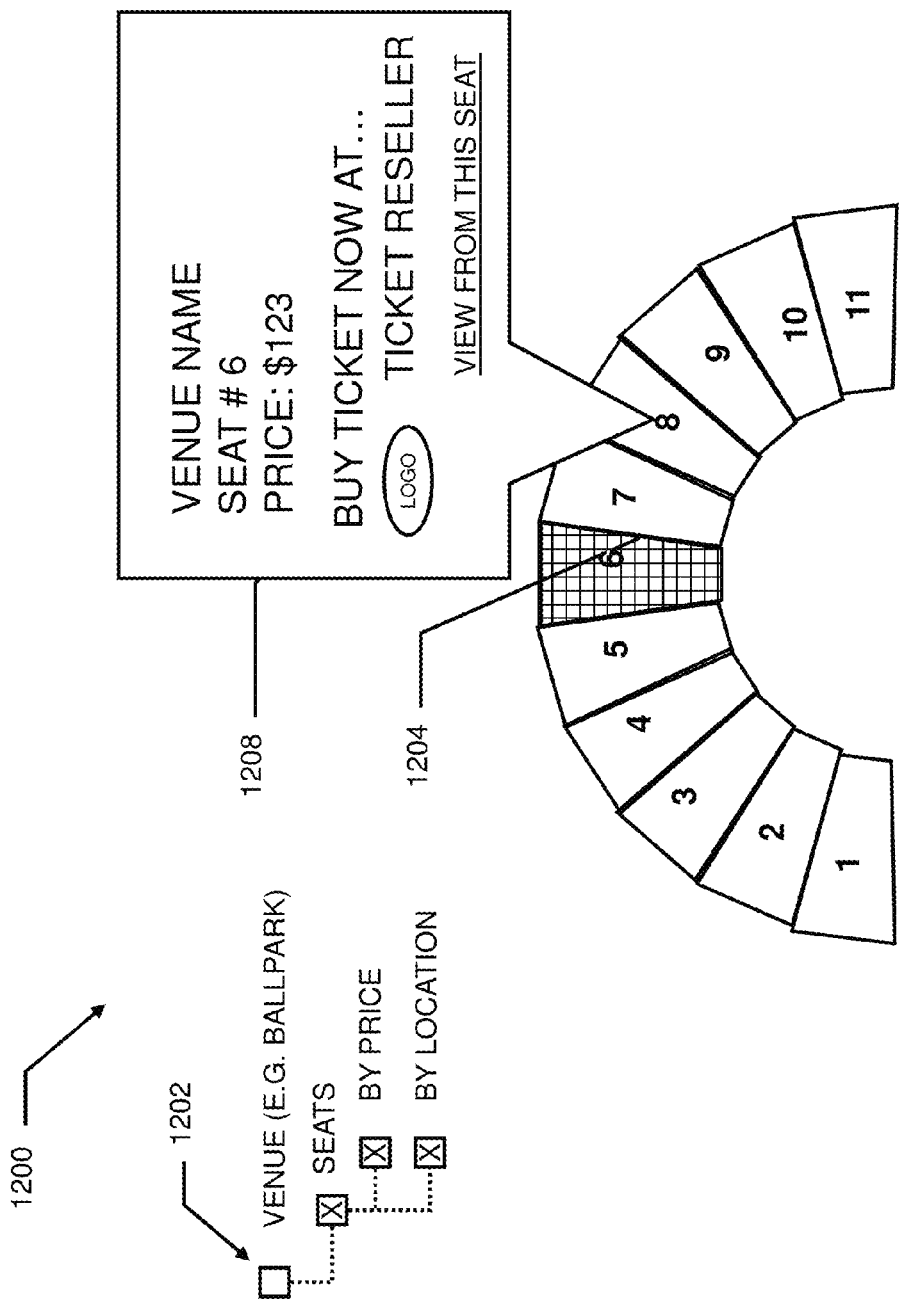
FIG. 12 depicts a ZeeGuide for selecting a seat in venue.

FIG. 12 depicts a ZeeGuide for selecting a seat in venue. The seat selection ZeeGuide 1200 of FIG. 12 may include an object visualization tree 1202 that may include visualization attributes related to a seat selection and that may be associated with ZeeObjects such as venues, seats, seating sections, and the like. This custom ZeeGuide may include a ZeeMap of venue 1204 with available seats shown on map based on the visualization tree 1202 selections. Selecting or moving a cursor over a seat may display a ZeeGuide overlay 1208 that displays information about the particular seat, including price, seat number, link to purchase a ticket for the seat, neighboring seat availability, a link to see sightlines to the stage, and the like.

Ticketing ZeeGuides may be associated with other events such as sporting events. A ZeeGuide for sporting events may take into consideration factors such as fan loyalty since sports team event patrons are generally local to the venue. Also sports teams and venues are often tightly coupled in that the home town sports team may only play at the hometown venue, and the hometown venue may only be available for the hometown sports team events. However, other events, such as minor league contests in major league venues may also be part of a sports event ticketing ZeeGuide.

Figure 13:
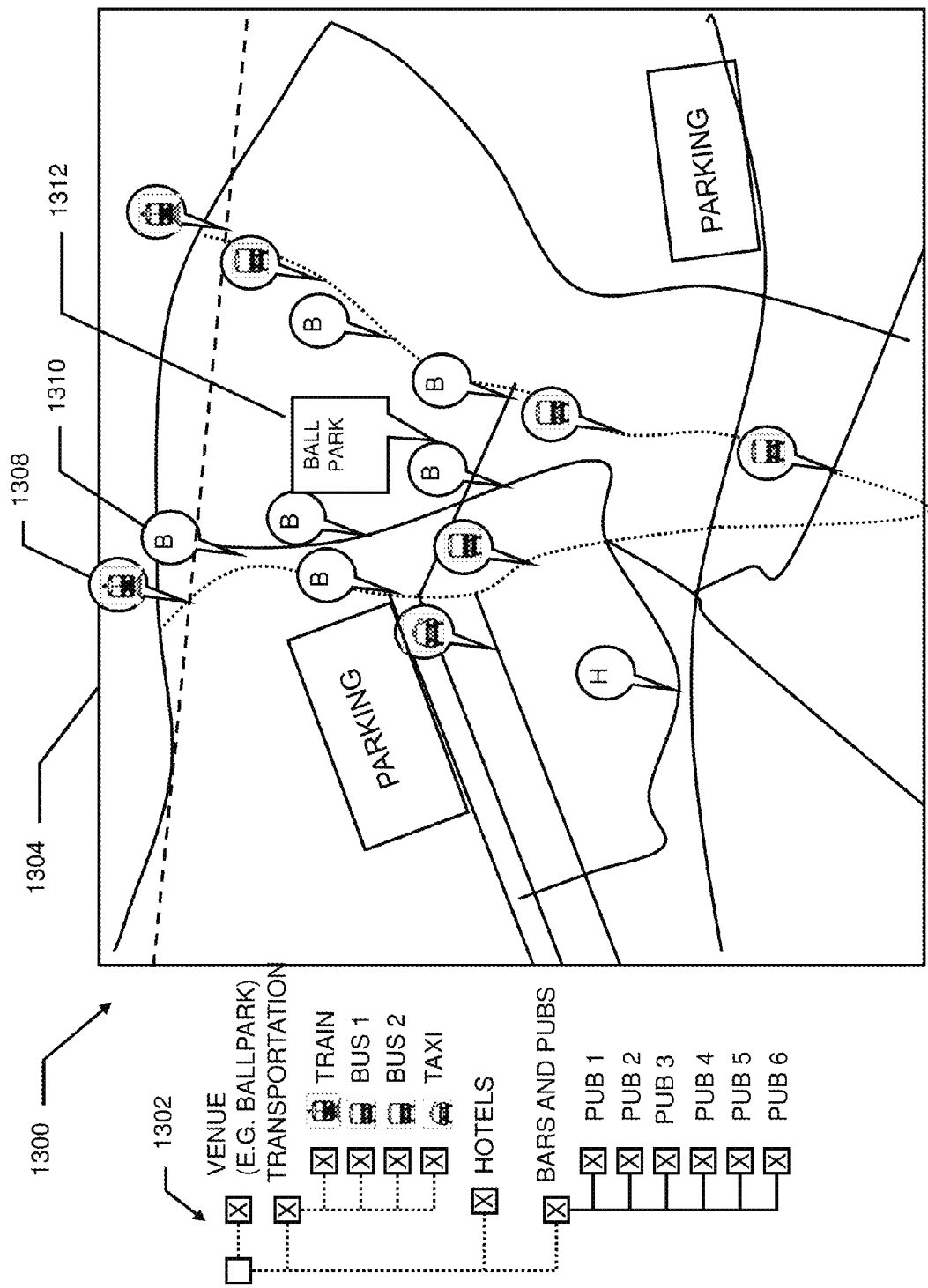
FIG. 13 shows a sporting event related ZeeGuide.

The ZeeGuide of FIG. 13 shows a sporting event related ZeeGuide 1300 that includes a ZeeObject visualization tree 1302 and a ZeeMap 1304. In addition to showing the sporting venue 1312, transportation options 1308, local eateries 1310, detailed information about any of these or other markers displayed in the ZeeMap 1304 may be displayed similarly to the detailed ZeeWindows of FIGS. 10-12. Any actions possible in these ZeeWindows may be appropriately adapted for a ZeeWindow that may be displayed based on ZeeMap 1304 markers. Because sports tickets may be purchased on a robust secondary market, a ZeeGuide for purchasing tickets may include ZeeGuides for secondary market or resale tickets including ticket bidding ZeeGuides. An alternative ZeeGuide related to sporting events may be a 'foul ball' ZeeGuide that depicts a baseball stadium with markers for exemplary or specific foul balls and home runs that have been hit. This information may be combined with a seating ZeeGuide as shown in FIG. 12 by displaying statistics associated with foul balls (or home runs) hit in the vicinity of the seat. A ZeeGuide with home run markers may be linked to recorded video of the home runs marked so that opening a home run marker may display a window containing link to view information about the home run including viewing the video of the home run. ZeeGuides for "web gems" and other special plays in sporting events may be configured and related to ticketing ZeeGuides.

Data sources for event ticketing ZeeGuide applications may include concert venues, ticket sellers, ticket resellers, performers, artists, promoters, websites (e.g. ticket auction and resale sites), RSS feeds, hotels, affiliate managers, travel sites, transit and parking municipal and private sources, teams, fan clubs, and the like.

This exemplary ZeeGuide may represent important aspects of the methods and systems herein disclosed including tying ZeeObjects together based on a location, filtering by time (e.g. as controlled by a cursor time indication widget), presenting a ZeeGuide as a calendar, ZeeObject relationships may be codified or determined based attributes of the objects (e.g. venues, sellers, resellers, promoters), related ZeeObjects may be presented in ZeeGuides (e.g. a hotel may be presented in a Concert ZeeGuide exemplifying a synergy between concert ZeeGuides and hotel ZeeGuides), and the like. ZeeGuides for cobranded package deals may be available on web sites for promoters, performers, team sites, hotels, league sites, and any other participant or affiliate. ZeeGuides for viewing live or recorded action at a venue, such as last night's baseball game, may be accessible from and related to a ticketing ZeeGuide.

Generalizations from such an exemplary ZeeGuide may include: artists may want a music ZeeGuide on the artist's website presenting upcoming appearances; as multiple artists assemble music ZeeGuides, destination websites that aggregate these ZeeGuides (e.g. 80's musician performances) may become more attractive and commercially viable further opening opportunities for commercializing virtual property rights (e.g. internet advertising); ZeeWindows that may open when an appearance markers (e.g. a concert venue) might invite visitors to purchase music for download; and Zeetix methods and systems facilitate using spatial organization to provide context and framework for music event information.

Figure 14:
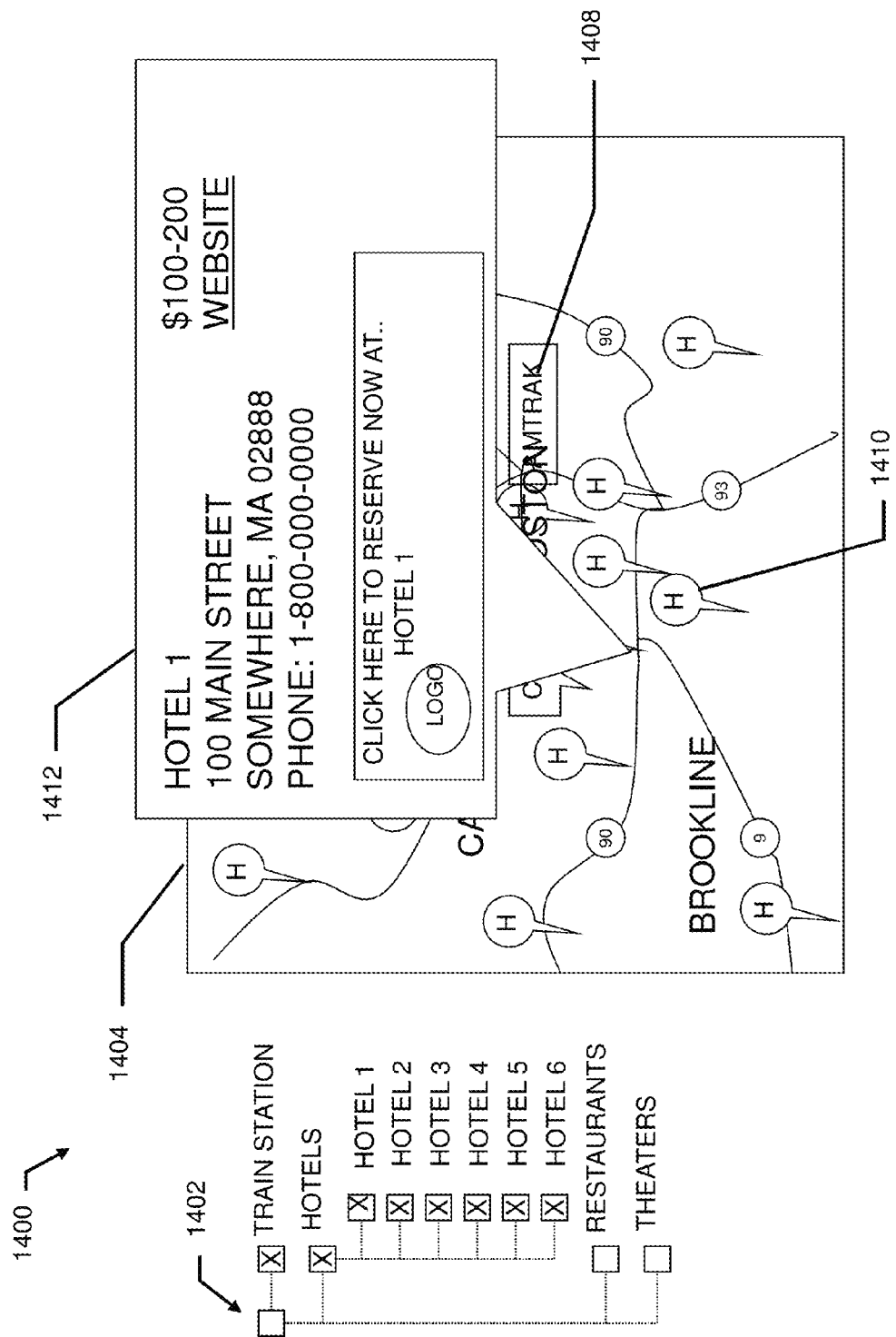
FIG. 14 depicts a travel and entertainment Zeetix scenario.

FIG. 14 depicts a travel and entertainment Zeetix scenario. Zeetix methods and systems may be associated with travel and entertainment scenarios. Users who may be interested in planning a trip to another city may use a travel planning ZeeGuide as depicted in FIG. 14. The planning ZeeGuide 1400 may include an object visualization tree 1402 that may allow a user to select travel related objects for rendering on the travel ZeeMap 1404. A user may select a mode of transportation, such as train travel and the ZeeGuide will respond by displaying a marker of the train station 1408 in the destination city. The user may select to view hotels in the city as well and these may be displayed as hotel markers 1410. By selecting or pausing a cursor over a hotel marker 1410, the user may view an overlay ZeeWindow 1412 that provides details about the hotel, such as a location, reservation phone number, web site, range of room rates, a link to make a reservation, and the like.

Data sources that may be appropriate for providing information that can be represented in a travel ZeeGuide may include individual users, restaurants, restaurant chains and franchises, online reservation services, hotels, hotel promoters, hotel resellers and aggregators, travel service providers, movie theaters, music venues, tourist attractions, tourism bureaus, businesses and retailers, hospitals and medical providers, local and regional governments, community organizations, and the like.

In another embodiment, a patent family tree is a series of charts showing the relationships between different branches of patents or patent applications that have been issued or filed in a given technological field. A tree includes a patent in a field and relates back to earlier patents and forward to later patents in the field. These charts include information about strategies for planning products and controlling intellectual property;

key research personnel and companies; competitors within the industry; and areas of related research.

A Zeetix franchisee might recognize a market opportunity within the creation of a patent family tree. The Zeetix franchisee's developer might use a Perl ZeeBinding and ZDE that creates a local Zeetix that the developer views in Perl. The developer might then synthesize a rendering of the patent family tree and use the ZeeRIP to create a corresponding custom ZeeMap. The developer might then build a Zeetix around this custom ZeeMap, such that the Zeetix could contain ZeeObjects with spatial coordinates defined in the coordinate system of the custom ZeeMap corresponding to the patent family tree of interest. Some of these ZeeObjects might be patent and assignee data received from other ZeeStores, combined with descriptions of a particular patent family of interest from the franchisee's own data sources. The developer could administer the advertising settings within her Zeetix to allow a rotation of advertisements of interest to patent prosecution firms, litigation, boutique intellectual property firms, and other potential users. Additionally, the developer could administer the security settings within her Zeetix to give access to those only within her company's Local Area Network ("LAN").

Figure 15:
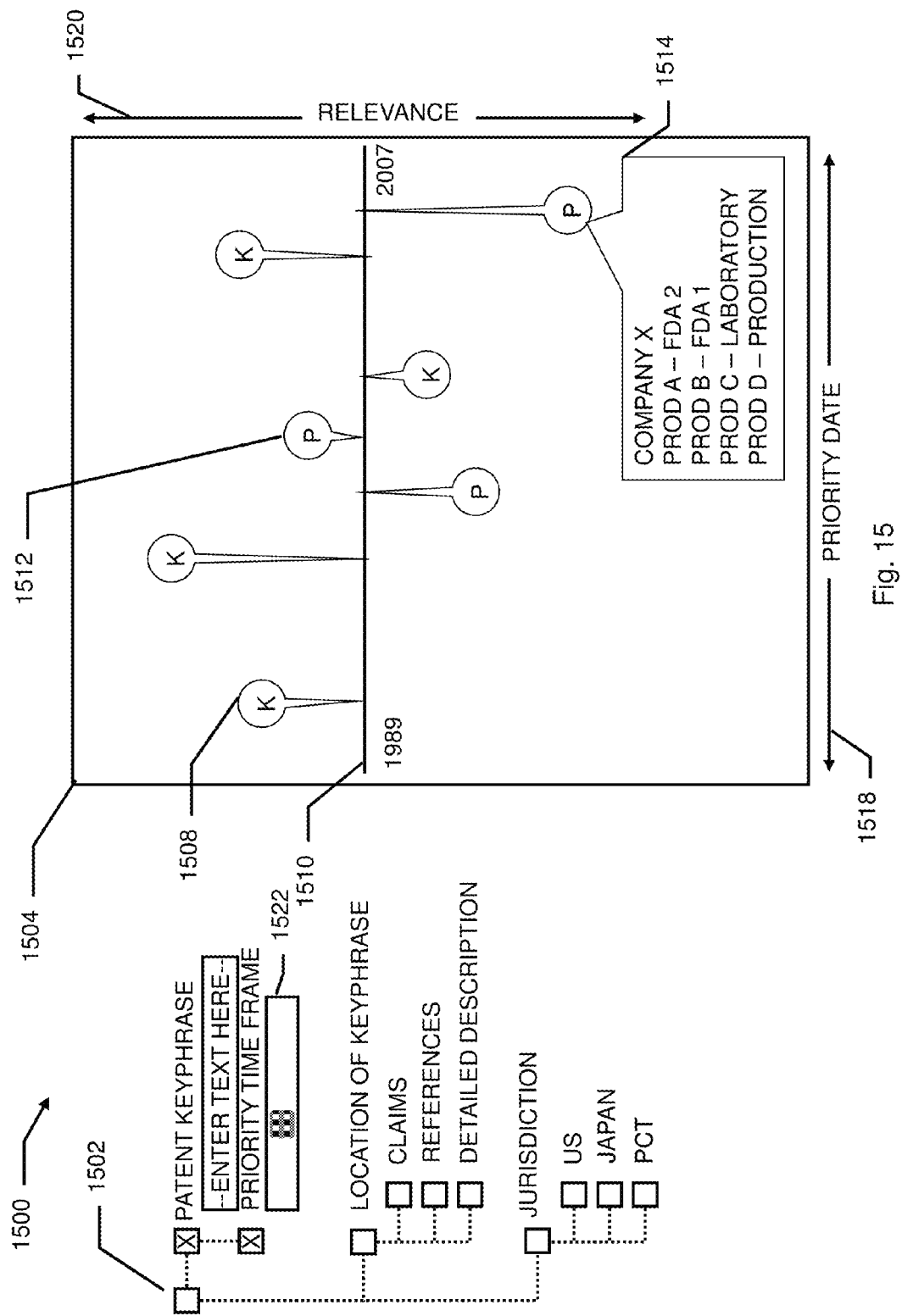
FIG. 15 depicts a patent family ZeeGuide.

Referring to FIG. 15, a user within a pharmaceutical company could access the patent family Zeetix 1500 within that LAN. The user could first look at a depiction of the relationships within a protein family that the company is targeting for a new product. This information could allow the user to assist decision-makers in product planning, potential side effects, viability of the target class, and the identification of the most promising areas of unmet medical need and market potential. Additionally, the patent family ZeeGuide 1500 may reduce the problem of "reinventing the wheel" and helps avoid patent infringements, since a user would be able to see where other companies have patents or patents pending within the protein family. The user may enter a keyphrase (e.g. keyword or phrase that may distinguish patents related to the protein family of interest) in the visualization tree 1502. A ZeeMap 1504 may be displayed that encompasses all related patents along with a time frame indicator widget 1522, such as a cursor widget herein described for changing the input time frame and duration. As the user adjusts the time indicator widget 1522, the starting and ending dates on the timeline 1510 may change accordingly and patents 1508 and FDA tracked product development activity 1512 related to the patents may be rendered along the time line. The vertical distance of the patent markers 1508 and the product development markers 1512 may be based on a relevance of the use of the keyphrase in the patent or product. The visualization tree 1502 may include other options such as a location of the keyphrase within the patents (e.g. claims, references, and detailed description), and patent jurisdiction (e.g. US, Japan, or International) that the user may select to provide different views of the ZeeGuide. The visualization tree options may facilitate navigating through the patent ZeeGuide layers such as layers associated with patents. Selecting one or more of the visualization tree 1502 options may result in a different ZeeGuide being rendered based on a layer indicated by the option selected. The user may also interact with the ZeeGuide 1500 by surfing around the ZeeMap spatial domain of priority date and relevance to learn more about the patents 1508 and/or products 1512 rendered therein. By selecting a patent marker of interest, such as by clicking the marker or pausing a cursor over the marker may result in a ZeeWindow 1514 appearing that may provide highly pertinent information about the ZeeObject selected. The ZeeWindow might allow the user to see information on the patent assignee (owner) and the current stage of product development for the patented material.

In effect, this Zeetix provides a spatial context within which patent information can be correlated with a company's strategy, strengths, products, and markets.

Figure 16:
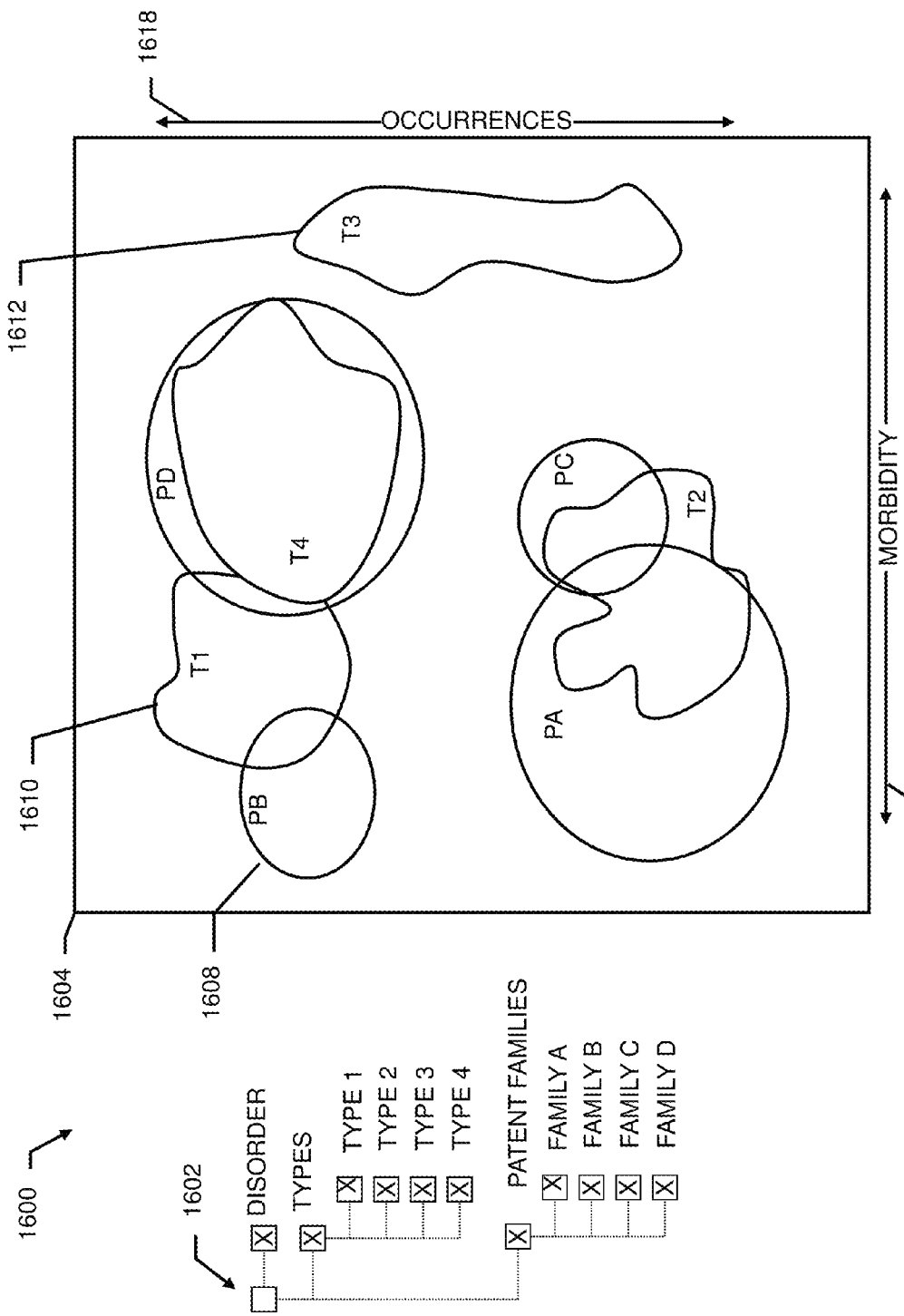
FIG. 16 depicts a disease and corresponding patents Zee-Guide.

Once the user has identified a particular target protein using the patent family tree Zeetix, that user might then access a related pathway Zeetix in order to identify a particular range of disorders associated with the protein of interest and their associated patents and pending applications. FIG. 16 depicts such a ZeeGuide. The ZeeGuide 1600 may include an object visualization tree 1602 that may facilitate visualizing disorders by type and related patent families, such as patent families related through the keyphrase from the ZeeGuide of FIG. 15. A ZeeMap 1604 may display, using a spatial coordinate system related to the disorders of morbidity 1614 and occurrences 1618 to help put the opportunities in a commercial focused perspective. Within this spatial domain, patents 1608 and disorder types 1610 may be dispersed so that correspondence among the patents and the disorders related to the protein family of interest may be visualized. In the example of FIG. 16, the user may identify disorder type T1 1610 and T3 1612 as candidates for commercial development in that they may have either high occurrence rates, greater morbidity rates, or both. Additionally disorder type T1 1610 and T3 1612 may not have substantial correspondence with patent families thereby indicating potentially novel uses of the specific protein identified within the patent family Zeetix, and as a result, enhancing the commercial value of an original patent on the use of the protein for treatment of the disorder.

A Zeetix may be associated with life science scenarios such as biological pathways, genome maps, image and information sharing, and the like. A biological pathway is a series of related changes or events that occur within a cell or an organism. A metabolic pathway such as "glycolysis" may describe a step by step process of the enzymatic reactions when processing a substrate such as glucose. Signaling pathways describe the process of signaling, the signal, the messengers and receptors to the ultimate outcome. In general, pathways form complex interconnected networks.

Figure 17:
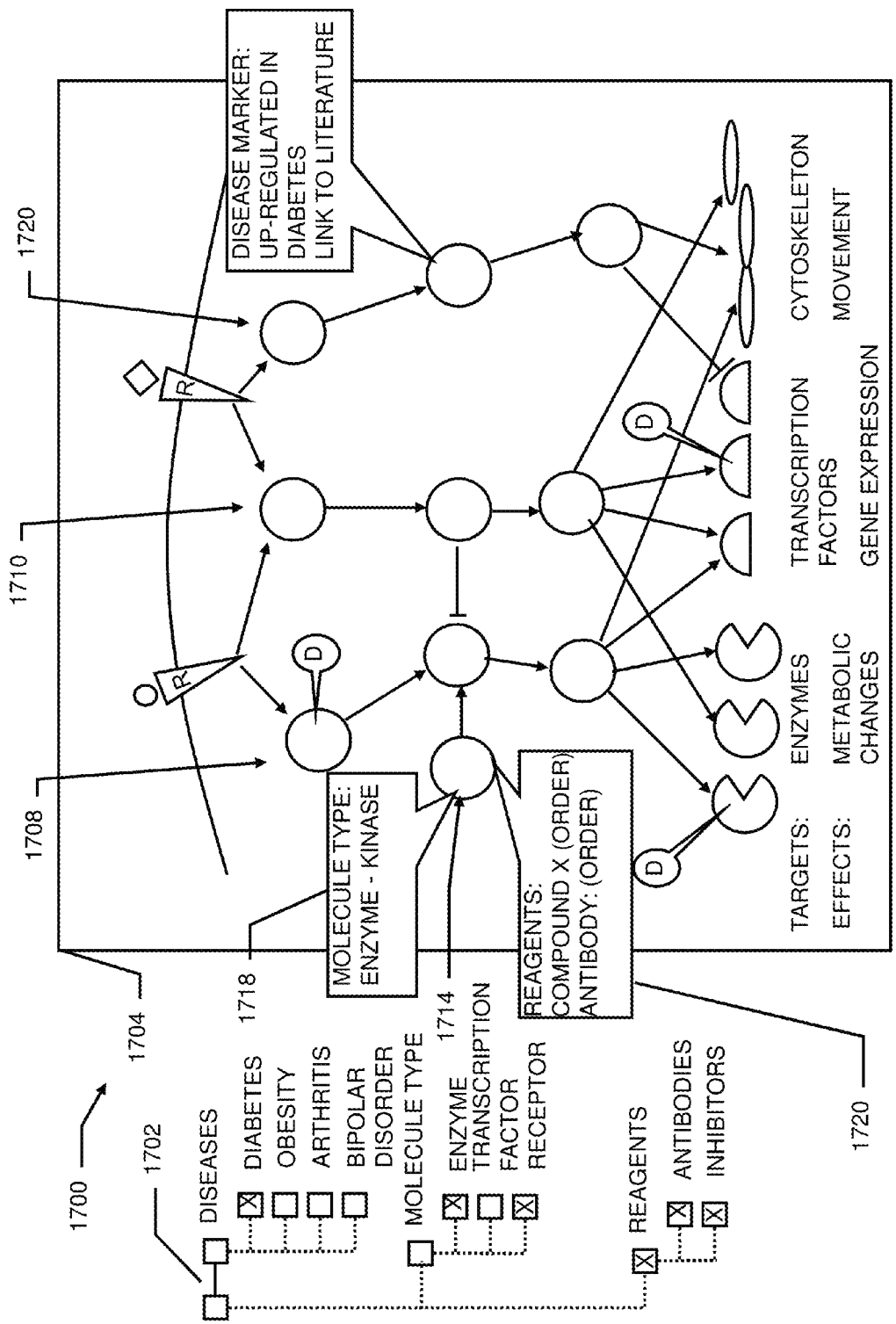
FIG. 17 depicts a biological pathway ZeeGuide.

As shown in FIG. 17, a researcher is interested in developing new drugs against diabetes. A biological ZeeGuide 1700 may facilitate determining protein classes that may be more appropriate for drug discovery. The ZeeGuide 1700 may include an object visualization index tree 1702 that may allow a user to visualize the roles and relationships of diseases, molecule type, and reagents in a protein family focused biological pathway as may be rendered in ZeeMap 1704. Throughout the pathways 1708, 1710, and 1712, a researcher may select biological pathway markers and determine relevant information. By selecting a step in biological pathway 1712, a ZeeWindow may be presented in an overlay describing laboratory experiments that indicate that a protein of interest is up-regulated in tissues of diabetic individuals as compared to non-diabetics. However by continuing to follow pathway 1712, either by zooming or scrolling a window to view each portion of the pathway, the researcher may determine that the protein of pathway 1712 may be 'non-druggable' because it does interact with appropriate targets and may not be regulated by drugs. Because the ZeeGuide 1700 provides an end-to-end biological pathway, the researcher may scroll within the biological pathway spatial domain to identify other paths in the pathway that may lead to identifying other target proteins that fall in protein classes more appropriate for drug discovery.

By interacting with the visualization tree 1702, the researcher may enable rendering markers that indicate molecule types 1714. The researcher may select molecule type markers 1714 in other paths and one or more ZeeWindows may appear that may facilitate identifying the molecule types 1718 and a ZeeWindow overlay 1720 for appropriate chemical compounds and other reagents required for experiments. The chemical overlay 1720 may include a direct link for ordering the experiment elements, such as chemical compounds and reagents, thereby connecting the research biological pathway ZeeGuide to laboratory experimentation ZeeGuide and compound ordering ZeeGuides.

Genomes may be considered as one-dimensional linear maps. Chromosome plus nucleotide number are the equivalent of coordinates in a map. Zeetix allows to combine and filter information associated with these maps, such as genetic variation and mutations, haplotype blocks, genes, regulatory elements, degree of conservation among species, disease associations, providers of diagnostic tests, patient records, reagents and their suppliers.

Figure 18:
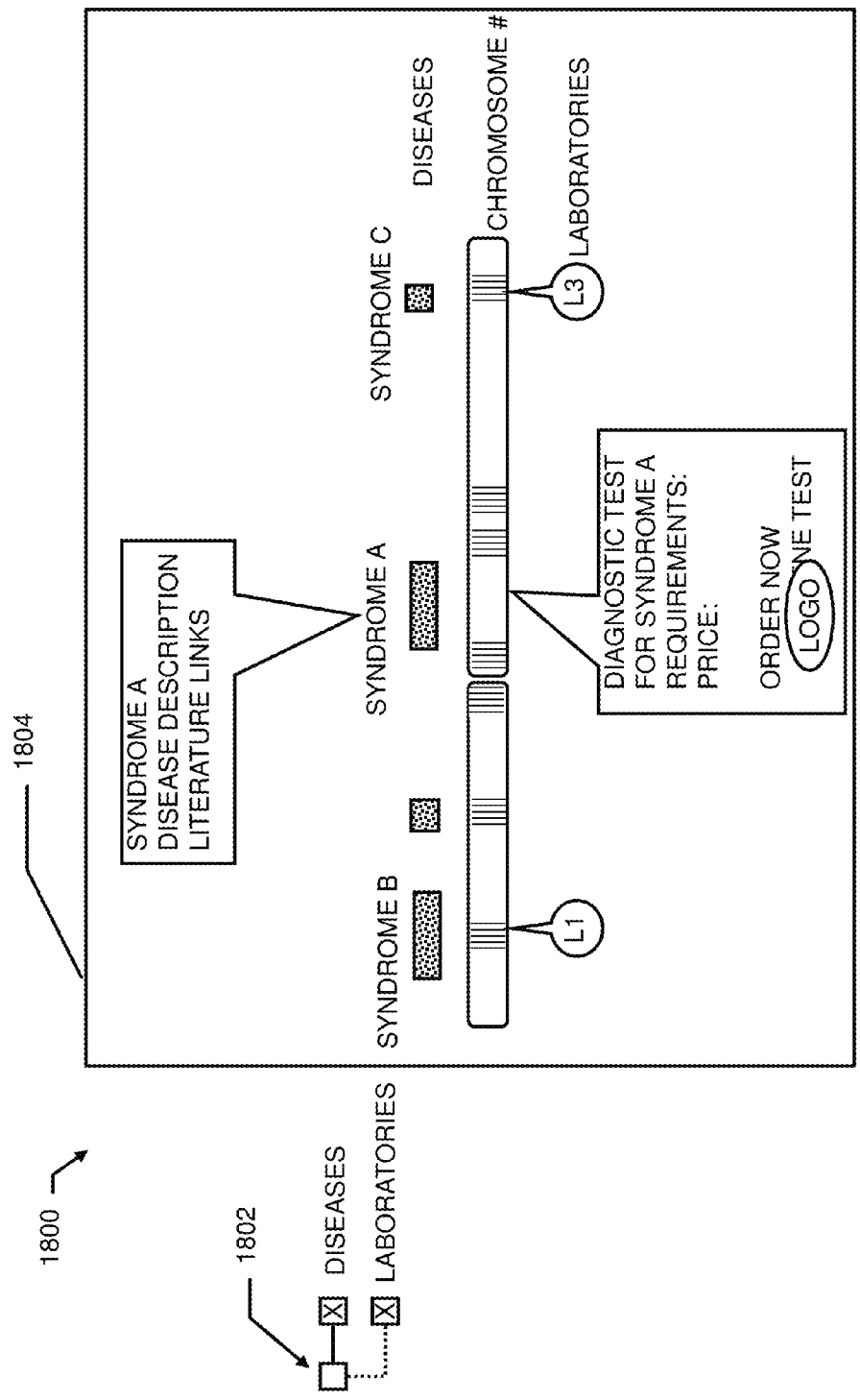
FIG. 18 depicts a genome ZeeGuide.
Figure 19:
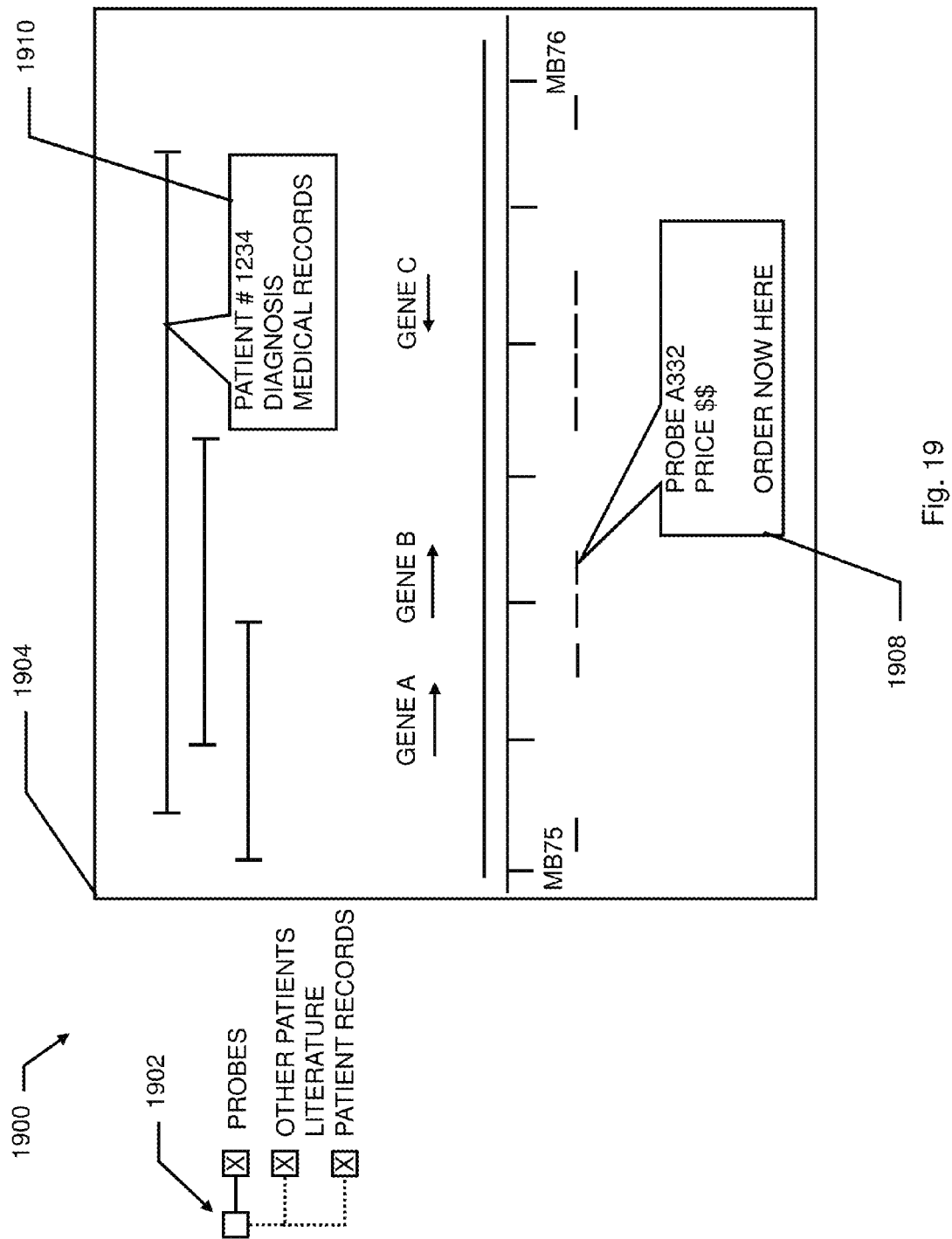
FIG. 19 depicts a probe selection ZeeGuide.
Figure 20:
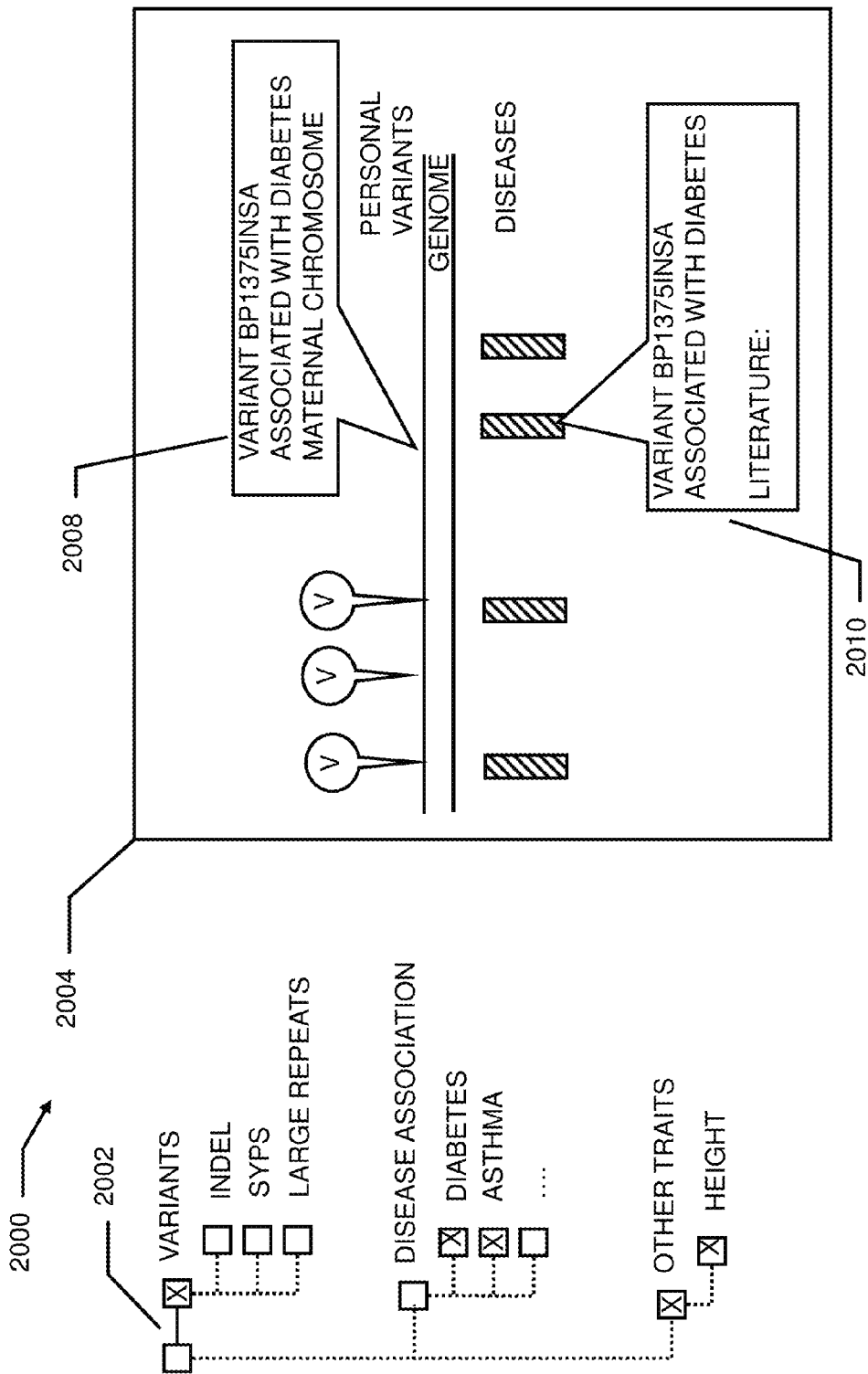
FIG. 20 depicts a personal genomic ZeeGuide.

FIGS. 18-20 depict various ZeeGuides associated with presenting and managing Genomic life science. FIG. 18 depicts a human genome ZeeGuide visualizing disease markers and laboratories. A physician who may suspect his patient may be suffering from Syndrome A which may be associated with a deletion of genetic material in a defined chromosomal area. By interacting with the genome Zeetix 1800, the physician may pan around the human genome spatial domain and zoom in on areas of potential interest, such as an area depicted in the ZeeMap 1804. Associated with the ZeeMap 1804, markers for Syndrome A and other syndromes may be displayed in relation to a genome string. The physician may select the Syndrome A marker to view a ZeeWindow including a brief description of the disease and one or more links to clinical, research, and pharmaceutical literature. By selecting laboratory markers, the physician may view information such as price, turn around time, and contact information for ordering a test such as a blood test. If the physician decides to perform the test himself, he can select and order appropriate probes from the Zeetix by zooming in on the chromosomal area such as shown in FIG. 19.

FIG. 19 depicts a ZeeGuide that may help a physician determine available probes and to select the correct set of probes. The probe selection ZeeGuide 1900 allows a physician to view-genes in the area, the location of probes relative to those genes and genetic findings in other Syndrome A patients described in the literature. As this ZeeMap 1904 is a result of zooming in on the genome ZeeMap 1804, portions of the spatial coordinate system are the same, however at such greater resolution, other factors such as individual probes associated with detecting details of the genome compose an aspect of the probe selection ZeeMap 1904. In the ZeeMap 1904, three genes are involved in the syndrome: A, B and C. Gene A and B must be missing in order to diagnose the Syndrome. If gene C is also missing, additional symptoms are to be expected. Markers may show the location of molecular probes available so that a physician may get help selecting the correct set of probes. Probes can be ordered by clicking on the markers as indicated by ZeeWindow 1908. ZeeWindow 1908 may interconnect with a financial transaction ZeeGuide that may allow a physician to select a method of payment, a patient account to charge it against, and probe order options such as delivery time, and the like. Other markers may show the extent of deletions in other patients that have been described in the literature. After getting test results for his patient, the physician may decide to annotate the Zeetix with a patient info marker 1910 describing the findings and a link to the patient records. In this way, patient records may be organized with respect to specific genetic defects.

Referring to FIG. 20, more and more sequences of information is available for individuals. Some individuals have had their entire genome sequenced today. However, the DNA sequence by itself is meaningless, unless it is annotated. A personal genome Zeetix 2000 might be a genome Zeetix annotated with a specific individual's variation from the "standard" genome. Markers on the personal genome ZeeMap 2004 may highlight areas or "coordinates" that are known to be associated with certain traits, be it diseases or other traits such as height. The personal genome ZeeGuide 2000 may include an object visualization tree 2002 that lets the user choose between traits he or she wants to know more about (e.g. traits for talents such as perfect pitch or susceptibility for preventable diseases) and exclude those that they choose not to know about (e.g. incurable diseases). As in prior examples, selecting a marker may allow a ZeeWindow 2008 to be viewed in an overlay. Markers may inform about treatments 2010 and might include advertisements for clinics or music schools, based on the traits selected by the user.

Zeetix methods and systems may facilitate medical professionals sharing information, such as images of patient medical records to collaborate on diagnosis and/or treatment. A ZeeGuide, through methods and systems for sharing data may facilitate web based images that are easily shared, can be annotated by different people, and viewed in real time.

Figure 21:
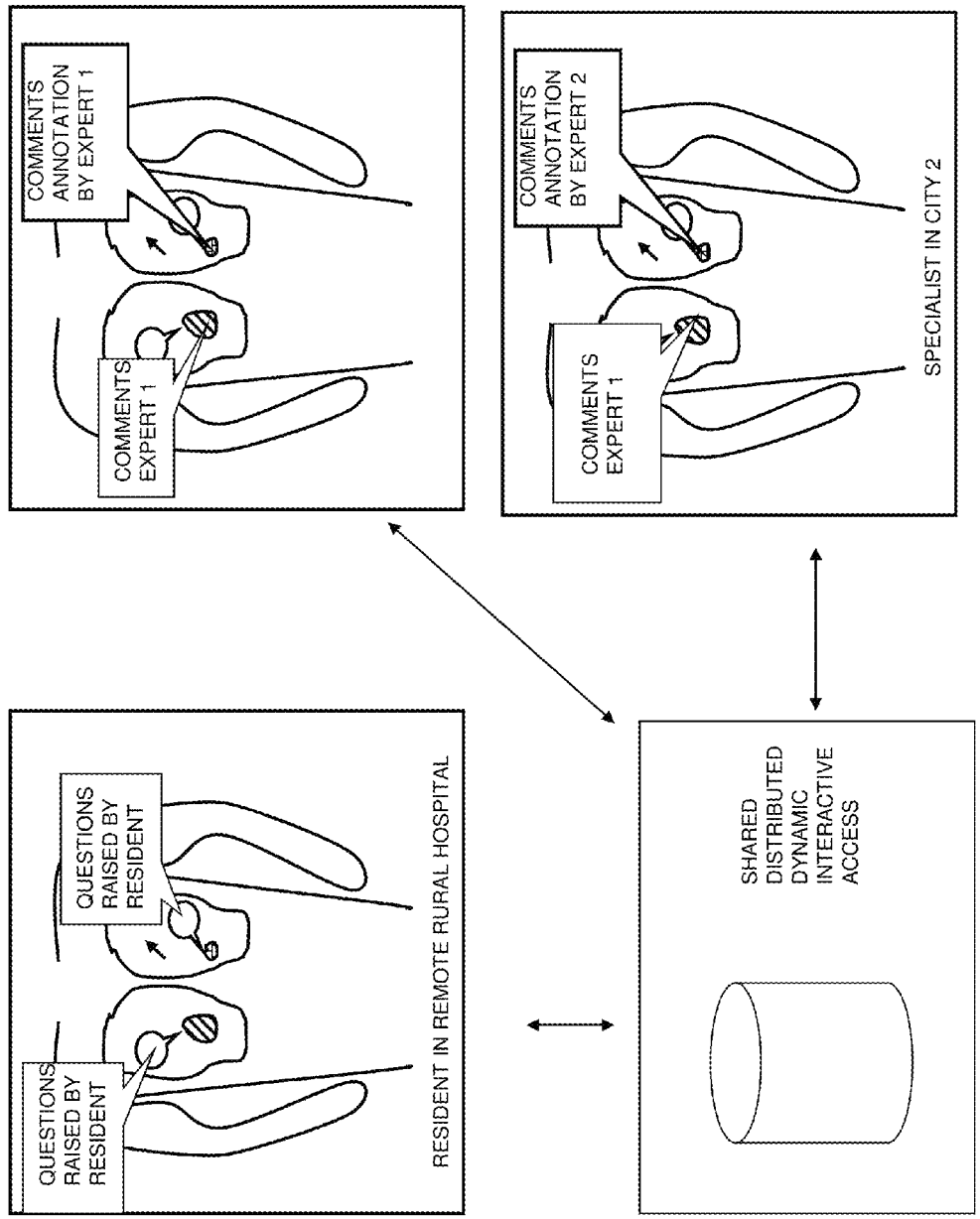
FIG. 21 depicts sharing medical imaging information through ZeeGuides.

In an example, FIG. 21 depicts image sharing for diagnostic purposes. A patient x-ray reveals shadows in his lungs that cannot be fully interpreted by the resident in charge. A ZeeGuide may be built to share the x-rays with a selected audience for viewing and annotating by consulting specialists. The ZeeGuide provides shared, distributed, dynamic interactive access to allow specialists to comment, annotate comments, and the like.

Figure 22:
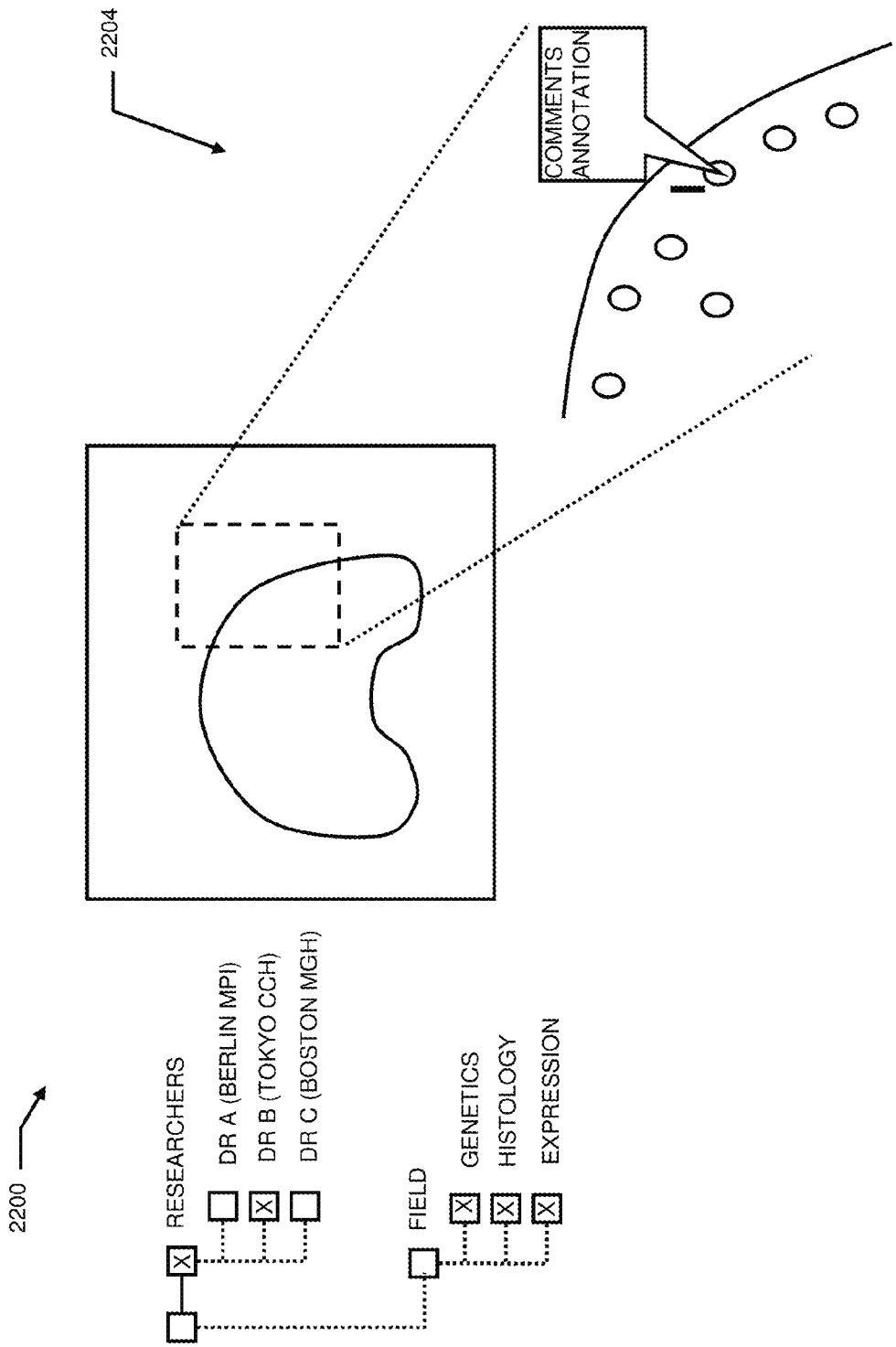
FIG. 22 depicts histological slides in a ZeeGuide
Figure 23:
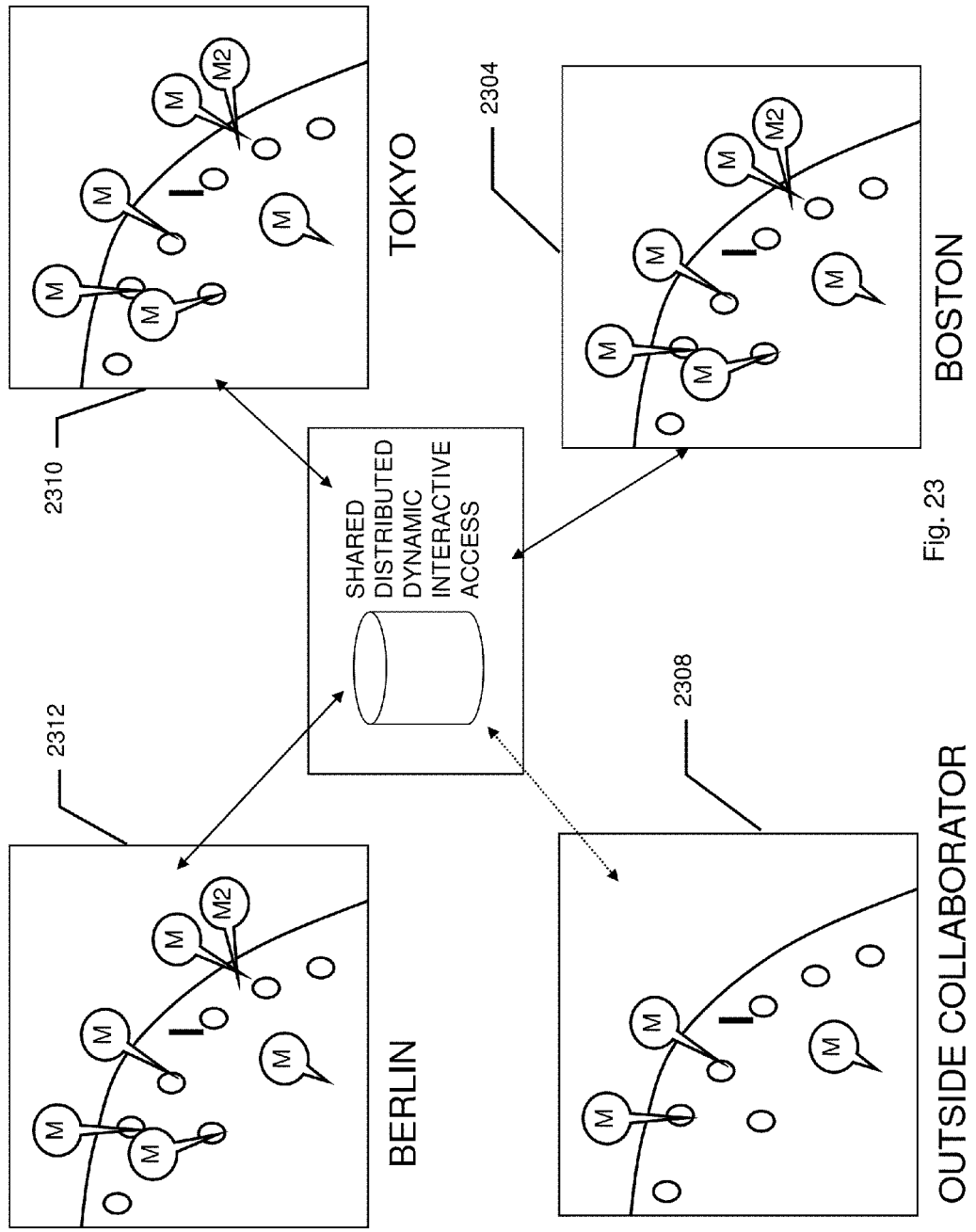
FIG. 23 depicts geographically dispersed contributors sharing commentary through a ZeeGuide.
Figure 24:
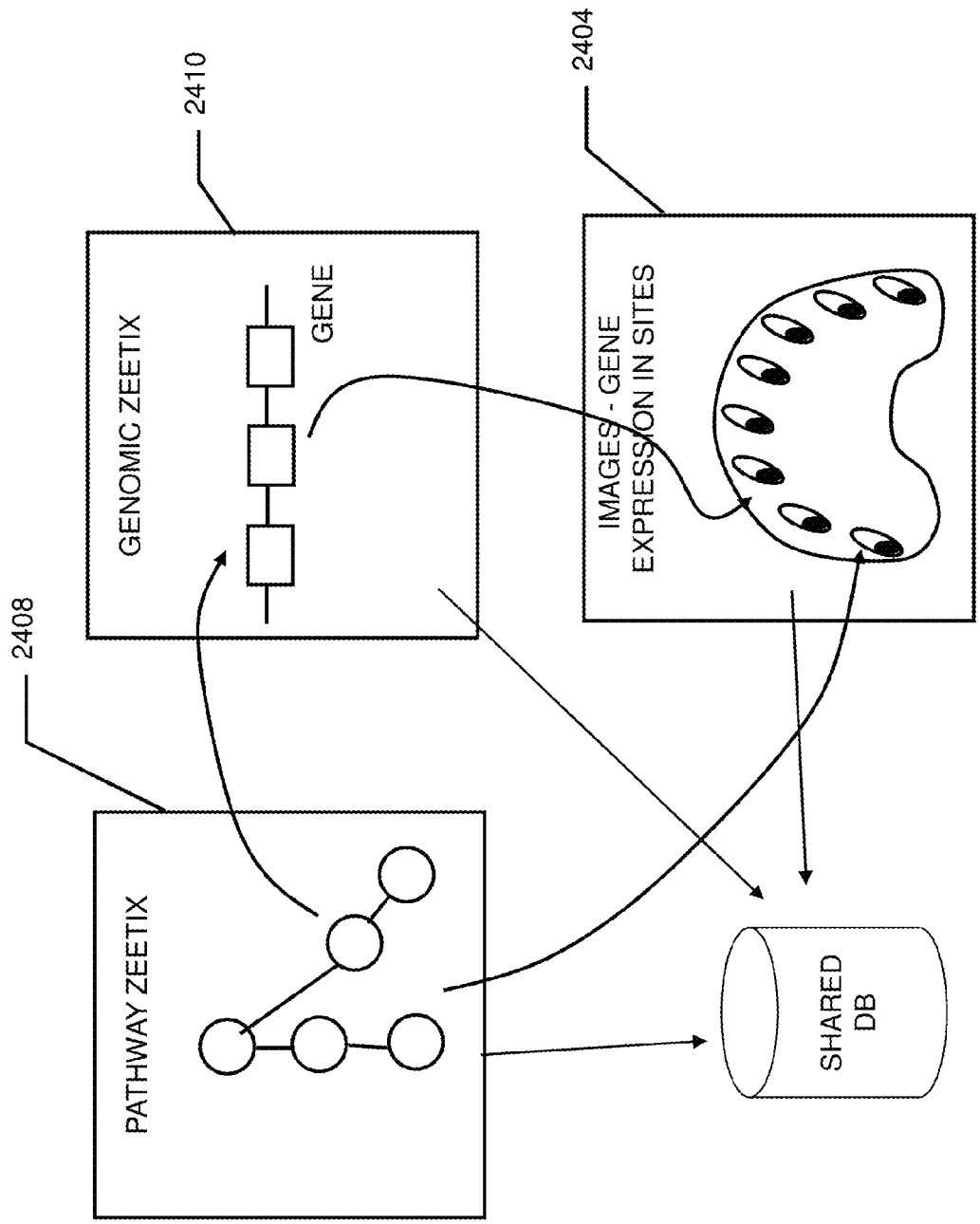
FIG. 24 depicts links between and among Zeetices.

In another example of image and information sharing, FIGS. 22 through 24 depict images captured and shared among a research consortium consisting of labs and experts in different countries sharing images of histological slides. The image sharing methods and systems of Zeetices allow experiments to be performed at one location 2304 and the material annotated by researches at other locations 2308, 2310, 2312. As in other examples of ZeeGuides, an object visualization tree 2202 as shown in FIG. 22 may allow filtering of comments by research field, person, and the like. Restricted publishing and access methods may facilitate third party collaborators seeing certain markers based on their access privileges.

FIG. 24 depicts links between and among Zeetices. These links may be activated through markers or based on the portion of the spatial domain being viewed. In an example, a marker may link the ZeeMap 2404 with a biological pathway Zeetix 2408 or for the specific gene that codes 2410 for this protein.

The methods and systems herein may associated with an Enterprise Application Suite (EAS) that may integrate all aspects of large-company operations. An older term used to capture similar operations is Enterprise Resource Planning (ERP). ERP and EAS systems may include a variety of software and hardware that support various portions of the company operations. Some of the software and hardware may be tightly integrated, while others may be loosely integrated. Achieving high quality overall operation may be accomplished through various type of integration, most often focused around database integration. However, business operation may also be integrated through combinations of interconnected application services. Zeetix methods and systems may be particularly well suited to facilitate movement from an integrated database medium to an interconnected applications services medium.

Zeetix methods and systems facilitates EAS solution providers using visualizations of an existing or contemplated EAS at the earliest stages of design. These visualizations, in a variety of formats, may be processed by the ZeeRIP into layers of map-tiles, thereby defining a ZeeDomain specific to the contemplated EAS. Large-company areas that may be addressed in a ZeeDomain may include manufacturing, supply chain management, financials, project activity, human resources, customer relationship management, data warehousing, and the like. Matching an integration approach to a company is a key challenge of any EAS system. The natural flexibility and modularity of systems built with Zeetix methods and systems may provide compelling advantages. In an EAS vertical system, combinations of separate Zeetix solutions may readily combine by using ZeeTags and SpatialZeeStitches.

Figure 25:
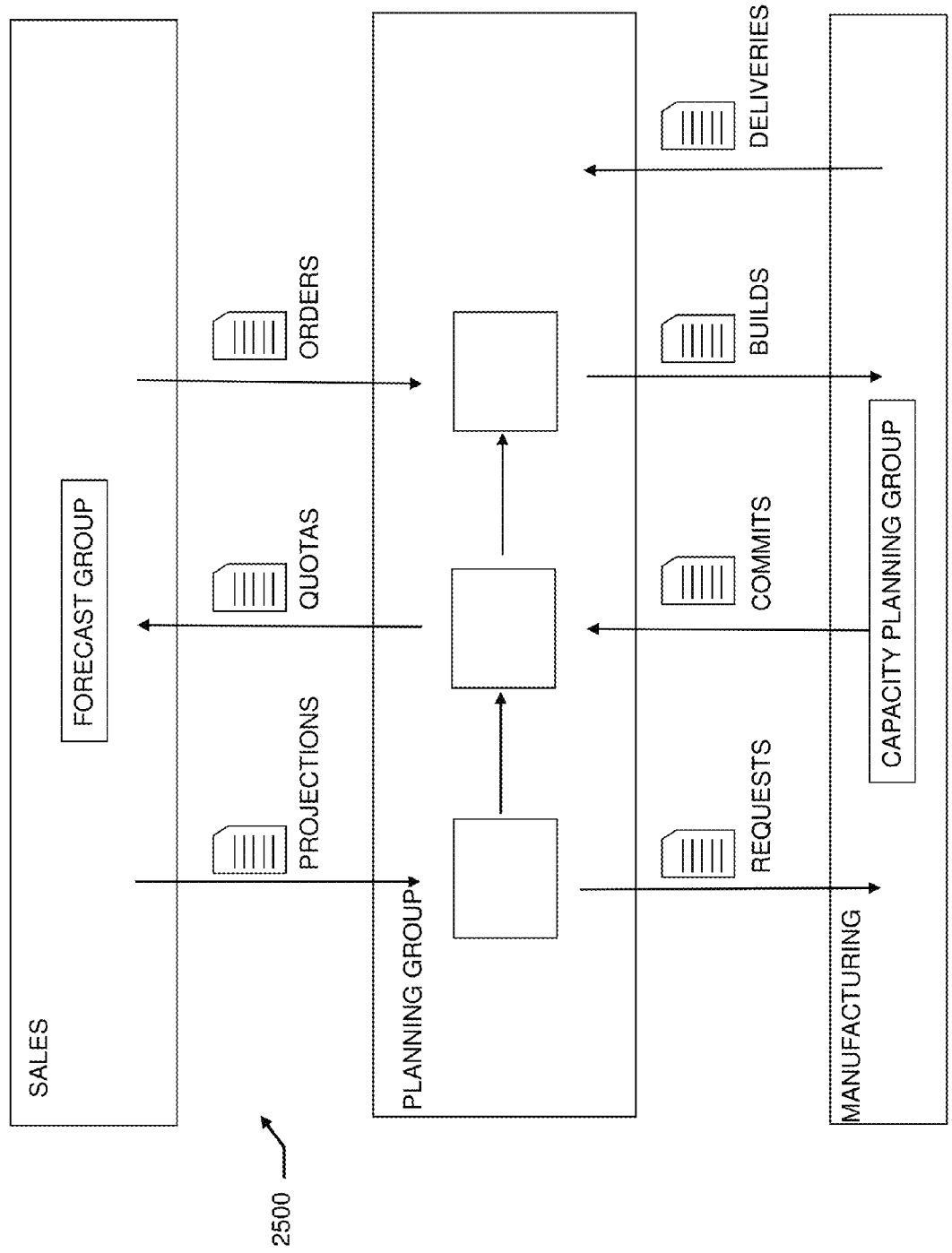
FIG. 25 depicts an Enterprise Application Suite (EAS) operations ZeeGuide.

FIG. 25 depicts an example of using ZeeObjects and other Zeetix methods and systems to develop an EAS system. A printer manufacturer needs to simultaneously interact with their Manufacturing, Sales, and CRM systems. The manufacturer wants to tie together forecasts, production commitments, sales orders, and order inquiries. The manufacturing and sales organizations are meeting to plan their upcoming forecasts. The manufacturer's EAS team has created a visualization, showing the Sales group at the top, the Manufacturing group at the bottom, and the planning group in the middle. Interactions among the groups in the diagram are labeled with the participants. The diagram is provided to the ZeeRIP where it is processed to create a stack of image tiles that define a ZeeDomain (spatial domain) that can be presented in a ZeeGuide 2500 or ZeeMap. ZeeTags are used to annotate the resulting ZeeMap, tying features from the visualizations to programs, information, and data in company information systems. An application is assembled, using various ZeeTools that creates ZeeMarkers, ZeeWindows, and various other user-interface components into an interactive diagram.

Figure 26:
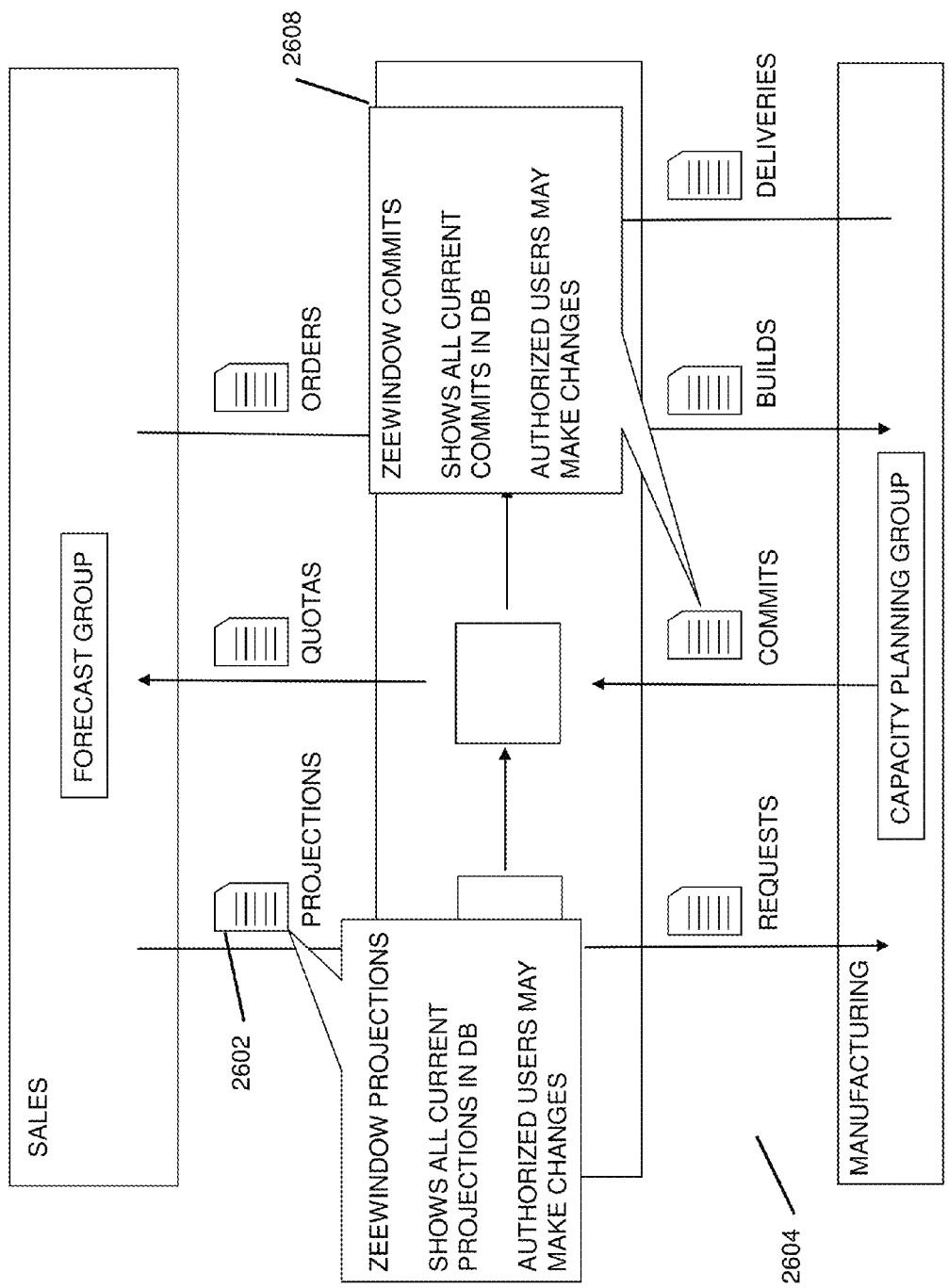
FIG. 26 depicts detailed EAS ZeeWindows overlaying the ZeeGuide of FIG. 25.

FIG. 26 depicts what a manufacturing team member in Asia may view of the ZeeGuide on their web browser. By clicking on the "projections" marker 2602 of the diagram, a ZeeWindow 2604 presenting the current projections in the database opens. The sales representative in Europe asks if the manufacturing has the ability to increase their "commits", and the Manufacturing Rep says "yes, by about 20%". The sales representative, who has the same application open in her web browser on her screen in Zurich, Switzerland, clicks on the same "Projections" marker. Because the application knows from the sales representative's user profile that she is authorized to change the sales projections, the ZeeWindow that opens on her screen includes the option to change the projection. She does so, increasing the projections by 20%. She clicks "Save Changes", and the window closes. The Manufacturing Representative hits his browser "refresh" button, and the new numbers appear in his "projections" ZeeWindow. The Manufacturing Representative clicks on his "Commits" marker 2608, and increases his commits. As soon as this change is made, each user of the Supply Chain Management system sees those changes, such as the purchasing agent responsible for placing an order for printer cases can see the revised requirements.

Figure 27:
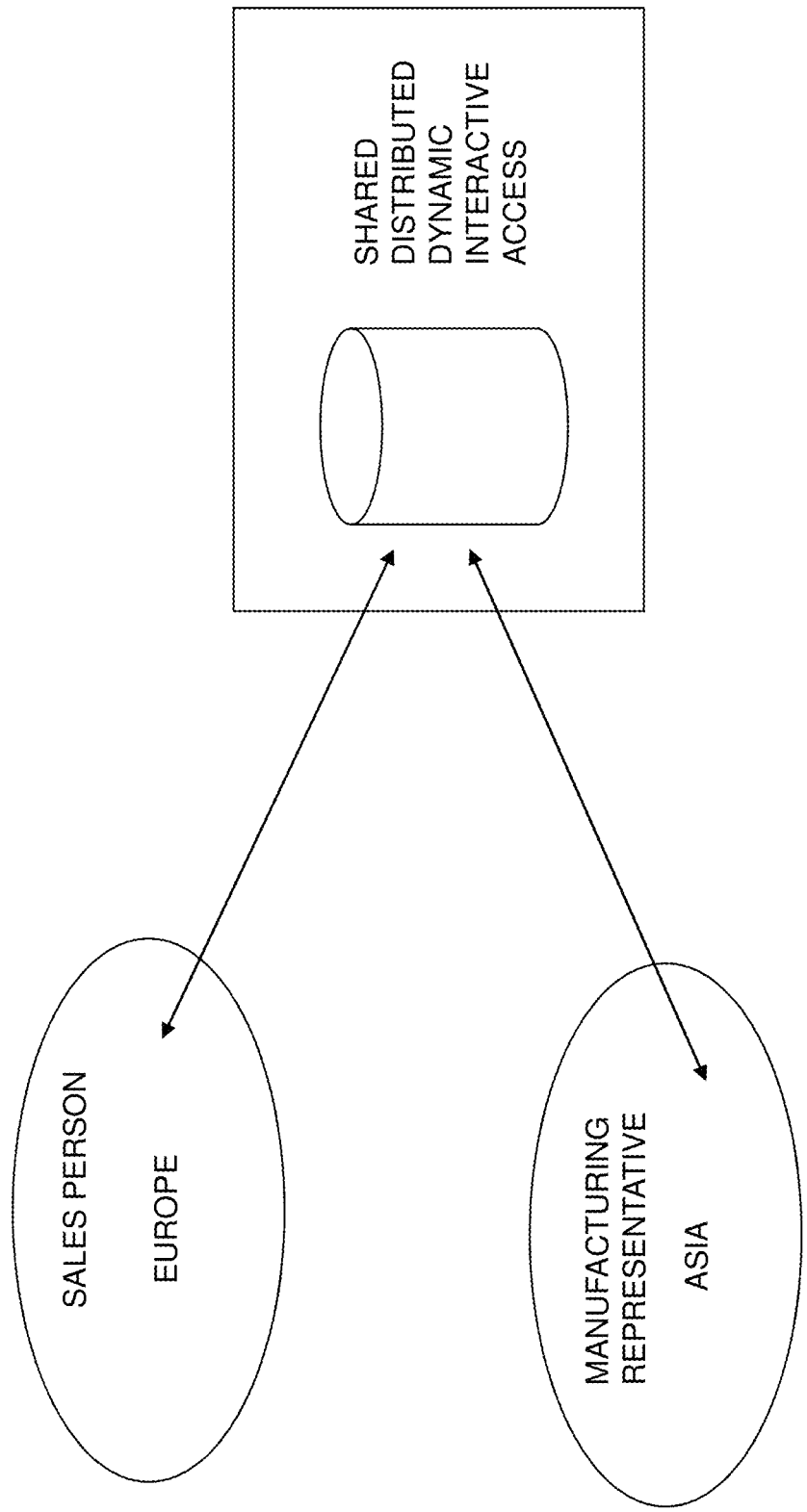
FIG. 27 depicts information sharing in an EAS scenario.

As depicted in FIG. 27, geographically separated entities with differing responsibilities may share information within an Enterprise Application Suite using Zeetix shared, distributed, dynamic, interactive access such as may be available through a ZeeStore or ZeeSys shared database.

Data sources for an EAS or business process re-engineering project may include SAP systems, legacy data, current production data, third party projections, customer demand, shipping schedules, union contracts, vacation plans, production preventive maintenance schedules, filters, middleware data converters, and the like.

The ZeeObjects and other Zeetix elements in the EAS scenario may include and benefit from relationships with other Zeetix systems, with supplier and third party systems, with a company's legacy systems, and the like. The EAS scenario may be generalized to a wide variety of company functions, processes, and activities including:

Manufacturing—Engineering Systems, Bills of material, Scheduling, Capacity planning, Workflow Management, Quality Control, Cost management, Manufacturing Process Engineering, Manufacturing Project Management, Manufacturing Flow, and other Manufacturing operational aspects.

Supply Chain Management—Inventory, Order Entry, Purchasing. Product Configuration, Supply Chain Planning, Supplier Scheduling, Incoming Inspection, Claim Processing, Commission calculation, and other Supply Chain Management operational aspects.

Financials—General Ledger, Cash Management, Accounts Payable, Accounts Receivable, Fixed Assets, and other Financial operational aspects.

Projects—Costing, Billing, Time and expense, Activity management, and other Project operational aspects.

Human Resources—Payroll, Training, Time & attendance, Benefits, Career Development, Salary and Compensation, and other Human Resource operational aspects.

Customer Relationship Management—Sales and marketing, Commissions, Customer Contact, Call Center Support, and other Customer Relationship Management operational aspects.

Data Warehousing—Data storage and services, Self-serve customer interfaces, Self-serve supplier interfaces, Self-serve employee interfaces, and other Data Warehousing operational aspects.

Zeetix methods and systems may be associated with hyperlocal publishing scenarios. Every news story has a location (a 'where') that may be represented as spatial information organized to facilitate displaying the news story and related information. A hyperlocal ZeeGuide may provide spatial context for publication of information, including news stories. An interpretation of hyperlocal includes taking a 'bottoms-up' focus based on geographically local content collection and publishing. Additionally, hyperlocal publishing is often "real time" publication occurs contemporaneously with the unfolding events being captured. Consequently, hyperlocal publishing is often dominated by raw, unedited information that may lack sufficient textual description of context. Therefore a viewer of the raw unfolding events may not know if the event is occurring in their building or in a similar building several blocks away. Therefore spatial location context of the data sources and events is a crucial aspect of establishing hyperlocal publishing reliability.

Figure 28:
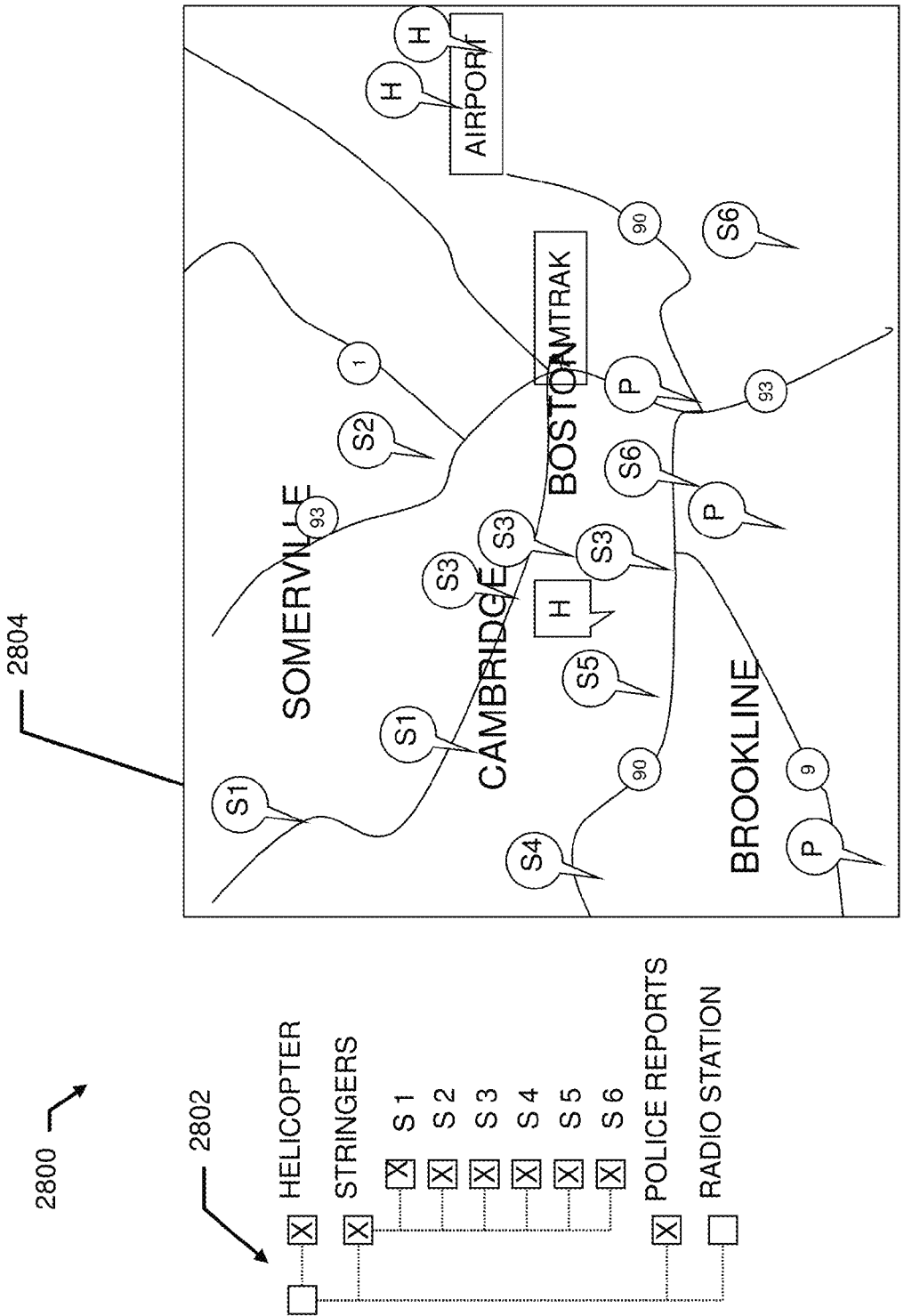
FIG. 28 depicts a hyperlocal publishing ZeeGuide.

As depicted in FIG. 28, a hyperlocal ZeeGuide 2800 may include a visualization tree 2802 and a ZeeMap 2804. Selections in the tree 2802 may appear as markers on the ZeeMap 2804. Information pertinent to hyperlocal publishing may include markers for helicopters, police action, stringers, and the like. The information in the ZeeGuide may be acquired from real-time sources such as air traffic control systems, police call systems, stringer mobile devices, and the like.

Figure 29:
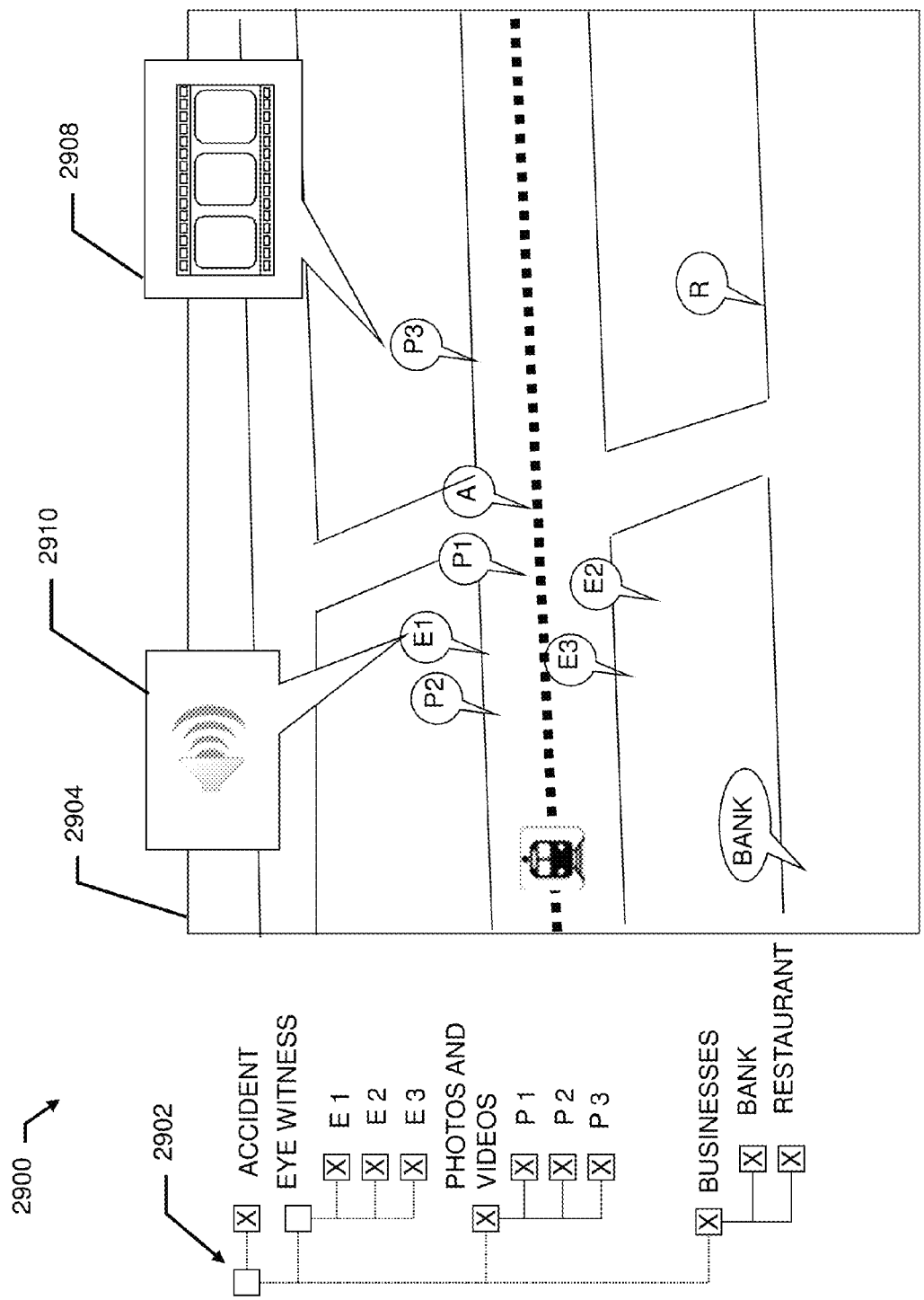
FIG. 29 depicts an unfolding hyperlocal publishing story ZeeGuide.

In another example of a hyperlocal publishing application of Zeetix methods and systems, FIG. 29 depicts a hyperlocal publishing ZeeGuide that may be used to capture a trolley colliding with a truck on a busy street in an urban neighborhood. A neighborhood resident hears helicopters hovering overhead and wonders what happened. The resident may view a hyperlocal ZeeGuide 2900 for her neighborhood that includes a map 2904 of the neighborhood with several markers that identify a story "in progress". An object visualization tree 2902 may show several categories of information—real-time video feeds from helicopters (e.g. shown as moving markers on the map), police reports (shown as markers positioned where the police report was generated), eyewitness reports, geo-tagged cell phone images and video clips, and so on. The resident may use navigation features of the ZeeGuide to zoom in on the area of the markers to view details of the markers. As the resident selects or pauses her cursor over a marker, information may be displayed in a ZeeWindow based on the type and attributes of the ZeeObject represented by the marker. One marker might be a real-time blog being typed by a local "stringer" on the scene, where the marker for the blog is geotagged with the stringer's location. When the visitor clicks on the marker, it opens into a ZeeWindow in which she reads the blog, unfolding in real-time. Another marker might be a camera icon showing the geotagged location of a recently-collected cell phone video of the incident. The visitor double-clicks on the marker and opens a video ZeeWindow 2908, within which she views the video. Later, as time unfolds, editors might collect, edit and modify the story. The real-time contemporaneous data gathered as the story unfolds is stored as its own ZeeObject in a ZeeStore, and another more polished ZeeObject can be created from the edited material.

Further in the example, on the next day, the visitor views the online issue of a local newspaper and she may find a single marker in the display of the online newspaper referencing the incident. By selecting the story marker, a summary opens in a ZeeWindow, inviting her to double-click a link to another ZeeGuide specific to that story. Selecting the specific Zee-Guide link, she sees a ZeeGuide with edited and validated information and with key locations still indicated on the associated map. She is able to zoom in on the collision site, (e.g. in "satellite view") and see the intersection where the incident occurred. She sees markers showing the locations of eyewitnesses interviewed by the reporter so that she can see for herself where they were when the incident unfolded and by selecting the eyewitness marker may hear, through an audio ZeeWindow 2910 the eyewitness account. The incident specific ZeeGuide might include a marker that may link to the "raw" ZeeGuide that she saw earlier, which is now available as a data source for the specific ZeeGuide.

The hyperlocal publishing ZeeGuide example maps may include markers of area businesses showing their locations. The markers may be purchased virtual property rights that may include advertisements for the businesses or products and services offered by the businesses. In the example, the resident might see a marker for the BankAmerica branch on the corner of incident intersection, and might see marker for a Japanese restaurant across the street that appears new to her. The marker may indicate, for example, that the restaurant has recently opened. The resident may select the Japanese restaurant marker, thereby opening a ZeeWindow in which she may make a reservation for lunch or dinner.

Data sources for this example of hyperlocal publishing ZeeGuides may include any source of information available over the internet. The various sources of reporting that are mentioned in the example may be collected through search spiders, RSS feeds and the like. This example show potentially valuable relationships among ZeeObjects that may be exploited by the methods and systems herein. From a real-world incident, a user of a local ZeeGuide has gotten informed of events in here area including locations of important businesses and a new restaurant. The raw ZeeGuides that are being developed during an event may become archives of valuable historical information sources in the future. Zeetix methods and systems facilitate all aspects of information gathering, information relationships, and information archival.

Figure 30:
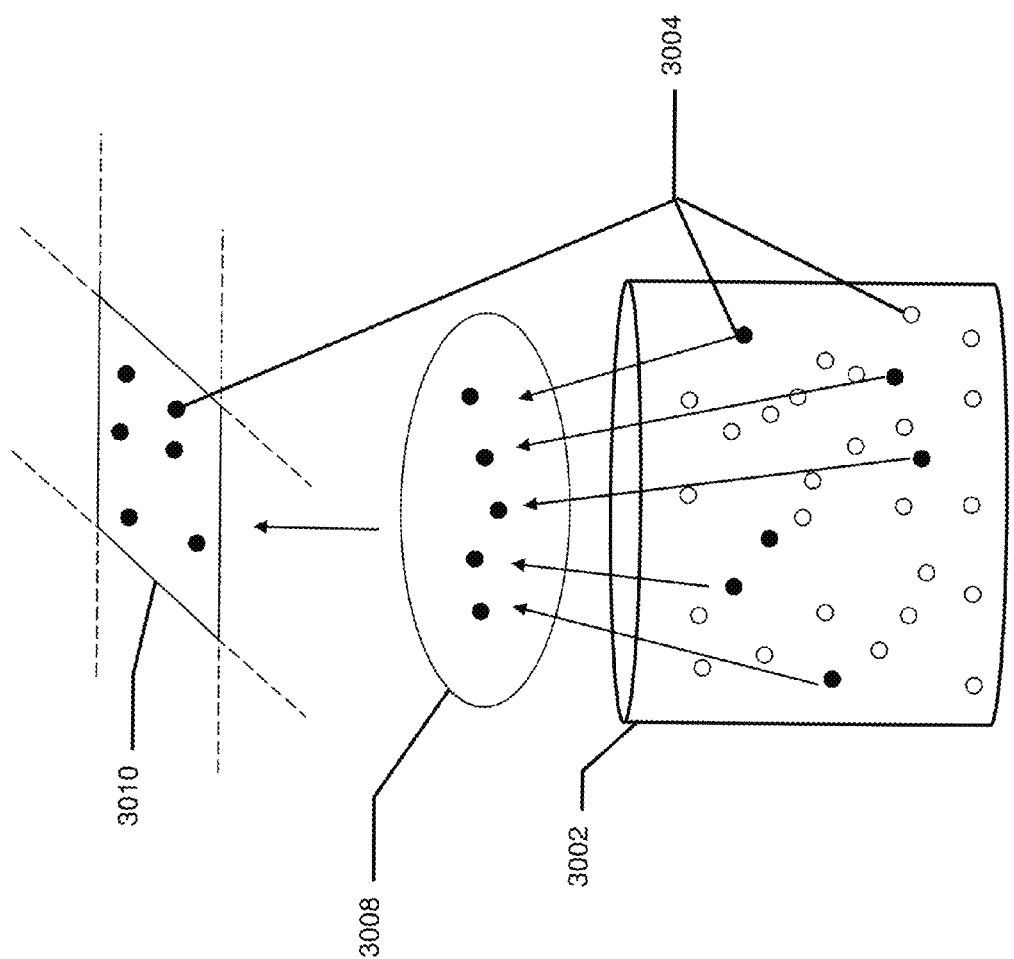
FIG. 30 depicts the relationship among data in a ZeeStore, a ZeeTile, and a ZeeMap.

Referring to FIG. 30, a relationship among data in a ZeeStore, a ZeeTile, and a ZeeMap is depicted. A ZeeStore 3002 may comprise a variety of data items, such as database items 3004. A ZeeTile 3008 may reference a select plurality of database items 3004 so that the referenced database items may be identified, operated on, and otherwise referenced through their referring ZeeTile 3008. The ZeeTile 3008 may be mapped, such as through a ZeeRIP to a map tile 3010 that may comprise one or more visualization layers and may be presented in a ZeeMap.

Figure 31:
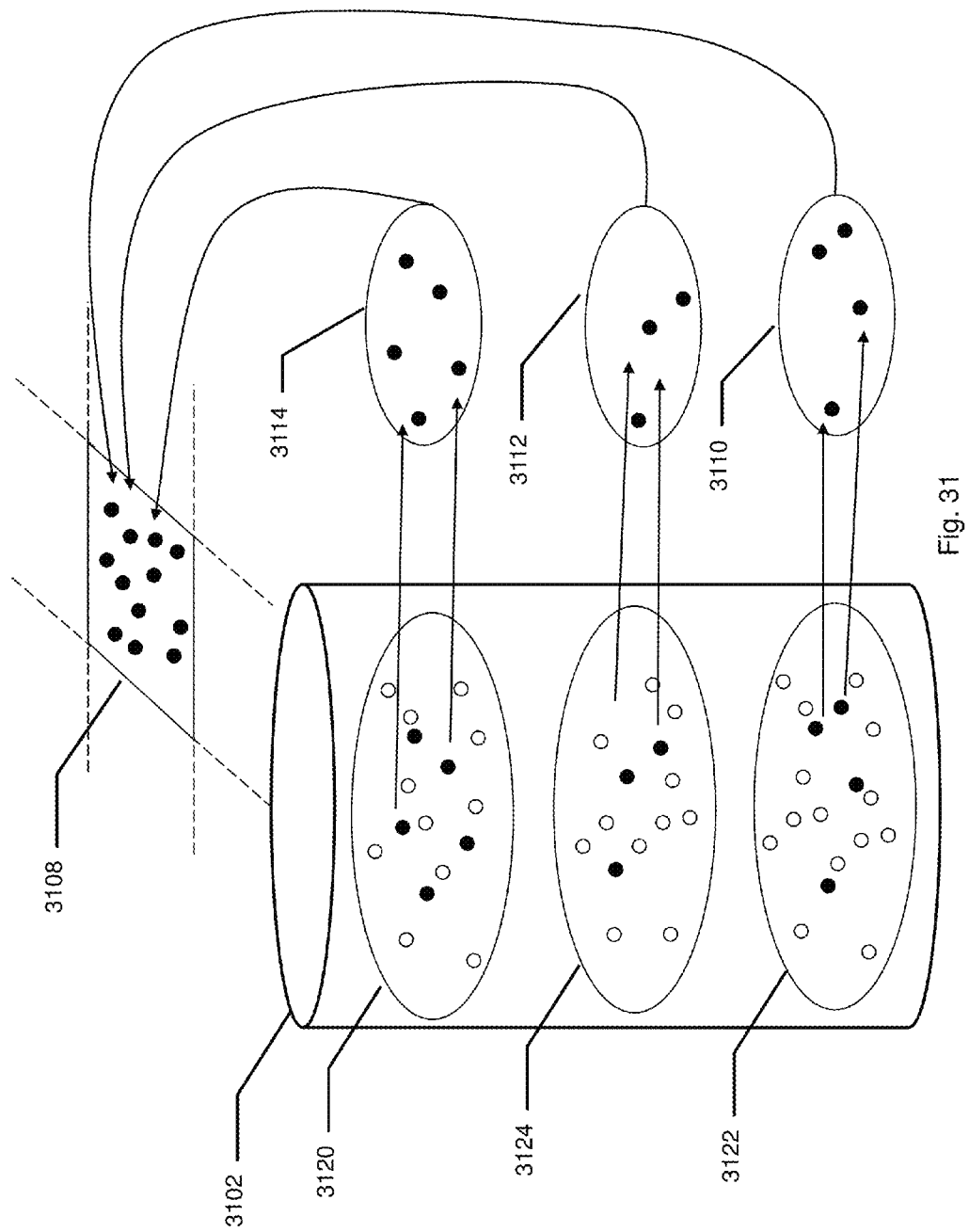
FIG. 31 depicts relationships among objects and ZeeTiles.

Referring to FIG. 31, a ZeeStore 3102 may contain hospital objects 3120, hotel objects 3122, restaurant objects 3124, and other objects. Alternatively ZeeStore 3102 may be comprised of a plurality of distributed storage facilities each housing one or more type objects. ZeeTiles that contribute objects to render map tile 3108 might be comprised of a hotel tile 3110 for that map tile, containing just the hotels, a restaurant tile 3112 containing just the restaurants, a hospital tile 3114 containing just the hospitals, and so on.

In the example of the FIGS. 30-31, a ZeeGuide for a specific hospital might display the urban medical area that surrounds the hospital; a set of several ZeeTiles might render that area in a map to be displayed in the ZeeGuide. One of those tiles might render the area that contains the specific hospital. As shown in FIG. 31, the ZeeGuide might display, as markers, the hotels and restaurants in the neighborhood of the hospital.

Figure 32:
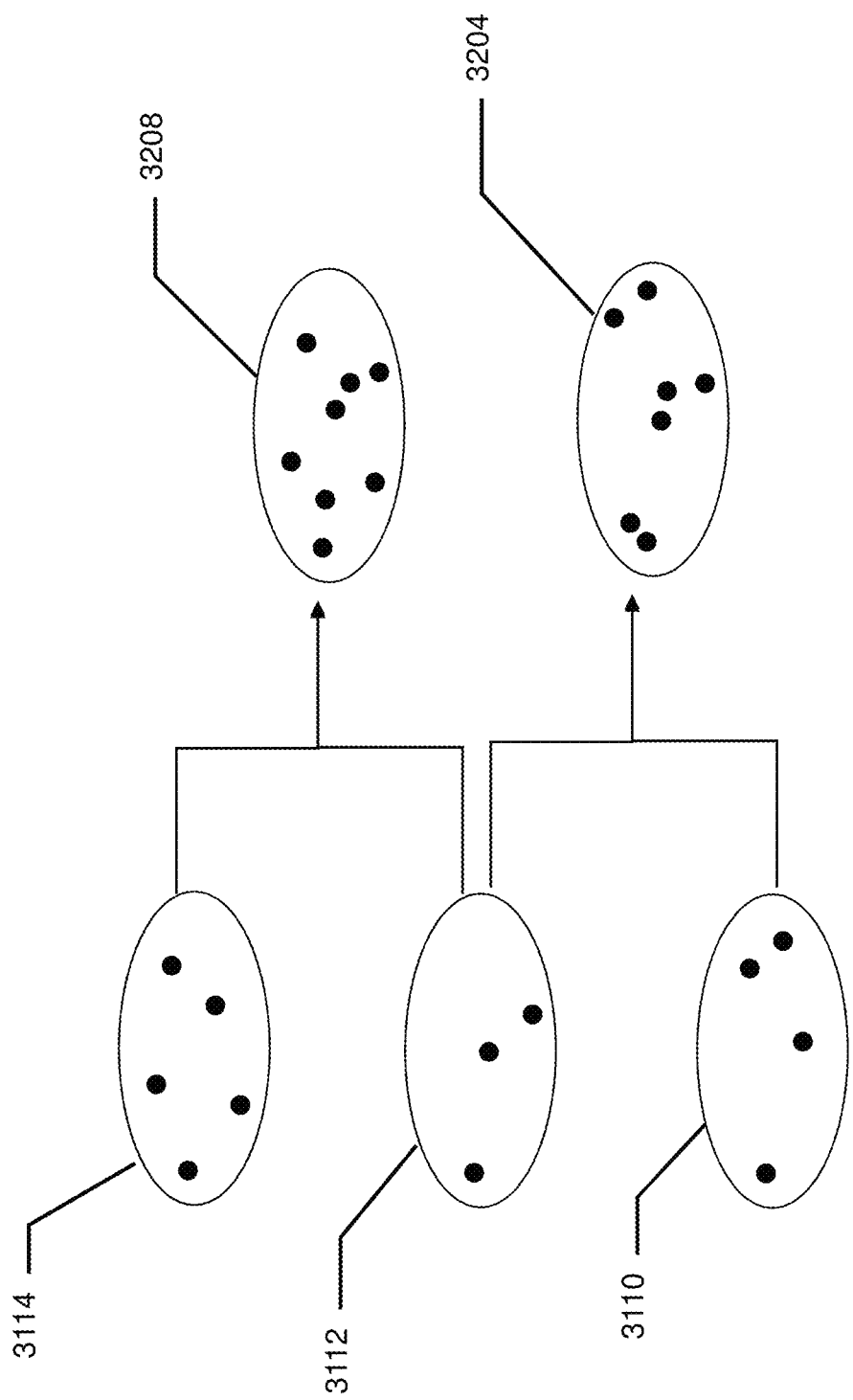
FIG. 32 depicts the recursively layered composition of ZeeTiles.

FIG. 32 depicts a way that ZeeTiles recursively decompose into layers. Three "primitive" ZeeTiles might contain hotels 3110, restaurants 3112, and hospitals 3114 (further described in FIG. 31). In FIG. 32, two composites of these primitive ZeeTiles 3110, 3112 and 3114 are shown. A composite ZeeTile 3204 may contain just the hotels 3110 and restaurants 3112. Another composite ZeeTile 3208 may contain just the hospitals 3114 and restaurants 3112. These primitive and composite ZeeTiles may, together with the possible use of a ZeeCache, improve spatial data store access.

An object query that returns the markers, hotels, and restaurants located in, for example map tile 3108 of the geographic map of FIG. 31, might be cached 3204 and answered whenever tile 3108 is requested. This Zeetile 3204 might in turn be comprised of two other ZeeTiles, 3110 for hotels to be rendered in the map tile 3108, and 3112 for restaurants to be so rendered.

Further in the example, another ZeeGuide might exist for a neighboring hospital. This second ZeeGuide might display, as markers, the hotels and restaurants in the neighborhood of this second hospital. Because both hospitals are located in the same map tile 3108, they may share the cached hotel and restaurant ZeeTile 3204. Similarly, hospitals and restaurants for map tile 3108 may be cached in 3208. This may significantly improve spatial database access.

In a further development of this example, a third ZeeGuide might exist for one of the restaurants in map tile 3108. This third ZeeGuide might display, as markers, the hospitals and hotels in the neighborhood of this restaurant. Because the hotels for this third ZeeGuide are the same as the hotels for the first two, the hotels might be referenced in ZeeTile 3110, and the hospitals may be referenced in ZeeTile 3114.

These pre-computed spatial queries may provide performance benefits for spatial database access analogous to the performance benefits for spatial image access provided by these map tiling techniques.

A Zeetix may be associated with a business scenario such as managing a supply chain. Supply Chain Management describes how the operations of a Supply Chain are planned, deployed, and controlled. This includes the flow of raw materials, work-in-process management and the handling of finished goods. In short, the end-to-end flow of materials from origin to consumption may be managed in a supply chain operation.

Figure 33:
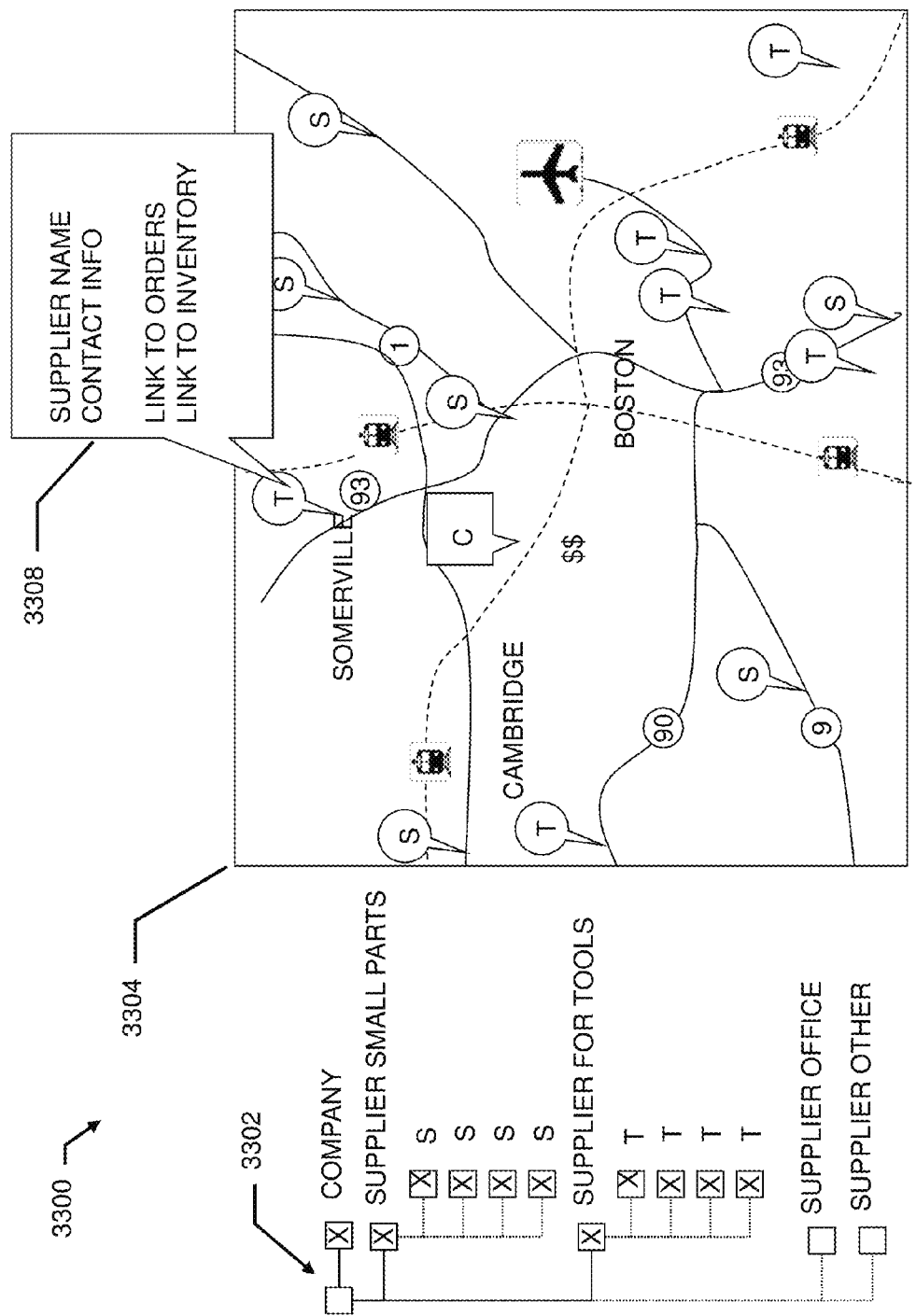
FIG. 33 depicts a ZeeGuide showing supplier locations

FIG. 33 depicts an example of a company that needs a system to manage both the locations and quantity of suppliers. A supplier ZeeGuide 3300 may be opened with one or two panes including an interactive supplier geographical map 3304 and a visualization tree 3302 containing an enumeration of various categories of suppliers. Many companies manage suppliers through an approved vendor list that is typically represented by a text display of information about the supplier, or in an alphabetized list of suppliers. Many supply chain management systems use acronyms or other abbreviations for suppliers making the list or text display even more challenging to view and understand. Each supplier present in the tree 3302 is represented with a corresponding ZeeMarker on the map 3304 so that the ZeeMarker is located at the geographic position on the map 3304 corresponding to that supplier. Various kinds of suppliers, perhaps differentiated by category in the tree 3302, might be represented by various corresponding kinds of markers on the map 3304. The user uses the map 3304 to navigate to a particular supplier by zooming and panning the map as needed. Alternatively, the user may identify one of the suppliers on the tree 3302 for viewing and the map 3304 may automatically scroll/zoom to bring the selected supplier into view in the map 3304. The user selects a supplier marker, causing a supplier detail ZeeWindow 3308 to popup that contains information specific to that particular supplier. The resulting supplier ZeeWindow 3308 might contain information such as the name and address of the supplier, particular information such as contract terms, inventory, goods-on-order for that supplier, and so on. The window 3308 might also include links that open other windows or ZeeGuides. The user might zoom into a particular neighborhood or region in order to see, at finer detail, the geographic relationship among suppliers in that neighborhood or region.

Figure 34:
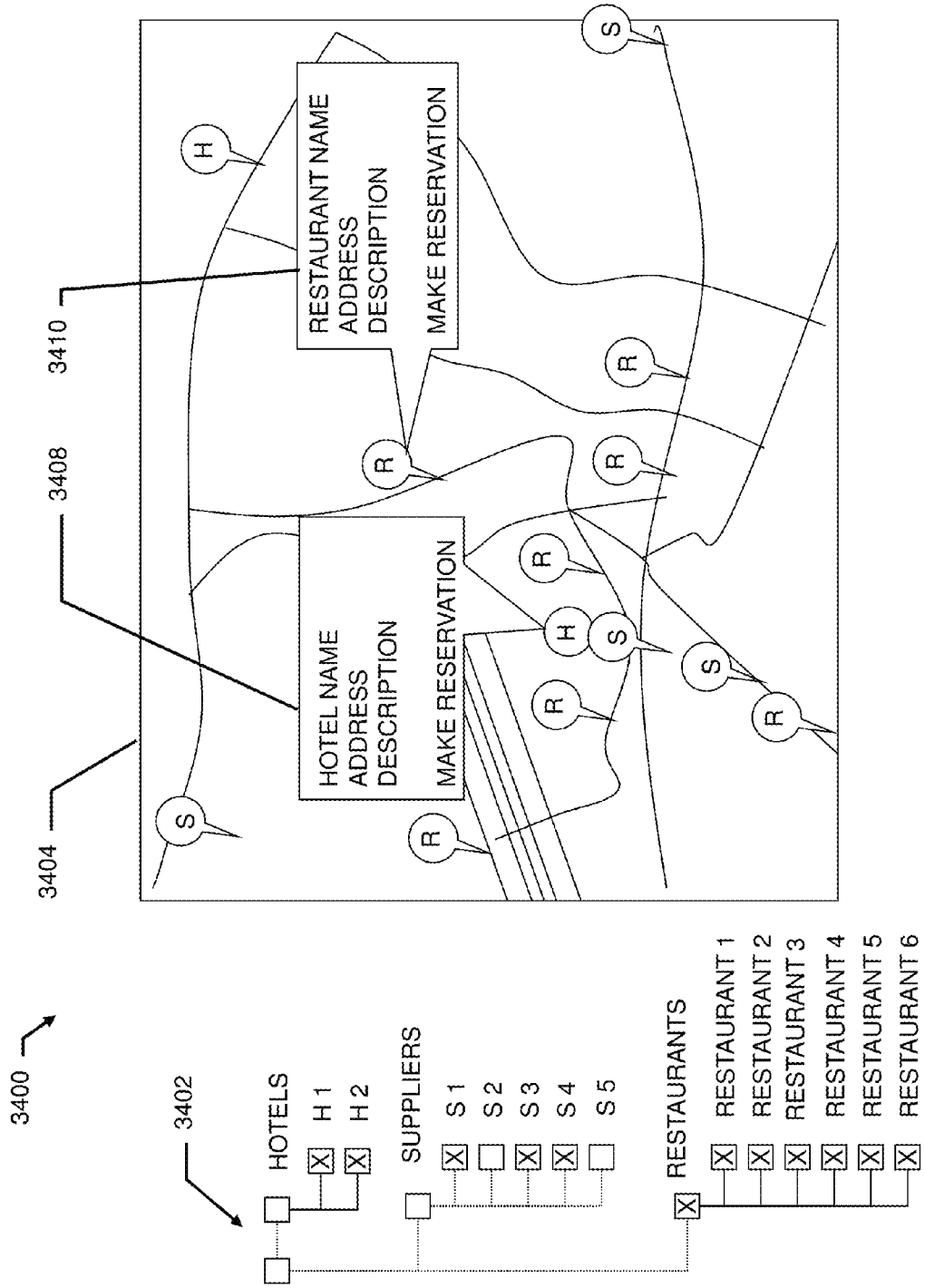
FIG. 34 depicts a manager using the ZeeGuide of FIG. 33 to arrange a lunch or dinner meeting.

FIG. 34 depicts how a manager within the above company who needs to schedule a meeting, including a business lunch and dinner, with key representatives of three suppliers can do so within a specific neighborhood or region. The manager uses the above ZeeGuide to identify and navigate to the neighborhood or region in question, selecting markers to collect the contact information for the representatives in question. She adds, to her browser, a hotel and restaurant ZeeGuide 3400 for the region in question so that she views in her browser a ZeeMap that includes markers for selected suppliers, hotels, and restaurants. She selects a suitable hotel on the hotel and restaurant ZeeGuide 3400. She selects its ZeeMarker and opens its ZeeWindow 3408. Inside the hotel ZeeWindow 3408, she selects through to a hotel reservation page and makes a pre-paid reservation. She selects a restaurant marker using the ZeeGuide 3400 for the lunch and dinner meetings. Because the ZeeGuide 3400 provides access to a variety of data systems, the manager can view details about the restaurant in an overlay ZeeWindow 3410 and make the necessary lunch and dinner reservations.

Figure 35:
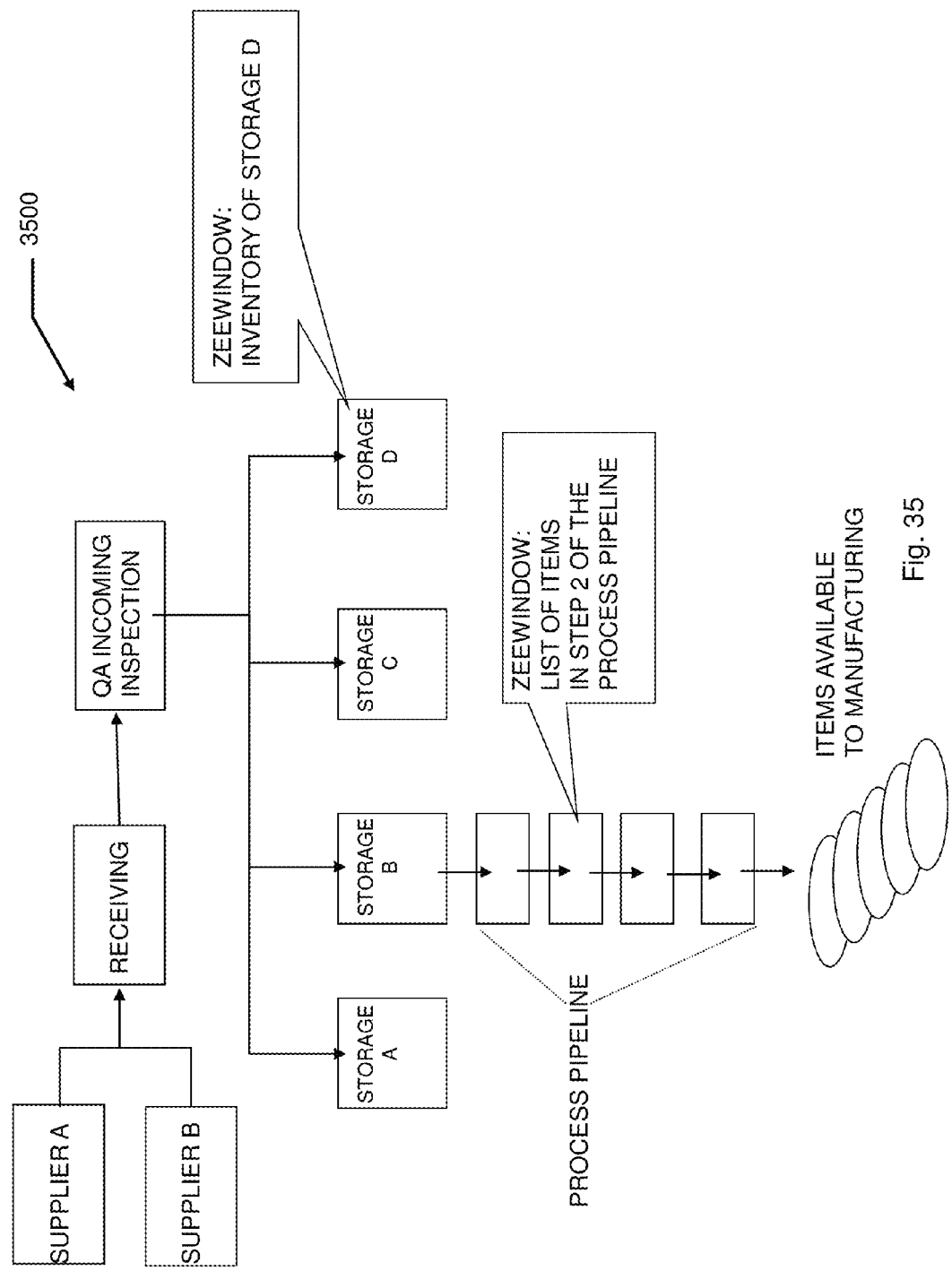
FIG. 35 depicts a Supply Chain Management ZeeGuide
Figure 36:
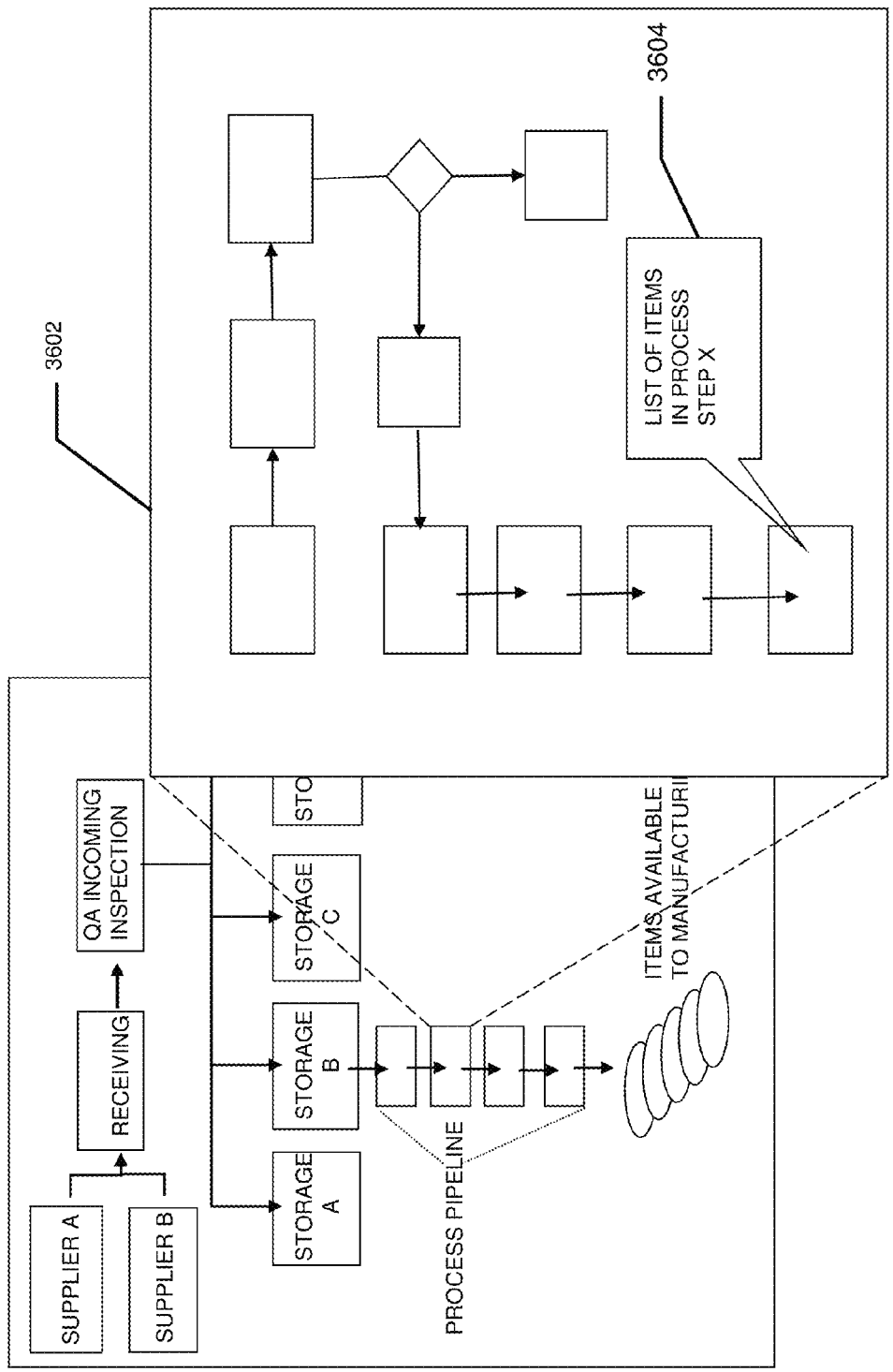
FIG. 36 depicts another ZeeGuide showing detail of a step in FIG. 35.
Figure 37:
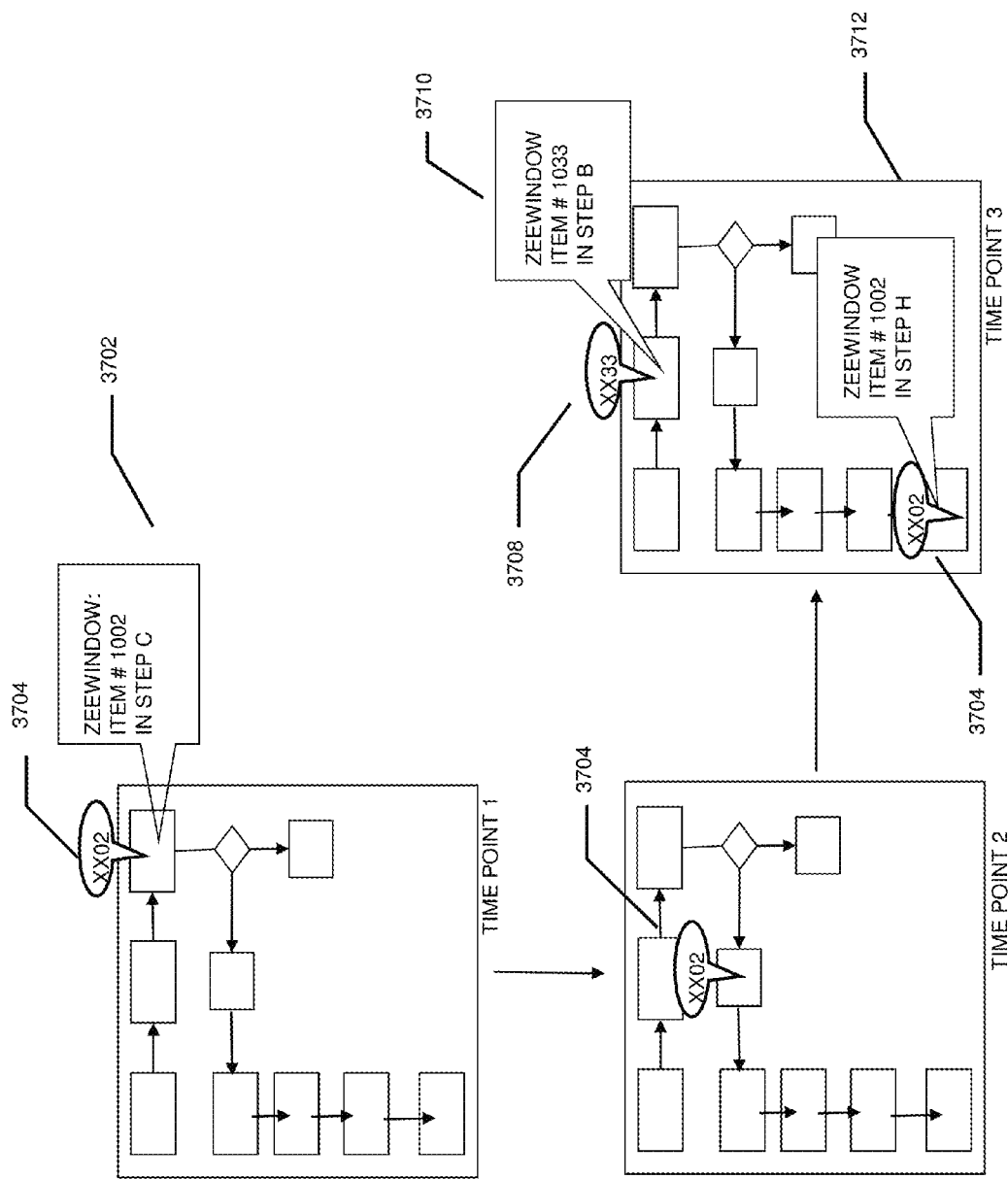
FIG. 37 depicts a tagged item moving through a process represented in the ZeeGuide in FIG. 36

In FIGS. 35-37, a company needs a system to manage the quantity and location of its inventory, including raw materials, work-in-process, and finished goods. The project team, perhaps in consultation with Zeetix representatives, designs a "model" or "strategy" for how they choose to think about the inventory management system. This model includes a visual representation, in the form of some sort of block or flow diagram, of the contemplated solution. This visualization might begin with a high-level "pipeline" showing process steps, process choices, connections between process steps, and so on. The visualization may be stored in a variety of formats, ranging from jpg images of hand-drawn sketches to structured graphics in file formats from tools like visio. The visualization is provided to the ZeeRIP where it is processed to create a stack of image tiles that define a ZeeDomain (spatial domain) that can be presented in a ZeeGuide or ZeeMap. ZeeTags are used to annotate the resulting ZeeMap, tying features from the visualizations to programs, information, and data in company information systems. An application is assembled, using various ZeeTools that creates ZeeMarkers, ZeeWindows, and various other user-interface components into an interactive diagram.

FIG. 35 depicts an exemplary visualization of a supply chain pipeline ZeeGuide 3500 for some company. This visualization has been passed through the ZeeRIP, which defines a ZeeDomain, and includes ZeeWindows that are positioned in the ZeeDomain of this visualization using ZeeTags.

FIG. 36 depicts a ZeeGuide 3602 that results from zooming in on one of the Process Pipeline Steps in FIG. 35. The ZeeGuides in FIG. 35 and FIG. 36 share access to the same information, such as in a ZeeStore. A user has opened a ZeeWindow 3604 on the zoomed-in ZeeGuide 3602. This detail ZeeWindow 3604 displays a list of items currently in process for the specific process step to which it is attached. The list is updated in real-time from a database associated with the process and/or the process step with which ZeeWindow 3604 is associated.

The user may also add ZeeMarkers and ZeeWindows that annotate key image features. Each ZeeMarker may be attached to a specific item in a process using a ZeeTag. As the item progresses through the pipeline, it's ZeeMarker and ZeeWindow moves through the ZeeGuide accordingly.

The user might interactively apply a "tag" to a particular item, causing another marker with a distinctive icon to appear on the visualization and identify the location and flow of that specific item through the remainder of the process. The user might click on this "item tag" at any subsequent step to determine more information about that item as it is processed. Various zoom levels might have different representations, just as geographic maps change their appearance based on scale. Items that are tagged can be tracked at ANY zoom level as they move through the entire pipeline. Note that because users interact with the system through standard browsers, users can be distributed anywhere in the world. This is particularly valuable for large, highly-distributed multinational companies.

In FIG. 37, showing the zoomed ZeeGuide 3602 of the process pipeline steps of FIG. 36, the user has opened a ZeeWindow 3702 at some time "TimePoint 1", identified item XX02 in process step C of the process, and has attached a ZeeMarker 3704 to item XX02. The position of the ZeeMarker 3704 shows that the annotated item XX02 is in Process Step C.

At some later time "Time Point 2", the user has closed the ZeeWindow 3702. Meanwhile, the item has advanced from Process Step C to a different process step in the same pipeline process. The new position of the ZeeMarker 3704 referencing the part XX02 shows this new location.

At some later time "Time Point 3", the annotated item XX02 has moved to yet another pipeline step, Process Step H. This is reflected in the new location of the annotated ZeeMarker 3704 for item XX02. The user has opened a Zee- Window 3712 on the annotated ZeeMarker 3704 and sees the relevant information for Item XX02 that is now in Process Step H. This information has been updated in real-time from the information maintained in a shared ZeeStore.

The user has also opened another ZeeWindow 3710 on a different item, Item XX33, at a different step Process Step B in the same processing pipeline. The user has annotated Item XX33 with another ZeeMarker 3708 so that the progress of item XX33 can also be followed, in real time, through the processing pipeline.

In this Supply Chain Management ZeeGuide, each ZeeWindow might itself be another ZeeGuide, or might be an html window showing details such as the specific items currently being handled at that step, what's been done by them, and the like.

Supply chain data sources may include a wide variety of data sources that already exist in a corporation information system that supports supply chain management. The combination of spatial tags and visualizations processed by the ZeeRIP allows ANY information or data that exists on the web to be integrated into a system as herein described. In a common spatial domain, Zeetices compose with other Zeetices on the same map.

The supply chain management examples of FIGS. 33-37 may be generalized to solutions of at least the following four additional supply-chain management problem areas:

Distribution network configuration: The flow between suppliers, number and location of Suppliers, Production facilities, Distribution Centers, Warehouses, and Customers. Distribution Strategy: Spatially-organized approaches to centralized vs. decentralized facilities, direct shipping, cross-docking, push or pull strategies, third-party logistics Information systems: Interactive visualizations of information systems throughout a supply chain that share information and data about, demand signals, forecasts, Inventory, and Transportation Cash-flow: Interactive visualizations pertaining to the arrangement of payment terms and the methods for exchanging funds across and among entities within a supply chain.

Each of these four areas may also use Zeetix technology to organize and present geographically-organized information such as facility locations, routes, and regions.

This area includes, without limitation, compositions and integrations of systems that organize information geographically with systems that organize information spatially within arbitrary visualizations.

A ZeeGuide may help people do research on organizations in multiple ways. A ZeeGuide user may experience this as a single, unified, user interface. Organizational Research (OR) may be split into three segments:

Ownership Research: Who are the investors in organization XYZ? Conversely, does organization XYZ have an ownership stake in any other organizations?

Partner Research: What is the relationship between organization XYZ and other organizations? Who are company XYZ's suppliers, distribution partners, marketing partners, sales affiliates, etc?

Organization Information: For organization XYZ, who are the officers and directors, who are the key leaders (CEO, CFO, CTO, etc.)? Also, if the company is publicly reported, what is their revenue, expenses, etc?

Figure 38:
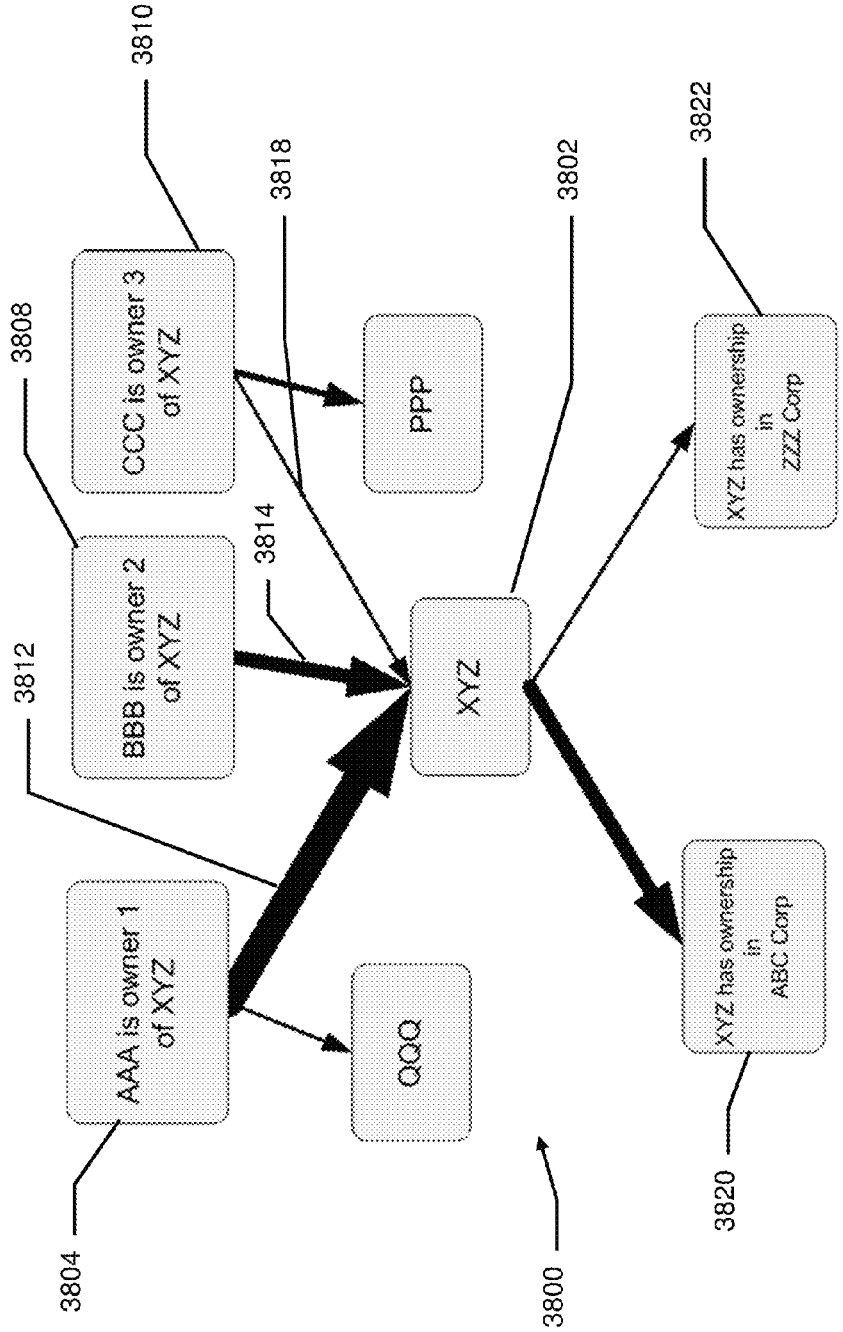
FIG. 38 depicts a Zeeguide showing ownership interests in organizations
Figure 39:
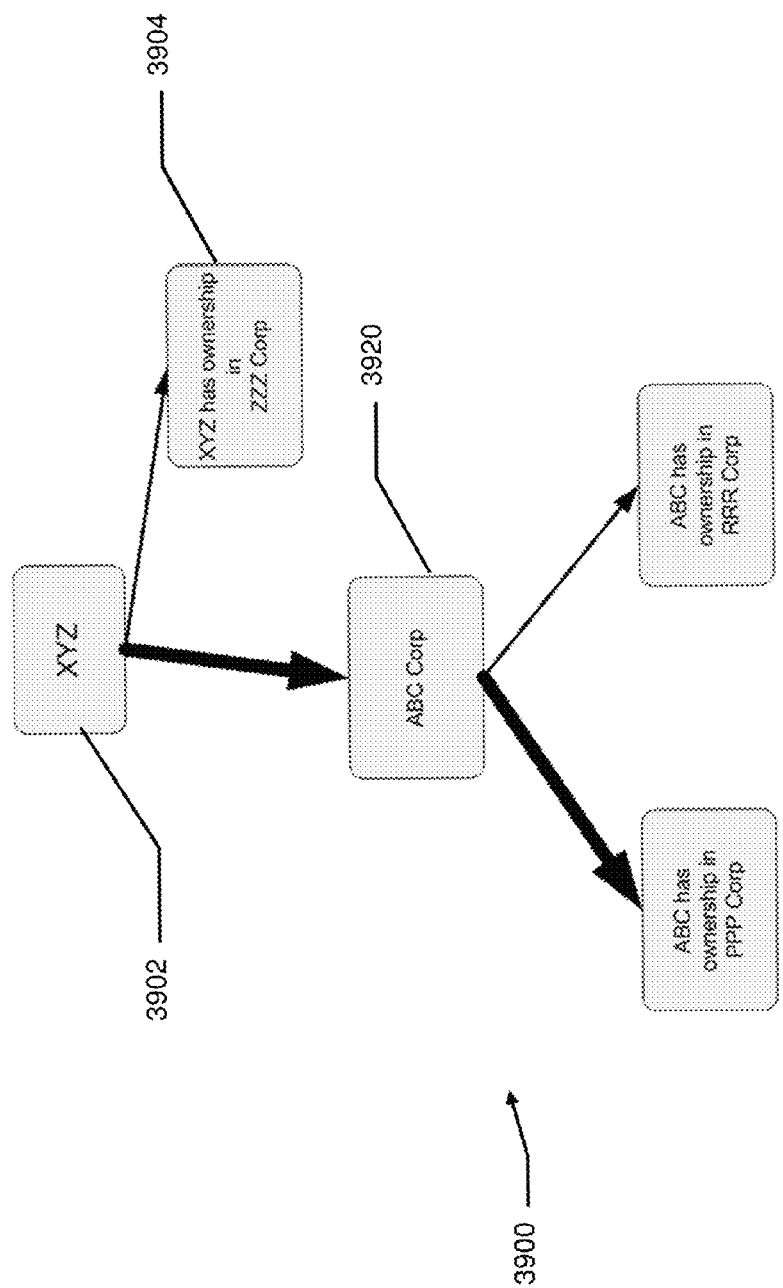
FIG. 39 depicts a ZeeGuide resulting from selecting a marker on the ZeeGuide described in FIG. 38
Figure 40:
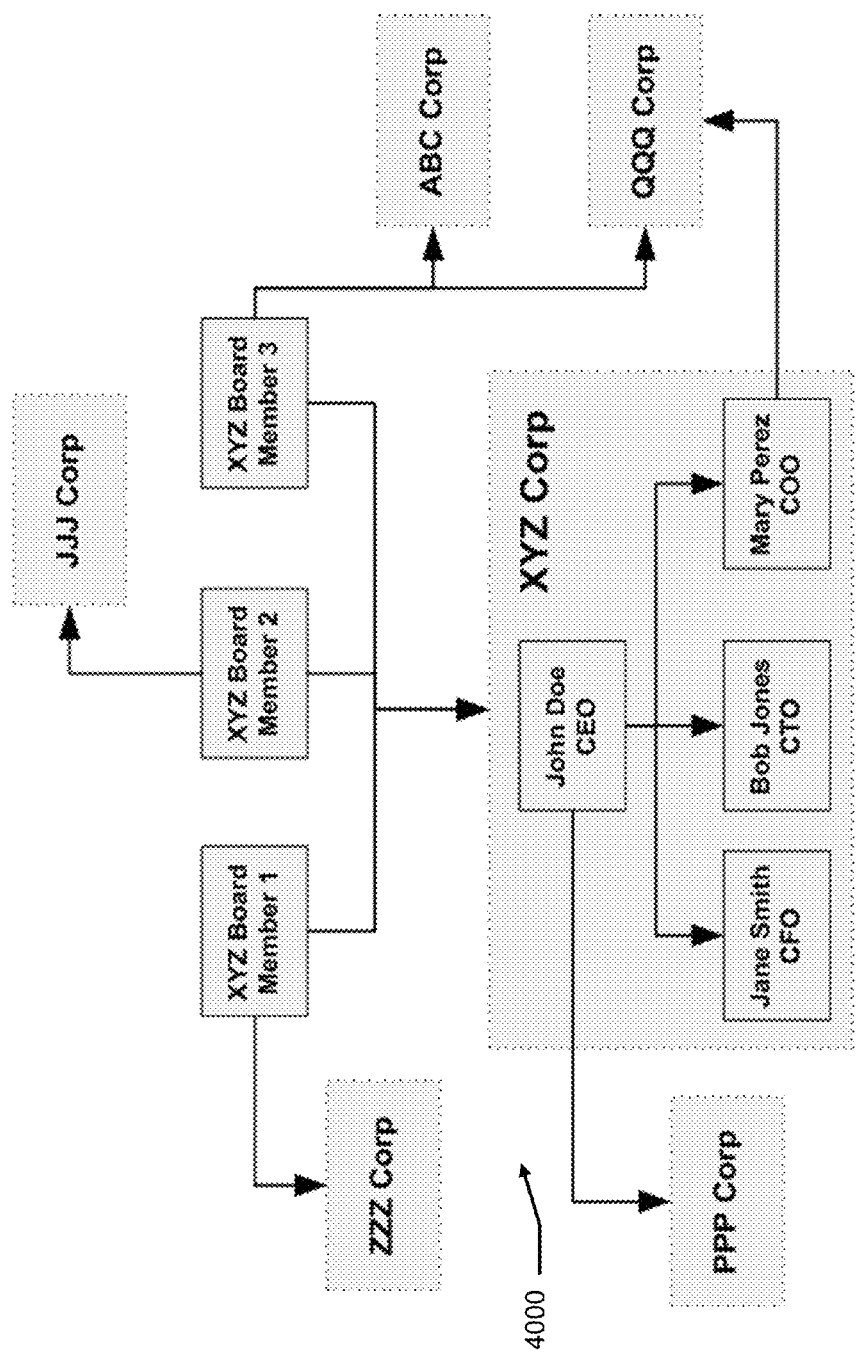
FIG. 40 depicts an organization information view of a company that has been zoomed in on as described in FIG. 39.

FIGS. 38-40 depict an embodiment of Zeetix methods and systems to facilitate ownership aspects of organizational research. A user may visit an organizational information and research site such as EDGAR Online or a brokerage firm to look for ownership information about an organization XYZ.

A ZeeGuide 3800 as shown in FIG. 38 may identify organization XYZ 3802, owners 3804, 3808, 3810 and may reflect the relative size of ownership through the ownership arrows 3812, 3814, and 3818. Ownership of other businesses held by the owners of XYZ may also be indicated in a similar way. Entities that XYZ may have an ownership interest in may be represented in a similar way below XYZ 3802. In the example of FIG. 38, XYZ has ownership interest in 3820 and 3822. The interactive and dynamic nature of a ZeeGuide 3800 may allow a user to select various markers (3802-3822) and view additional information, such as in an overlay ZeeWindow. Alternatively, selecting a marker, such as double clicking the marker, may result in the ZeeGuide re-rendering the ZeeMap to show the selected entity as the 'center' of the screen to view ownership relationships with the entity.

FIG. 39 depicts a ZeeGuide resulting from selecting the ABC marker 3820 as herein described. As is shown, XYZ entity 3902 is the sole owner of ABC Corporation 3920, however XYZ entity 3902 also maintains an ownership interest in ZZZ corporation 3904.

Users could take further action on ABC 3920 (or any other company visible on the ZeeGuide), such as selecting the marker and links presented through one or more ZeeWindows, to purchase stock, access other forms of information (e.g. Partner Research, Organization Information, and the like). As a user zooms further in on a company marker using the navigation features associated with a ZeeGuide and/or ZeeMAP, additional details about the company, such as key personnel, would automatically appear.

FIG. 40 depicts an organization information view of a company that has been zoomed in on as described in FIG. 39. Board members and their other entity associations as well as roles of key personnel may be presented as interconnected markers similarly to a passive organization chart. Alternatively, a user may wish to view the ownership information arranged on a geographic map so that the user may determine where the owners of XYZ corporation are located. Spatial domain and information sharing among ZeeGuides allows a user to bring up a travel ZeeGuide showing the owner's city accommodations.

Data sources for ownership organization research may include on-line company databases and other public filings, company web sites, private company databases (e.g. True Advantage), and the like.

An ownership organizational research ZeeGuide may demonstrate relationships among objects. Organizational objects may be tied to their investors and investments, which in turn may be tied to their investors and investments, etc. Objects also record the relative strength of the investor/investment ties (e.g., percent ownership or dollars invested). Organizational objects are tied to location information about the organization (Where is it? What's nearby?) Organizational objects are tied to related information about the organization such as internal relationships (officers and key personnel) and external relationships (partners, suppliers, etc.), which are described herein. Generally, ownership ZeeGuides could be embedded in most financial service sites, such as brokerages, mutual fund companies, and informational sites such as Yahoo Finance and EDGAR Online. Relationships between money-givers and money-takers may also apply to voters or organizations donating money to politicians, voters or organizations donating money to Political Action Committees (PACs), Political Action Committees (PACs) donating money to specific politicians, Participants in a syndicated loan circle or the partners in an LLC, or Participants in a hedge fund.

A ZeeGuide may help people do research on the relationship between an organization and other organizations to identify who are suppliers, distribution partners, marketing partners, sales affiliates, etc. for an organization. The ZeeGuide may help determine the relative value of those relationships.

Figure 41:
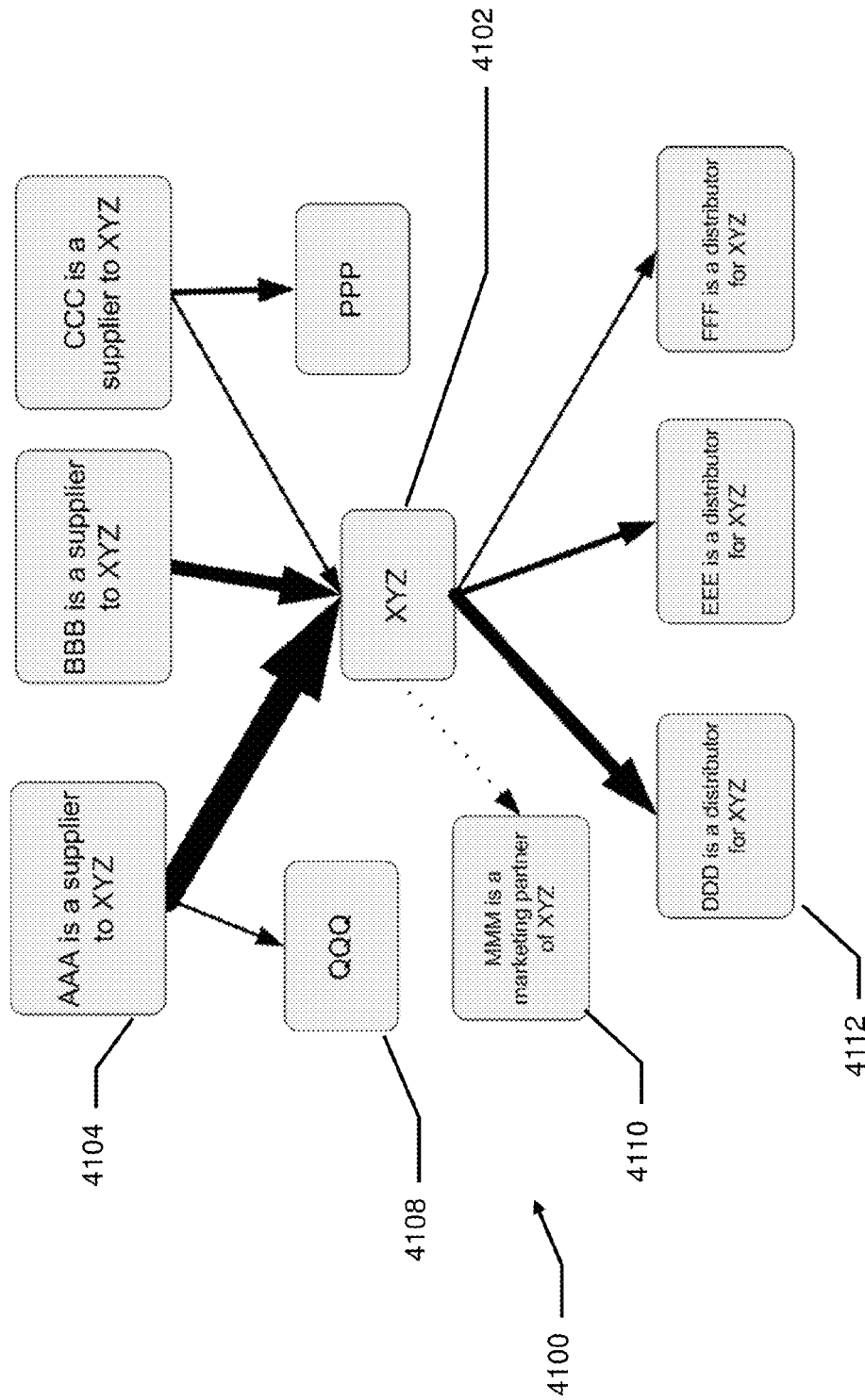
FIG. 41 depicts a partner ZeeGuide.

FIG. 41 depicts a partner ZeeGuide 4100 in which partners of an entity 4102 can be viewed. The relative position and size and direction of interconnecting arrows may indicate certain aspects of the entity 4102 partner relationship. In the example of FIG. 41, supplier AAA 4104 is a prime supplier to XYZ 4102 based on the large size of the arrow pointing from AAA 4104 to XYZ 4102. The view can also indicate that supplier AAA 4104 is also a minor supplier to a potential competitor of XYZ 4102, namely entity QQQ 4108. Using these basic concepts, the ZeeGuide may show a flow of goods and/or services among organizations (e.g. suppliers→manufacturers→distributors→retailers). Other relationships, such as marketing partnerships 4110, and distributor relationships 4112 may be shown.

Figure 42:
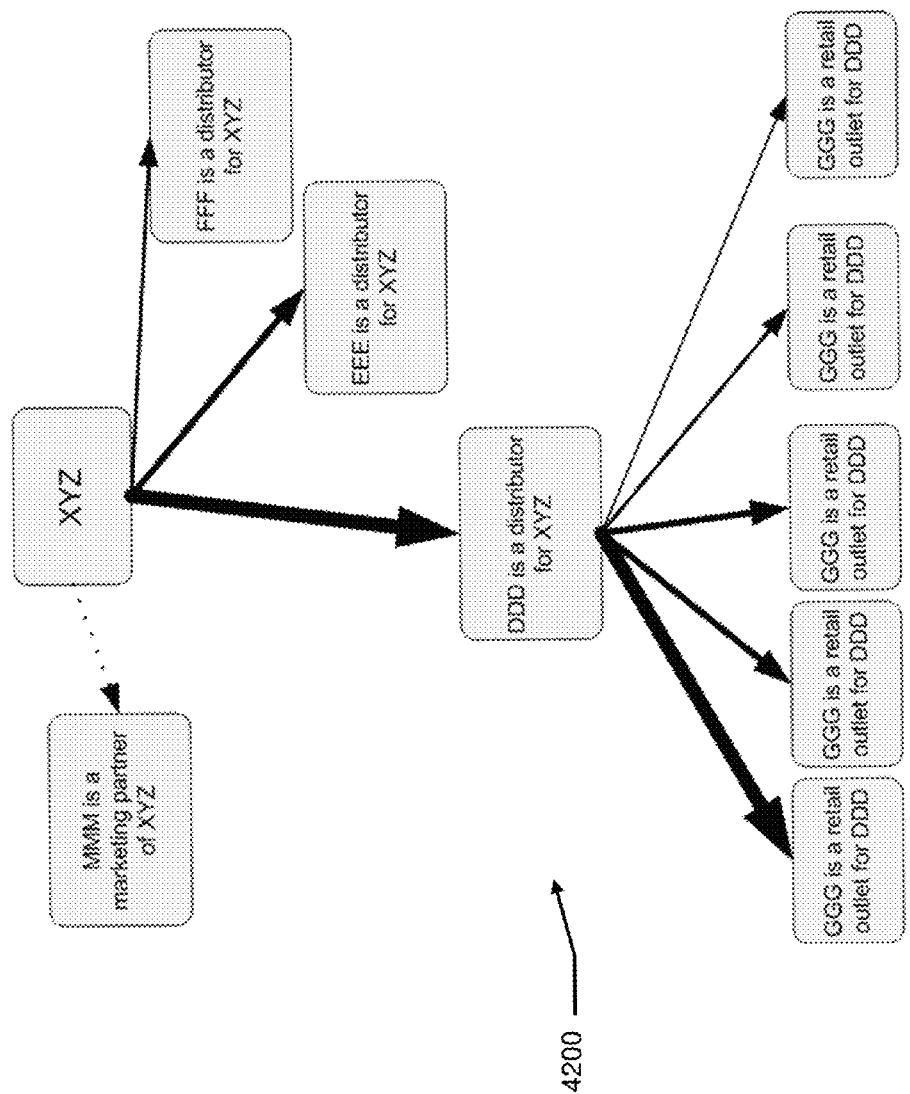
FIG. 42 a distributor view ZeeGuide.

FIG. 42 depicts a distributor view ZeeGuide 4200 that may result from selecting one of the distributor relationships 4112 of FIG. 41. ZeeGuide 4200 shows the relationships among suppliers to the distributor and distribution relationships between the distributor and one or more retail outlets. It may be beneficial to note that the direction and magnitude of the interconnecting arrows may be used as an indicator of aspects of the relationship such as distribution volume, frequency, dollar value, and the like. This example may facilitate understating how organizational objects are tied to their partners, suppliers, distributors, and co-marketers, which are in turn tied to their partners, etc. Objects may also record the relative strength of partnership agreements (e.g., percentage of sale or dollar volume). Organizational objects may be tied to location information about the organization (Where is it? What's nearby?). Organizational objects may be tied to related information about the organization such as internal relationships (officers and key personnel) and external relationships (partners, suppliers, etc.).

Figure 43:
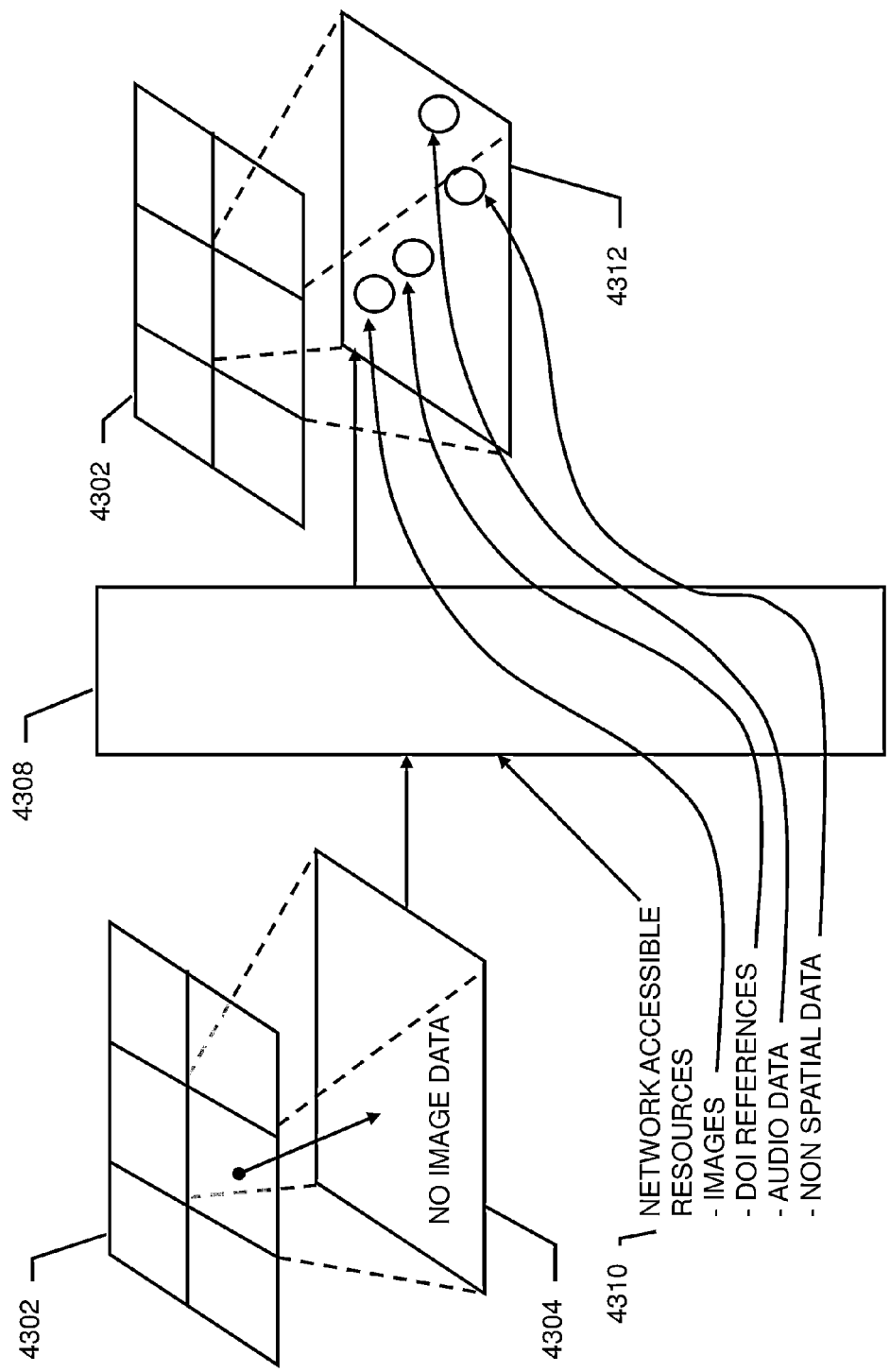
FIG. 43 depicts elements of recursive editing.

Referring to FIG. 43 which depicts elements of recursive editing, a map API may present a map 4302 zoomed to a given magnification. The map API may include user accessible presentation manipulation features such as a zoom feature that may allow the user to adjust the presentation of the data so that at least a portion of the map 4302 is presented at greater magnification, providing a zoomed map 4304. The map 4302 and/or the zoomed map 4304 may consist of image tiles as here in described. In embodiments, zoomed map 4304 may be a single image tile. Data associated with map 4302 may enable presenting zoomed map 4304 as a finer resolution image. However, map 4302 data may be insufficient to enable presentation of a finer resolution. Consequently, zoomed map 4304 may be presented with little or no useful map related data. In either scenario, zoomed map 4304 may be selected by a user of a recursive editing facility 4308 to be modified. The recursive editing facility 4308 may present to the user a variety of tools, commands, menus, icons, and the like that may facilitate manipulation and modification of the selected zoomed map 4304. In an embodiment, network accessible resources 4310, such as images, DOI references, audio data, non-spatial data, map data, and the like may be accessible through the recursive editing facility 4308. A user may use the recursive editor to identify one or more network accessible resources 4310 to be associated with the zoomed map 4304. The recursive editor may establish relationships between an edited version of the zoomed map 4304 and the network accessible resources 4310 based on user commands, gestures, and the like. A modified version of the zoomed map 4304 that includes the associations and relationships established by the recursive editor facility 4308 to the network accessible resources 4310 may be output and or saved as an updated zoomed map 4312. The updated zoomed map 4312 may be linked with map 4302 and/or zoomed map 4304 so that when the user accesses map 4302 and zooms in to an image associated with zoomed map 4304, the updated zoomed map 4312 will be presented in the map API display.

In an example of recursive editing, audio data may be associated with a portion of the edited version of the zoomed map 4304. When the map API presents updated zoomed map 4312, such as by zooming in from map 4302 toward one or more image tiles represented by zoomed map 4304, the user may interact with the presentation and access the audio data. Accessing the audio data may include playing the audio data through a web browser supporting the map API presentation.

ZeeGuides may also help people do research on the internal structure and financial information about an organization. A user may use a ZeeGuide to identify who are the officers and directors (see FIG. 40), who are the key leaders (CEO, CFO, CTO, etc.), and if available, what is the organization's revenue, expenses, stock prices, etc. Internal structure and financial information research ZeeGuides may facilitate understanding how an organization is tied to directors and officers and what ties the directors and officers have outside the organization.

In another embodiment, one or more Zeetices can be used to track anything that moves through any real or virtual spatial domain. Locations might be determined by reading barcodes at specific places, real-time transmissions such as from cell phones or GPS receivers, or data entry from known locations. Real spatial domains include, but are not limited to, geographic areas such as delivery zones, locations within a factory, warehouse, store, or library, or locations within a specimen, animal, person, or plant. Virtual spatial domains include, but are not limited to, locations within visualizations of a business process, production process, work flow, or computer system or network.

A Zeetix subsidiary or franchisee might recognize a market opportunity within the shipping industry, tracking packages sent by a carrier such as FedEx or UPS. A developer within the Zeetix subsidiary or franchisee might create a Zeetix showing a map of the United States, and populating the Zeetix with ZeeObjects derived from real-time feeds of company data such that users might track when and where the shipment was picked up, when and where it was transferred from a local to a long-distance carrier, what long-distance carrier handled the shipment, when and where the shipment was received, where the shipment currently is, and similar information. The Zeetix franchisee might administer the security settings with the Zeetix to allow only customers of the shipper to access certain of this information. The Zeetix franchisee might, in addition, populate the Zeetix with information such as which driver handled a particular segment of the shipment, what other parcels are on the same shipment, and similar information private to the shipping company. The Zeetix franchisee might administer the security settings of the Zeetix to allow only specific employees of the shipper within the shipper's local area network (LAN) to access such private information.

Another Zeetix subsidiary or franchisee might recognize a market opportunity within the pharmaceutical industry, tracking specimens and samples through a laboratory processing pipeline. A geographically-distributed team of developers, some in the US and some in Europe, within the Zeetix subsidiary or franchisee might use the ZDE to create a Zeetix, including a ZeeMap, showing the various stages of the processing pipeline, possibly correlated to another map showing the physical layout of various plants, facilities, and geographies. These developers, possibly using multiple programming languages and ZeeBindings, might build ZeeObjects such that specimens to be analyzed are visually represented as images moving through the ZeeMap as the specimen moves through the pipeline or process. The Zeetix user interface might allow a user to zoom in on a particular stage or processing step and browse samples of interest. The representation within the Zeetix might acquire data in real time as a consequence of the pipeline or process, and such dynamically-acquired data might be presented to the user in response to user gestures such as mouse clicks, drags, or keystrokes. As the samples reach the end of the pipeline, they might be delivered to long-term storage locations such as refrigerators, incubators, or similar devices. The Zeetix might allow a user to browse within an on-screen representation of such a location, searching for a particular sample, or the Zeetix might allow a user to request that the location of a particular specimen or specimens be highlighted on the Zeetix.

The Zeetix subsidiary or franchisee might then package and sell this custom-designed Zeetix, complete with physical hardware, software, networks, and installation, as a stand-alone enterprise-scale Laboratory Information Management System (LIMS) product to pharmaceutical companies with large-scale high-volume laboratory processing requirements, such as Merck, Novartis, Bristol-Myers Squibb, and others.

The Zeetix subsidiary or franchisee might offer, sell, design, build, install, and support similar custom-designed Zeetices to other manufacturers who have similar production lines or factories. Each Zeetix might collect, manage, and display real-time information about Work In Process (WIP), production line bottlenecks and slowdowns, dynamic quality-assurance testing, and similar manufacturing data. Such a Zeetix might be of particular interest to manufacturers using a "Just In Time" inventory management approach.

Another Zeetix subsidiary or franchisee might recognize a market opportunity with the Business Process Engineering industry, tracking documents and work products through a particular work-flow management system or process. A team of developers might create a ZeeMap showing the work flow and identifying various stages of the pipeline. This might be correlated with another ZeeMap, showing the physical layout of offices, facilities, computer systems and networks, and archival storage locations. The team of developers might then create one or more Zeetices, populated with ZeeObjects representing various work products, resources, processes, and documents. Key individuals might carry and register GPS-transmitting cell phones, allowing their location to be tracked in real time by the Zeetix. This Zeetix or Zeetices might then allow users to improve decision making, identify lost or misplaced documents, locate key individuals, accelerate processing times, and otherwise improve and optimize the business process.

The Zeetix subsidiary or franchisee might then offer, sell, design, build, install, and support these Zeetices to other companies as part of a "business process engineering" product or solution offered by the Zeetix subsidiary, franchisee, or third-party.

In another embodiment, a vehicle tracking system allows the locations of vehicles to be maintained and displayed in real-time, along with other information about them. Vehicle location information might be reported by GPS receivers in the vehicle, passive devices embedded in pavement or along streets and highways, photographic or video equipment located at intersections or checkpoints, and other similar technology. A vehicle tracking system might be used within municipalities for tracking snow plows in winter, town-owned vehicles, school buses, police and fire vehicles, or public transit vehicles such as buses, streetcars, and trains. A vehicle tracking system might also be useful within taxi companies, companies that offer home delivery or pickup.

A Zeetix franchisee might recognize a market opportunity within the creation of a web-based vehicle tracking system. Developers within the Zeetix franchisee might license ZeeMaps and ZeeObjects from other sources, and combine them with ZeeObjects representing current locations of vehicles. The developers might then build a Zeetix that combines this vehicle tracking information with related locations such as schools, businesses, highways, traffic emergencies, and so on. The developers within the Zeetix franchisee might administer the security settings within the Zeetix so that the customers of a taxi company might be able to see the current location, on a map, of each taxi to see which are nearby, and so that the dispatchers might be able to additionally see, by clicking on a marker representing the current location of the taxi, the name and address of the fare the taxi is carrying or about to pick up. Executives and managers of the taxi company might be able to monitor, in real time, expected fare collection amounts, vehicle performance and maintenance information, and similar data.

The Zeetix franchisee might then sell access to this customized Zeetix on a subscription basis to companies, towns, and perhaps individuals.

A wide range of other virtual property embodiments are envisioned, each having a suitable spatial domain and geography that permits navigation around a virtual property or properties, as well as optional layer-to-layer navigation via a zooming function. Embodiments include finding restaurants within walking distance, finding the best way to get to work this morning, finding an apartment to rent, seeing the current weather and road conditions, finding a place to stay and things to do in a tourist location, finding things to do in summer that are distinct from things to do in winter (a time- or season-based Zeetix), annotating medical images, organizing gene function information, researching biological pathways, browsing source code, registering spatial keys to virtual property, mapping computer networks, school-related assignments, mapping customers to advertising markets, placing the entries of a web server's logfile on a map, mapping enterprise hierarchies, such as organizational charts, and many others. In a log file embodiment subscribers to a specific service might see the entries, and companies that sell web-based tools for traffic management can map the locations of their subscribers—and construct all sorts of interesting overlaid maps—based on the log data.

In embodiments a Zeetix may be used for synthesizing real and virtual descriptors like Zip codes, Keyword Search Terms, SMS Handles, Phone Numbers, Network Domains, Real Property, IP/Personal Registry, and other hierarchical information.

Integrating a "web beacon", which may be represented by a 1×1 pixel clear object in a browser with the methods and systems of spatial domain organization, visualization, and the like herein described may facilitate tracking any user gesture (e.g. mouse-click, rollover, selection, pause, and the like) that is detectible in the web browser or any add-in associated therewith. An object-oriented software embodiment of at least one functional web beacon as herein described may further facilitate tracking user interactions. In addition, developing and maintaining a history of interactions of initially anonymous users may be further facilitated by using cookies.

Active scripting technology, such as in a web2.0 environment, may facilitate emitting and journaling a tracking event (e.g. on a server) for each user interaction with a browser— whether or not it involves a page load (and most don't). In an example, tracking the opening or closing of a widget on the browser page may be accomplished by adding a tracking call to an existing event handler associated with the browser. An advantage of using active scripting technology to interact with the browser to track each user action through the browser event handler instead of simply tracking each page view (e.g. new web page request) is that all user actions, even new page views, are properly detected, tracked, and made available to a wide variety of uses. This may address a potential tracking problem with currently implemented versions of web2.0, such as conventional page views are meaningless.

A computer that is enabled to receive cookies may receive a cookie when a user first encounters a Zeetix. The cookie may be time-stamped and may identify the content, web pages, Zeetix, Zeetix host, and other machine and browser event information at the time that the cookie is loaded to the computer. The cookie may allow for any and all subsequent browser activity associated with any Zeetix or related resource to be tracked and thereby may be associated with a user of the computer. In an example, if a user of the computer later navigates to a different ZeeGuide on a different site, the information related to the user navigation, ZeeGuide access, and sponsoring site may be collected and associated with the already collected data through the cookie. Such tracking also allows for identifying when a user of the computer opens a zeeWindow. The user may be invited to create a user account. Once the account is created, the data that has been collected since at least the establishment of the cookie may be associated with the user account. In this way user interaction data can be collected wherever the user logs into the system in the future, not just when the user accesses the computer with the cookie. By associating each logged in action with the user, a permanent "trajectory" of the user's actions on any Zeetix may be maintained indefinitely. The result may include a personalized history of all of the user's interactions on any Zeetix or related web site or resource.

An archive of personalized user histories may have enormous commercial value and may prove to be very valuable to advertisers, such as advertisers who want to target users. Current keyword advertising models are based on the premise that web crawlers can analyze pages to derive keyword value. Because web2.0 page links do not link to static pages, web crawlers cannot generate the data required for current keyword based advertising. There may be no computationally practical way to statically analyze a web of links where most or all of the links change on each visit. Consequently a keyword based advertising model that utilizes web crawler based content analysis may be severely limited in web2.0.

The methods and systems of browser event based tracking described herein may fill critical advertising and other targeting needs in web2.0. Rather than using crawler data and inferences to rate keyword values, by tracking all interactions with the various embodiments of the spatial domain organization and visualization methods and systems described herein, actual experience data can be used. In an example, the tracking described herein provides for data that determines how many times a particular asset is visited and by whom. Additionally, by tracking browser events through cookies or user registration, the assets that a particular user visits can be determined. Therefore monetization behavior may be based on real history, including history spread across an entire user population, rather than estimates or ratings.

Mapping APIs, such as the Google Map API and other potentially related offerings generally facilitate presentation through a prescribed format. Mapping APIs provide a protocol for carving existing image stacks, including stacks at varying resolutions, into precomputed tiles and serving those tiles to web browsers, such as Internet Explorer, Firefox, and the like. Generally, even for custom map applications, the use paradigm has been to start with existing images or image definitions, and layering or associating object structures on the images to allow functions such as zoom, browse, image combination (e.g. satellite and road view), and the like. Therefore, currently the image files, which may be image tile files, are a source on which a map presentation is based and various slicing and dicing APIs are layered on top of them.

In an aspect of the invention, methods and systems may include arbitrary-resolution image editing. Arbitrary-resolution image editing may utilize a mapping API, such as the Google Map API and the like, to facilitate a framework for image editors that enable image editing at any arbitrary resolution. An arbitrary resolution may be represented by a tile, which may include an image tile file, wherein each tile can be created and/or edited from within the mapping API image editor framework. Alternatively, each tile may be created and/or edited outside of the framework. An edited tile may originate within the framework and may be returned to the framework after editing. A newly created tile may be based at least in part on a specification that allows the tile to be used in the framework. Alternatively, a newly created tile may be created outside of the framework, and transformed so that it can be used within the mapping API framework. The arbitrary-resolution image editor as herein described may be known as and herein referred to as a "recursive image editor" or "recursive editor". A recursive editor may offer an immediate visual interface, portal, and broad framework to the rich and rapidly-emerging web 2.0 universe.

The recursive image editor may support creating/editing images at an arbitrary resolution. An arbitrary resolution may include discrete resolutions, such as those determined by integer coordinates. An arbitrary resolution may also include resolutions represented by real, non-integer coordinates. The recursive editor, and at least a ZeeDomain as herein described, facilitates viewing and manipulating images with non-integer resolution. In an example, an integer 640×480 image may allow any integer pixes to be editable with existing image editors. An integer editor may allow editing of a pixel in position 639,479. The same 640×480 image may be viewable and editable so that non-integer pixels may be edited by a recursive image editor. In this example, the recursive image editor may allow editing of a pixel representing location 639.99999999,479.99999999. The recursive image editor allows any arbitrary real value coordinate to be used to specify a portion of an image to view, create, or edit.

One potential inspiration for a recursive editor is perhaps the popular presentation program Power Point. Although Power Point includes native editing capabilities, it may be more like a framework for assembling images, documents, media, spreadsheets, and the like that are often created by other editor programs. One may view the various tools available in the Power Point user interface to generally call out to these external programs. This is why a Power Point like presentation tool is such a convenient way of assembling and presenting material created in multiple media formats. Although Power Point supports linking and assembling this variety of image and data sources, it does not accomplish arbitrary-resolution presentation, editing, and the like in the context of spatial domain navigation. A recursive image editor as herein described may exploit the mapping API map tiling paradigm to create arbitrary-resolution images while enabling an assembly framework for diverse information data sources and formats that can be rendered through the mapping API interface.

The recursive editor may also be characterized as a recursive editor in that it may manage a coordinate system, zoom levels, and object-store interactions as described herein, along with other features that relate to Zeetix, Zeetix Domain, ZeeMap, and the like. Within the framework of a mapping API, changing zoom levels, such as by clicking a 'zoom' bar in the map API user interface may open a modifiable version of an existing tile or may enable creating a new modifiable tile. The recursive editor or a platform based around the recursive editor may use any of a variety of web service and/or REST-style protocols to lash-up and use existing editors, such as text editors, map editors, graphic editors, image editors, audio editors, video editors, and the like. In an example, the business and technical drawing program Visio uses xml-formatted files that can readily be rendered by the recursive editor. Edits and/or created content generated within the recursive editor can readily be exported in xml-formatted files that would be suitable for use by Visio and other xml-based file format editing and presentation tools.

In another example, various mapping API presentation tools, such as Google Earth, currently are limited in resolution depth by the image source data available. When a user zooms in to a very fine resolution, the presentation may loose focus, stop zooming, and/or simply become gray tiles that may indicate that imagery at the selected level of zoom is not available. The user has no option but to zoom to a lower resolution (zoom out) to work with the tool. When this same image source data is accessed by the recursive editor, each zoom level (e.g. image tile) can be fully editable. Therefore as the resolution of the source imagery reaches a presentation limit, the recursive editor could facilitate the user editing the image, such as by importing images or other data. In this way, the recursive editor could, for example, allow a user to zoom to such a fine resolution that the presentation would pass through the roof of their home and present the interior of their home based on user provided images of their home.

By enabling a recursive editor user to modify or create image tiles at any zoom level, the recursive editor may allow the user to limit editing to only those tiles visible in a web browser presenting the mapping API data. The user could use the navigation tools, such as zoom and pan, to select new tiles to modify/create. Relationships between and among tiles, including tiles that are modified, created, and already existing may be managed by the recursive editor or any of the other methods and systems disclosed herein. Any relationships of image tiles already existing within the mapping API framework or the source image data may also be maintained and/or referenced.

An important benefit and utility of the recursive editor is that each and every editable element (e.g. each displayed pixel) can be associated with any arbitrary information, such as an entire zoom stack that may be based on the same or different spatial dimensions. The associations available to be created and managed can have arbitrary and infinite spatial resolution. The associations may be to finer resolution images, alternate views of images, related or associated information, information with different dimensions, non-spatial data, and the like.

Computational complexity of recursive editing arbitrary and infinite resolution tiles may be managed by dealing with only those tiles that the user actually edits. A persistent object state may thus emerge to be saved as the each image tile is interacted with. The computational complexity may be further supported by the image tiling presentation techniques being rendered by the mapping API (e.g. the Google map API), whereas the recursive editor may provide the creation and editing. In addition to actual user gestures collected in real-time through a recursive editor user interface, the recursive editor may be driven through other API tools in order to generate visualizations and automate image tile creation or modification under program control.

The recursive editor may be characterized as an infinite-resolution camera/editor/microscope/3Dportal. The recursive editor may be web-based so that no special software is required to use it. In an example, the recursive editor may be accessed through a web browser that is displaying the Google map API by incorporating a user accessible 'edit' command icon/button to the Google map API user interface. The recursive editor may also be accessible through a ZeeGuide as herein described by means of an edit function. The ZeeGuide edit function may be command/icon based or may be activated through inference of user gestures and interaction with the ZeeGuide.

Editing image tiles with the recursive editor may include opening a copy, such as a private copy of a tile. The tile copy may be freely edited while maintaining associations with the original image tile or imageless tile. An exemplary editing session may include using the recursive editor/mapping API user interface to zoom in to a subset of a tile (e.g. moving down an image stack to a finer resolution layer) and drawing or pasting a real estate plot plan or a building floor plan. Editing may include non-geographic related data and applications. The recursive editor may be used to create tiles that may be rendered to present various visualizations of arbitrary data structures as herein described. At various times, the user might be invited to save the current work (or perhaps the tiles are saved automatically). The newly-created tiles might be seeded, such as with a zoomed copy of another tile (e.g. the next higher tile in the zoom stack). Seeding may be based on user preferences, default preferences, a user profile, and the like.

When considering the recursive editor in the context of the methods and systems herein described that enable the organization, management, visualization, association, attribute assignment, presentation and the like of information around one or more spatial domains, a ZeeImage (e.g. a recursive edited/originated image tile or group of tiles) may be part of an object network that includes coordinate space, features, resolutions, and the like. A source for the information accessible through the ZeeImage may be the object network itself. The object network may be traversed, as needed by editing or rendering tools to create image files for use by mapping API frameworks, such as the Google map API. The result may include each image tile being a rendering of part of the object network. Files, such as files accessible through the object network or files from outside the object network may be used as sources of data import, export, reference, and the like for recursive editing and creation. However, the data may not be physically copied from the source to an image tile file. The recursive editor may facilitate referentially identifying these sources so that the identified sources may be accessed through the network during ZeeMap navigation (for example) and rendered. In addition to identifying data sources, the recursive editor may facilitate describing how the sources should be accessed, rendered, associated with other sources, and the like. The recursive edited/created image may be part of or associated with a Zeetix framework and infrastructure as herein described so that it maintains consistency of objects, rendering compatibilities, and browser compatibility and accessibility throughout the full spectrum of spatial domain navigation including zooming through mapping API presentation layers.

A Zeetix may represent the widespread and fundamental application of life science principles to the creation and development of a web-based information environment. The methods and systems of a Zeetix may embody in software, the internet, and business in general, the biologic mechanisms found in nature. One such biologic mechanism is DNA. DNA that encodes a particular protein, enzyme, or structure in one organism behaves the same when moved to another organism. As herein described, the Zeetix may be embodied in software that may be canonical in nature. This canonical-based software code is described herein to facilitate use with any type of application, programming code and the like thereby ensuring that the Zeetix code behaves the same regardless of the application or programming environment. In this way a Zeetix embodies key characteristics of DNA. As a simplified example, a Zeetix can be accessed through any web browser, mapping API, and the like and deliver the same results or provide the same renderings. In another example ZeeBindings facilitate access to the entire Zeetix framework from a Java programming environment and from a Python programming environment. Although the Java and Python programmers experience the programming in very different ways, the structures, objects, associations, and other aspects of the Zeetix environment behave the same to both programmers.

In nature a DNA mechanism is causally-reflective and meta-circular. Although the various mechanisms of life are themselves constructed from proteins encoded in DNA, these proteins frequently act to change their own DNA. This is fundamental and powerful. Much like DNA that can be acted on by the protein from which it is encoded thereby transforming the DNA, the interpretation of associated Zeetix objects, or object attributes can transform how a Zeetix may be presented in a web browser. Associations of objects may cause changes in the Zeetix. In an example, an association of a restaurant that is part of a hotel may cause the hotel to be viewed as a place to eat or a place to sleep. The removal of the restaurant may result in the hotel only being viewed as a place to sleep.

A Zeetix and DNA have other similarities including the dual nature of being passive and active, based on context. In an example, when DNA is being copied and repaired (such as during cell reproduction), that DNA is treated as "data" to the reproduction process. However, when the same DNA is being expressed, such as when being transcribed and then translated into protein, that DNA is treated as an operator that directs the expression. A Zeetix may embody this dual nature. In an example when directed graphs of Zeetix objects are being copied, edited, and downloaded, the directed graphs are being treated as "data" by the process accessing the Zeetix objects. However, when those same directed graphs are being read and interpreted, such as when rendering a map or web page, the directed graph is being treated as code that directs the rendering.

Whether in nature, business, or human interactions, development is generative and emergent, rather than constructive and designed. In nature, it is known that even the simplest organism cannot be blueprinted. An organism emerges as a consequence of an iterative application of natural law and constraints, such as environmental constraints. A Zeetix infrastructure may facilitate creating an environment within which successful software and businesses can emerge as a consequence of an iterative application of Zeetix-specific constraints imposed on the environment. The Zeetix infrastructure requires no specific design or blueprint for a specific Zeetix site.

Biologic processes convert energy into intermediate forms that are then metabolized by organic processes in a self-sustaining cycle. A fundamental aspect of the methods and systems herein described is an ability to actively track interactions with all facets of a Zeetix. The active tracking technology described herein may facilitate converting use of the Zeetix resources (e.g. objects within the Zeetix environment) into value for the users, participants, object owners, facilitators, and the like. The value may be a form of tradable currency, internal usage counts, measures of user interaction, and the like that may be used for growth. In an example, a business, such as hotels.com that receives a share of revenue generated through user access to object resources (e.g. booking a hotel accessed through a ZeeMap), may use a portion of the shared revenue to expand exposure such as by buying a branded icon to be presented in ZeeGuides. Similarly, the Zeetix may track interactions and automatically upgrade hotels.com to a branded icon based on achieving certain tracking thresholds. Branded hotels.com icons may increase user interaction resulting in a self-sustaining cycle.

The Zeetix environment may facilitate establishing a micro-economy, such as one based on usage-metering, super-distribution, easy e-commerce, and the like. By enabling easy connection between information producers and information consumers, a facilitator of a Zeetix platform may profit through participating in the micro-economy. In an example, a facilitator may receive a portion of cash flows associated with transactions that are enabled by the connection of an information producer with an information consumer.

Rather than being constrained by a specific information producer, a Zeetix environment may reward and sustain an arbitrary number of producers. If even only a few succeed, a revenue sharing Zeetix may begin to sustain itself. Because of the infinite resolution and unconstrained nature of Zeetix associations, rapid and viral growth is possible for the Zeetix organism, its participants, facilitators, and the like.

Life's biologic processes accomplish diversity, selection, and proliferation by wiring a degree of variability into the mechanisms of DNA, reproduction, and so on. This results in naturally-occurring DNA variability. An environment of the DNA selects those variants that are most adaptive to that specific environment; consequently when an environment changes, the organisms within that environment change in response to the environment change. In this way organisms that proliferate are highly optimized for the specific environment within which they proliferate.

In an analogous way, a Zeetix may wire "self-diversification" into the basic mechanisms of its environment. As described herein, a Zeetix may be object-oriented or component oriented so that new objects and behaviors are rarely constructed from scratch. Instead, modifying existing Zeetix components is much easier than creating new ones from scratch. As a result, the predominantly modifying-nature of Zeetix object and map creation results in a naturally-occurring variability of components, software, applications, and businesses within the Zeetix. A competitive business marketplace is highly selective, therefore within a Zeetix business environment, those variants that are most adaptive to that specific business environment may proliferate. Also, based at least in part on the associative capabilities of a Zeetix, when a business environment changes, the "business organisms" within that environment may change.

In an example, a hotels.com web page may be associated with a local business based on a proximity to the business. That same web page, which may be a ZeeObject, may be linked to an event, such a historical event. A new hotel that may be very close to a business may be presented on a local business ZeeGuide but may not be included in a historical ZeeGuide of the same geographic area. The ZeeGuide of the business environment associated with the historic event would self select those hotels that were in existence near the historic event, whereas a ZeeGuide of the local business environment would self select the hotels available today.

Certain images and shapes are visible only through the use of a computer; the images do not exist otherwise. Some examples are "Julia Sets" and "Mandlebrot Sets". Typically, such an image is defined by combining one or more mathematical relationships with some rendering or visualization rules that produce an image. A potentially relevant subset of these images has infinite resolution. Infinite resolution images may be characterized by the ability to reveal additional detail at any given resolution of a section of the image when the image is magnified. In particular, Julia Sets and Mandlebrot Sets produce images of infinite resolution.

An Abaxoscope is a tool that allows a user to create, see, annotate, store, and publish infinite resolution images that otherwise exist only in the computer. The Abaxoscope may use the recursive image editor as herein described. The Abaxoscope may also include mathematical visualization tools to create and perhaps store one or more mapping API tiles that comprise an infinite resolution image. Storing infinite-resolution image tiles may be performed by a computer contemporaneously with image rendering. The Abaxoscope may also be available to any user, such as through a web browser.

In embodiments, infinite resolution images may be referenced by the term Abaxograph. Features discovered or created in an abaxograph at an arbitrary resolution may be annotated using the interactive tools, features, and capabilities associated with a Zeetix as herein described. Each abaxograph may be associated with a spatial domain and the spatial domain may be unique to the abaxograph. Therefore, each abaxograph can be independently investigated, studied, and perhaps commercialized.

A Julia Set is an example of an infinite resolution image that may be associated with the methods and systems herein. At any resolution, a particular pixel or set of pixels on the boundary of a Julia set expands under magnification to reveal additional substructure that comprises the boundary. This process continues arbitrarily because it is infinitely recursive. As a Julia Set is magnified, new images appear. The appearing images may be compared to a tile, such as a ZeeTile or a recursive image editor tile, or the like. Because all images produced in a Julia Set are generated from a common mathematical starting point, tiles that contain the images are ideally suited for the herein described Recursive Image Editor delayed evaluation techniques that facilitate managing processing resources by processing only tiles that relate to a current visualization.

An abaxoscope, like the telescope and the microscope, facilitates creating associated fields of study. An abaxoscope may allow visualizing elements, such as ZeeObjects that may exist in the field of view but their visualization is resolution dependent. While a microscope brings into view physical items, an abaxoscope may bring into view objects and their relationships, such as their mathematical relationships in a Julia Set.

As describe earlier, like the telescope and microscope, that abaxoscope may create novel and perhaps commercially valuable areas of scientific inquiry—scientific abaxoscopy. In an example, demographic information may provide a domain that may be explored with an abaxoscope. At a low resolution, demographics may be limited to local or regional averages. Changing to a high abaxoscopy resolution, demographics may be associated with a household. Increasing abaxoscopy resolution further may reveal an individual's demographics. In another example, time change is similar to a mathematical progression. When looking at a low time resolution, a human generation may be marginally visible. When adjusting the abaxoscope to high time resolution, an individual event such as a human birth may be observed. Adjusting to even higher time resolution may allow visualization of a cell dividing.

The abaxoscope facilitates visualizing multiple dimensions or domains. Using the methods and systems of visualizing layers with arbitrary dimension herein described, an abaxoscope may facilitate traversing visually from a geographic region at time 'x' along one spatial dimension to an individual still at time 'x' along a time dimension to the individual at new time 'y' and then along the original spatial dimension to the geographic region at time 'y'. Such a progression may show a child in a field and then show the child growing to an adult and then show the field is now a sub division of homes.

Some terms that may facilitate an understanding of the concepts described herein include:

Abaxoscopy may be used for the study of interpreting the images seen with an Abaxoscope. Using a telescope and microscope analogy, abaxoscopy is analogous to astronomy and microscopy. Abaxograph may be used to refer to infinite resolution images. Abaxography may be used for the study of the images themselves. Abaxography may include study of how infinite resolution images (e.g. image tiles) are created, edited, printed, updated, published, and so on. Abaxography may include the study of rules and dependencies among abaxographs and relationships between dimensions within and among abaxographs. Abaxonomy may be the science of classifying Abaxographs into domains and fields for further investigation.

An example of a potential commercial use of the Abaxoscope may be related to the fields of developmental biology and artificial life. Research suggests certain modeling techniques similar to computing modified Julia Sets may produce a very rich set of morphologies which are similar in appearance and several important characteristics to those of real organisms. Visualizing these models with the abaxoscope may benefit current bioinformatics research in the fields of developmental biology and artificial life.

A web-based desktop of arbitrarily large resolution that may be enabled by an abaxoscope and zeetix methods and systems as herein disclosed may be called a Zee-Top. An abaxoscope may also be referred to as a ZeeScope. The ZeeScope and the ZeeRIP may be used to create a customizable, interactive desktop that may initially be mostly-blank with user selected or suitable default background color. Because one of the potential uses for a Zee-Top is as a interactive visual interface for a user, the Zee-Top supports any user selected or created landmark or other feature that is preferred by the user to facilitate navigation. A user may create a Zee-Top to customize such as by using the customizable interactive desktop generated by a Zee-Scope and a ZeeRIP. The user may also customize it by adding ZeeMarkers that may represent resources such as folders, files, bookmarks, urls, tools, printers, mailers, fax interfaces, and any other computing resource including software, hardware, other users, applications, traditional desktop items, images, and the like. These ZeeMarkers may be created, positioned, edited, and so on as the user chooses. A ZeeWindow may be associated with each ZeeMarker and may invoke arbitrary actions when clicked, such as opening the file, accessing a url, and so on.

The Zee-Top facilitates a user maintaining any number of resources (e.g. everything for which he or she uses a computer) in a visual interface. This is contrasted with a conventional desktop that is spatially limited to the resolution of the physical user interface, typically a LCD type of monitor. A conventional web browser, finder, desktop may be limited by the physical platform that the user interface is running on. In contrast to this, the ZeeTop is accessible to a user from any browser on any platform anywhere that has web access. Since the Zee-Top has essentially unlimited spatial dynamic zooming resolution, a user can simply arrange frequently used resources in a virtual equivalent of physical space in that once placed as a ZeeMarker, resources remain wherever the user places them. Because a ZeeMarker may be a visual indicator of a web-based shortcut to a resource, one resource can be accessed from any number of ZeeMarkers that may be placed anywhere else on the Zee-Top.

As described herein, ZeeMarkers, landmarks, and the like that may be used in a Zee-Top may exist in a visualization layer that can be made private or shared to whatever audience the user chooses. Therefore any number of ZeeMarkers may be associated with a particular visualization layer that can be published for general public access or be made accessible to one or more restricted groups of users. In this way a user may signal shared access of a portion of his/her Zee-Top elements by associating shared elements with an externally accessible layer.

At a given level of zoom, if a particular area of the Zee-Top becomes overcrowded or cluttered, the user can use the recursive editing methods and systems disclosed herein to create more desktop visualization space, such as by dynamically zooming to a different level within the arbitrary resolution Zee-Top web-based interface. Alternatively a marker manager may optionally be used to facilitate representing a group of nearby elements with a single marker. Such a marker may be considered a group marker. A group marker may be automatically generated based on a level of clutter or overcrowding. An automatically generated group marker visual presentation may be based on an aspect of the markers that it represents. Alternatively a group marker may be manually generated by a user. In either case, the group marker may be customized by the user to allow easy recognition by the user of the represented group.

To facilitate maximum performance interacting with the Zee-Top, a local Zee-Store of information associated with the Zee-Top may be deployed on a user computer. A local Zee-Store may be deployed automatically based on response time to user access to ZeeMarkers. Alternatively, a user may interact with a Zee-Store deployment facility to specify preferences, request the deployment of a local Zee-Store, and the like.

In an example, a user may store and organize bookmarks, favorites, and the like through a Zee-Top. Such an embodiment may bring all of the advantages of the Zee-Top's direct manipulation interface to daily use of computing resources such as those resources that are accessible over a network such as the internet. One critical advantage of a Zee-Top is that it enables the collection of bookmarks/favorites to be available from any browser on any networked computer, including wired and wireless devices.

In another embodiment, a Zee-Top may be used to organize and maintain email, allowing email to be sent, received, and organized in a visually intuitive and easily accessible interface that allows dynamic association with many other types of daily use resources such as files, documents, messaging, archives, planners, databases, and the like. Email may be grouped with the other resources using the automated grouping capabilities of a Zee-Top. An important advantage is that the associations, groups, and other ways of referencing email and resources through a Zee-Top are accessible from any networked computer.

In another example, a Zee-Top may be used to support group work. A Zee-Top facilitated virtual meeting may allow participants to see each others work dynamically and in real time. The Zeetix layer publication capabilities may allow participants to scribble notes to each other on private shared layers. Because the Zee-Top operates independently of any specific client user interface (e.g. browser), dynamic updating of a group working session may enable participants to see other's changes on the fly as they are entered by each participant. For example, a group of attorneys might use a region of a shared Zee-Top for displaying different drafts of various sections of a complex filing, so that each can see and comment on the other's work rapidly.

Zee-Top functionality may be made available by a provider under any of a variety of availability models. Availability models may include advertising supported, subscription based, licensed, and the like. In an example of advertising supported Zee-Top, advertising may be presented as a part of the Zee-Top. The advertising may be embodied in a ZeeMarker and therefore may support dynamic interaction capability such as URL access, pop-up window display, and the like. An advertising supported model may be based on advertisers paying for advertisement placement within a Zee-Top. This model may also support advertisers paying for user specific placement that may be based on a specific user, user demographics, Zee-Top content, and the like. In a subscription-based Zee-Top availability model, the subscription may replace revenue in the advertising supported model so that no advertising is required in the subscription model. The subscription-based model may also be a SAS (Software-As-Service) embodiment. In a licensed availability model, a corporation, business, organization, government agency, educational institution, and the like may pay license fees to use Zee-Top services such as for accessing and sharing information within an intranet.

Each pixel of each window displayed on the desktop of a user has both value and cost to the participants in the process of presenting and viewing the window. Pixels may be valued based on the time and attention of the user viewing the pixels. All of the hardware, software, content, distribution, publication, regulation, and delivery mechanisms that present that pixel to the user cost money, money that somebody pays. A conventional advertising model includes an advertiser paying for the privilege of presenting promotional content from that advertiser to the user, whether or not the user values the promotion. Such promotional content is often associated with "free" content that the user does consider valuable. In the conventional advertising model, this advertising occupying a portion of a window is thus the "price" that the user is forced to pay in order to have access to the "free" content.

The choice of how much space (e.g. how many pixels and the position of those pixels) within a browser window that is dedicated to advertising is generally made by the page publisher. The only choice available to the user is whether or not to view the page; the user is generally not empowered to set advertising rates, select advertising of value to the user, or receive compensation for the time the user wastes filtering advertising (or content) that is not of value to the user.

"User-pull" content is a collection of behaviors that allow a user to explicitly identify content (including but not limited to advertising content) of value to that user, potentially allocate display regions to contain the resulting content, and potentially participate in an online negotiation with content suppliers about the value to that user of specific content. This value may be a form of tradable currency, internal usage counts, measures of user interaction, or similar measurements.

A "value promise" is an assertion by a content supplier (including but not limited to advertising content) that a particular collection of content has a specified value to a specified user or collection of users. The value promise might be expressed as an amount of tradable currency, internal usage counts, measures of user interactions, or similar quantities.

The user may specify content preferences, such as through a profile or similar mechanism, by selecting or creating tags, keywords, and the like that the user finds representative of valuable content. Content suppliers, potentially including advertisers, may optionally associate tags or keywords with content that they supply. Techniques such as RSS feeds, "semantic web" technologies, various "folk-tagging" and "tag-cloud" technologies, and the like may provide a mechanism for identifying content that is valuable to the user through various associations of the user specified content preferences and the available content. These and/or new content harvesting and matching technologies may be employed to facilitate consumer/supplier financial exchange relationships.

The Zeetix environment may facilitate connecting users with content suppliers using profiles, tags, internal usage counts, measures of user interaction, and similar mechanisms. A Zeetix user might be represented by one or more persistent ZeeObjects, such as a persistent personal profile objects, that collect and store choices and preferences made by that user. As described elsewhere herein the Zeetix environment may be implemented as object-oriented "all the way down", so that every object (e.g. including the executable fragments of code that comprise the environment) might retain both an "owner" (e.g. assigned and/or maintained by the Zeetix environment), usage counts and history (potentially using the browser event tracking technology described herein), per-interaction or per-use pricing decisions made by the owner of each Zeetix Object or resource (including but not limited to executable code objects) involved in any exchange, and the like. Collections of content created or aggregated by content suppliers may similarly be represented by persistent Zeetix Objects, with similar associated ownership and usage information recorded and persistently stored for each content object or each aggregation of content objects. Other Zeetix Objects or aggregations of Zeetix Objects, using these same facilities, may be adapted to provide functionality for collecting and disbursing both online and offline payments. Zeetix technology may be used to create, maintain, and provide alternative online currency and associated accounting systems. The Zeetix environment may facilitate collecting revenue from content suppliers and users in consideration for creating, sustaining, and growing these connections and the infrastructure that supports and sustains them.

The Zeetix environment may collect from a content supplier an amount of money corresponding to a value promise associated with a bundle of content. The Zeetix environment may collect from a user an amount of money in consideration for providing the user with a mechanism for limiting content to that which the user finds valuable. The Zeetix environment may provide a user with an interactive mechanism for declaring that the value to the user is different from the value promise associated with a bundle of content, and for making or facilitating a financial transaction to or from the user and to or from a content supplier to reflect this difference. The Zeetix environment may include a mechanism for an operator or facilitator of the Zeetix environment to derive revenue from a difference between amounts received or paid to or from users, content suppliers, or both.

In embodiments, these mechanisms may include on-line registration, profile management, keyword assignment and modification, and various forms of e-commerce including credit card, debit card, ACH, and similar transactions. Each monetary transaction may make use of virtual or real currency, using public, private or proprietary currency or currency-equivalents. These mechanisms may allow the user to specify defined display regions, statically and dynamically, and of both fixed and variable sizes, on a per-page, per-view, or site-wide basis. These mechanisms may facilitate allowing content suppliers to provide static or dynamic content that fills these display regions. They may facilitate the online interactive collection of gestures through which users and content suppliers communicate and conduct the unfolding value negotiation between a user and a content supplier. For example, a user might use Zeetix technology to select and place pre-defined rectangular areas on an online interactive "wireframe" of a user-specified "news" page. These selections might be presented using the ZeeTop technology described herein, and might be recorded in a persistent user profile, along with various keywords, tags, RSS profiles, and similar information. When the user next displays this "news" page in their browser, Zeetix technology might be used to select and display commercial content provided and paid for by a content supplier. The "widget" through which this commercial content is displayed might contain a rendering of the "value promise" made by the content supplier, along with a button, drop-down list, or similar interactive artifact with which the user is invited to type, click, or similarly convey the user's feeling that the displayed content was more or less valuable to that user than the "value promise" made by the content supplier. If the user indicated that the value was less than promised, a payment might be electronically deposited in the user's account reflecting the difference. The content supplier might be charged or refunded a possibly different amount. The content supplier might, with the user's permission, be informed of the user's feedback. The content supplier might choose to exclude or include that individual user from future content offerings from that content supplier. All of this behavior might be created, supported, and sustained using Zeetix technology.

While the invention has been described in connection with certain preferred embodiments, other embodiments as would be understood by one of ordinary skill in the art are encompassed herein. All documents referenced herein are hereby incorporated by reference.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A system comprising:
   at least one processor;
   a program execution environment operable on at least one network server;
   a first program for rendering a plurality of visualization layers that are representative of a spatial domain;
   a dynamic tower of instances to run the rendering of at least one visualization layer of the plurality of visualization layers of the spatial domain, the tower comprising:
   a first virtual system operable in the program execution environment for executing a first portion of the first program on one level of the dynamic tower, wherein executing the first portion of the first program includes invoking a continuation; and
   a second virtual system operable in the program execution environment for executing a second portion of the first program on another level of the dynamic tower in response to the invoked continuation, wherein the second virtual system includes at least one capability required to execute the second portion of the first program that is different from all capabilities of the first virtual system, said second portion of the first program is necessary for the rendering of the plurality of visualization layers and wherein said invoked continuation performs a level shifting operation to shift execution up or down on the levels of the dynamic tower wherein the lowest level of the dynamic tower provides a greatest common denominator of capabilities of the plurality of virtual systems and wherein the second virtual system has capabilities beyond that of the lowest level of the dynamic tower.

2. The system of claim 1, wherein executing the first program includes interpreting the first program with a second program.

3. The system of claim 1, wherein the first virtual system terminates upon completion of invoking the continuation.

4. The system of claim 1, further including a datastore accessible by a plurality of networked servers for storing a plurality of data entries for rendering in the at least one visualization layer.

5. The system of claim 4, wherein the first virtual system and the second virtual system communicate with the datastore.

6. The system of claim 4, wherein at a least a portion of the plurality of entries in the datastore is immutable.

7. The system of claim 1, wherein executing the first program on the second virtual system comprises interpreting the first program.

8. The system of claim 1, wherein at least two instances of the dynamic tower of instances execute on different physical servers.

* * * * *